United States Patent
Miyamoto et al.

(10) Patent No.: US 8,560,208 B2
(45) Date of Patent: Oct. 15, 2013

(54) INTER-CYLINDER AIR-FUEL RATIO IMBALANCE DETERMINATION APPARATUS FOR INTERNAL COMBUSTION ENGINE

(75) Inventors: Hiroshi Miyamoto, Susono (JP); Yasushi Iwazaki, Ebina (JP); Hiroshi Sawada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/505,849

(22) PCT Filed: Nov. 5, 2009

(86) PCT No.: PCT/JP2009/069231
§ 371 (c)(1),
(2), (4) Date: May 3, 2012

(87) PCT Pub. No.: WO2011/055463
PCT Pub. Date: May 12, 2011

(65) Prior Publication Data
US 2012/0215427 A1   Aug. 23, 2012

(51) Int. Cl.
*B60T 7/12* (2006.01)
(52) U.S. Cl.
USPC ............ 701/103; 701/104; 123/434; 123/672
(58) Field of Classification Search
USPC .......... 701/103–105, 114, 115; 123/434, 672, 123/674, 679, 690
See application file for complete search history.

(56) References Cited

U.S. PATENT DOCUMENTS

| | | | |
|---|---|---|---|
| 5,003,955 A * | 4/1991 | Haraguchi et al. | ............ 123/675 |
| 6,021,758 A | 2/2000 | Carey et al. | |
| 6,032,659 A | 3/2000 | Yamashita et al. | |
| 6,314,952 B1 | 11/2001 | Turin et al. | |
| 6,382,198 B1 | 5/2002 | Smith et al. | |

(Continued)

FOREIGN PATENT DOCUMENTS

| | | |
|---|---|---|
| EP | 1 424 475 A2 | 6/2004 |
| JP | A-11-72473 | 3/1999 |

(Continued)

OTHER PUBLICATIONS

Aug. 1, 2012 Office Action issued in the Japanese Patent Application No. 2011-501829 (with Partial Translation).

(Continued)

*Primary Examiner* — John Kwon
(74) *Attorney, Agent, or Firm* — Oliff & Berridge, PLC

(57) ABSTRACT

An inter-cylinder air-fuel ratio imbalance determination apparatus (determination apparatus) according to the present invention obtains, as an "EGR supplying state imbalance determination parameter", a value corresponding to a differential value d(abyfs)dt of a detected air-fuel ratio abyfs represented by an output value of an air-fuel ratio sensor when an EGR gas is being supplied, and obtains, as an "EGR stop state imbalance determination parameter", a value corresponding to a differential value d(abyfs)dt when an EGR gas supply is being stopped. The determination apparatus obtains an "EGR-causing imbalance determination parameter Pegr" by subtracting the EGR stop state imbalance determination parameter Poff from the EGR supplying state imbalance determination parameter Pon, and determines that an inter-cylinder air-fuel ratio imbalance state has occurred due to the supply of the EGR gas when the parameter Pegr is larger than a threshold Pegrth.

16 Claims, 36 Drawing Sheets

(56) References Cited

U.S. PATENT DOCUMENTS

| | | | |
|---|---|---|---|
| 6,481,427 B1 | 11/2002 | Javaherian | |
| 6,668,812 B2 | 12/2003 | Javaherian | |
| 7,027,910 B1 | 4/2006 | Javaherian et al. | |
| 7,152,594 B2 * | 12/2006 | Anilovich et al. | 123/690 |
| 2004/0103890 A1 | 6/2004 | Yasui et al. | |
| 2008/0110239 A1 | 5/2008 | Maegawa | |
| 2012/0185156 A1 * | 7/2012 | Iwazaki et al. | 701/104 |
| 2012/0277980 A1 * | 11/2012 | Iwazaki et al. | 701/104 |
| 2012/0323466 A1 * | 12/2012 | Iwazaki et al. | 701/104 |

FOREIGN PATENT DOCUMENTS

| | | |
|---|---|---|
| JP | A-2000-65782 | 3/2000 |
| JP | A-2000-220489 | 8/2000 |
| JP | A-2003-328848 | 11/2003 |
| JP | A-2004-11617 | 1/2004 |
| JP | A-2004-69547 | 3/2004 |
| JP | 2004-138036 | 5/2004 |
| JP | A-2004-176651 | 6/2004 |
| JP | A-2008-121534 | 5/2008 |
| JP | A-2009-13967 | 1/2009 |
| JP | 2009-209747 | 9/2009 |
| JP | A-2010-106785 | 5/2010 |

OTHER PUBLICATIONS

Feb. 28, 2012 Japanese Office Action issued in Japanese Patent Application No. 2011-501829 (with partial translation).

Kainz et al., "Individual Cylinder Fuel Control with a Switching Oxygen Sensor," *SAE Technical Paper Series*, pp. 1-8, Mar. 1-4, 1999.

Dec. 28, 2009 International Search Report issued in International Patent Application No. PCT/JP2009/069231.

* cited by examiner

INTER-CYLINDER AIR-FUEL RATIO IMBALANCE DETERMINATION APPARATUS FOR INTERNAL COMBUSTION ENGINE

TECHNICAL FIELD

The present invention relates to an "inter-cylinder air-fuel ratio imbalance determination apparatus for an internal combustion engine", which is applied to a multi-cylinder internal combustion engine having an EGR gas supply means, and which can determine (monitor/detect) that a degree of imbalance among the air-fuel ratios of air-fuel mixtures, each supplied to each of cylinders (inter-cylinder air-fuel ratio imbalance; inter-cylinder air-fuel-ratio variation; or inter-cylinder air-fuel-ratio non-uniformity) has increased excessively.

BACKGROUND ART

A widely adapted electronic-fuel-injection-type internal combustion engine has at least one fuel injection valve (fuel injector) at each of the cylinders or at each of intake ports communicating with each of the cylinders. Accordingly, when the characteristic/property of the fuel injection valve of a certain specific cylinder changes to inject fuel in an amount excessively larger than an instructed fuel injection amount, only an air-fuel ratio of an air-fuel mixture supplied to that certain specific cylinder greatly changes toward a rich side. Consequently, the degree of air-fuel ratio non-uniformity among the cylinders increases. In other words, there arises an imbalance among cylinder-by-cylinder air-fuel ratios, each of which is the air-fuel ratio of the air-fuel mixture supplied to each of the cylinders (that is, an inter-cylinder air-fuel ratio imbalance state occurs). The inter-cylinder air-fuel ratio imbalance state also occurs, for example, in a case where the characteristic of the fuel injection valve of the certain specific cylinder changes to inject fuel in an amount excessively smaller than the instructed fuel injection amount.

When the inter-cylinder air-fuel ratio imbalance state occurs, the air-fuel ratio of an exhaust gas greatly fluctuates. Thus, an output value of an air-fuel ratio sensor greatly fluctuates, the sensor being disposed at an exhaust merging/aggregated portion into which exhaust gases from a plurality of the cylinders of the engine merge. In view of the above, one of conventional inter-cylinder air-fuel ratio imbalance determination apparatuses obtains a trace/trajectory length of the output value of the air-fuel ratio sensor, compares the trace length with a "reference value which changes in accordance with the rotational speed of the engine," and determines whether or not the inter-cylinder air-fuel ratio imbalance state has occurred on the basis of the result of the comparison (see, for example, U.S. Pat. No. 7,152,594).

It should be noted that, in the present specification, determining whether or not an inter-cylinder air-fuel ratio imbalance state has occurred means determining whether or not an excessive inter-cylinder air-fuel ratio imbalance state has occurred. The excessive inter-cylinder air-fuel ratio imbalance state means a state in which a difference between inter-cylinder air-fuel-ratios (cylinder-by-cylinder air-fuel ratios) is equal to or greater than a predetermined value. The determination as to whether or not the "inter-cylinder air-fuel ratio imbalance state" has occurred will be simply referred to as an "inter-cylinder air-fuel ratio imbalance determination" or "imbalance determination." Further, a cylinder supplied with an air-fuel mixture whose air-fuel ratio deviates from the air-fuel ratio of air-fuel mixtures supplied to the remaining cylinders (typically, stoichiometric air-fuel ratio) will also be referred to as an "imbalanced cylinder." The air-fuel ratio of the air-fuel mixture supplied to the imbalanced cylinder will also be referred to as an "air-fuel ratio of the imbalanced cylinder." The remaining cylinders (cylinders other than the imbalanced cylinder) will also be referred to as "normal cylinders" or "balanced cylinders." The air-fuel ratio of air-fuel mixtures supplied to the balanced cylinders will also be referred to as "air-fuel ratio of the balanced cylinders" or "air-fuel ratio of the normal cylinders". According to those definitions, a difference between/among the cylinder-by-cylinder air-fuel ratios is a difference between "the air-fuel ratio of the imbalanced cylinder and the air-fuel ratio of the balanced cylinders", and will be referred to as a "cylinder-by-cylinder air-fuel ratio difference."

In addition, a parameter (e.g., the trace length of the output value of the above-mentioned air-fuel ratio sensor), which is obtained based on the output value of the air-fuel ratio sensor, which reflects (varies depending on) a "magnitude of the fluctuation of the exhaust gas air-fuel ratio which increases as the cylinder-by-cylinder air-fuel ratio difference becomes larger", and which is compared with a predetermined threshold value for imbalance determination when the imbalance determination is performed, will also be referred to as an "imbalance determination parameter."

SUMMARY OF THE INVENTION

Meanwhile, as shown in FIG. 1, a cylinder-by-cylinder EGR apparatus is proposed, which comprises one EGR supply opening (54b) for each of cylinders to supply an EGR gas (external EGR gas) to each of the cylinders through (via) each of the EGR supply openings (54b). In this cylinder-by-cylinder EGR apparatus, the EGR supply opening (54b) is disposed/positioned in the vicinity of a combustion chamber. Accordingly, the EGR gas containing a relatively large amount of water vapor is hardly cooled down in the vicinity of the EGR gas supply opening, and the water vapor contained in the EGR gas is therefore hardly changed into water. Consequently, it can be avoided that such water is frozen, and thus, provides an unfavorable impact on intake air members (e.g., a throttle valve).

When one of the EGR gas supply openings is clogged in this type of the internal combustion engine having the cylinder-by-cylinder EGR apparatus, the EGR gas is not supplied to a cylinder corresponding to the EGR gas supply opening which is clogged. Accordingly, an amount of an air (fresh air) supplied to that cylinder becomes larger than that of an air supplied to the other cylinder by an amount corresponding to the EGR gas which is to be supplied to that cylinder. Meanwhile, as long as the fuel injection valves are normal, an amount of a fuel injected from each of the fuel injection valves, each injection valves disposed for each of the cylinders, is substantially equal to each other. As a result, an air-fuel ratio of a mixture supplied to that cylinder corresponding to the EGR gas supply opening which is clogged deviates/changes toward a lean side compared to air-fuel ratios of mixtures supplied to the other cylinders. That is, an inter-cylinder air-fuel ratio imbalance state due to the EGR gas occurs.

However, it is not easy to determine whether or not the inter-cylinder air-fuel ratio imbalance state due to the EGR gas occurs using the conventional inter-cylinder air-fuel ratio imbalance determination apparatus. The reason for this will be described with reference to FIGS. 2 and 3. It should be noted that, hereinafter, a state in which one of the EGR gas supply openings for one certain specific cylinder is clogged (i.e., EGR gas supply openings clogged state) may also be referred to as an EGR abnormal state, and a state in which all of the EGR gas supply openings are normal may also be referred to as an EGR normal state.

An individual difference (individual specificity) among internal combustion engines including a mixture supply system (e.g., shapes of the intake ports, and fuel injection valves) inevitably exists. Accordingly, even when the cylinder-by-cylinder EGR apparatus (EGR gas supplying means) is in the EGR normal state, the cylinder-by-cylinder air-fuel ratio difference is not equal to 0. Therefore, the cylinder-by-cylinder air-fuel ratio difference of a vehicle A on which a specific type of an internal combustion engine is mounted is not necessarily equal to that of a vehicle B on which the same specific type of an internal combustion engine is mounted. That is, as shown in FIG. 2, even when the EGR gas supplying means is in the EGR normal state, the "imbalance determination parameter P1 of the vehicle A in the EGR supplying state" does not coincide with the "imbalance determination parameter P2 of the vehicle B in the EGR supplying state." It should be noted that, in the example shown in FIG. 2, the parameter P1 is larger than the parameter P2.

When the EGR abnormal state has occurred in each of the vehicle A and the vehicle B, the imbalance determination parameters change into the parameters P3 and P4, respectively. As described before, the imbalance determination parameter becomes larger, when the EGR abnormal state occurs. Accordingly, the imbalance determination parameter P3 of the vehicle A becomes larger than the imbalance determination parameter P1 of the vehicle A. Similarly, the imbalance determination parameter P4 of the vehicle B becomes larger than the imbalance determination parameter P2 of the vehicle B.

However, since an EGR rate is not so large, a change amount in the cylinder-by-cylinder air-fuel ratio difference is small when a state has changed from the EGR normal state to the EGR abnormal state, compared with a case in which the characteristic of the fuel injection valve for the specific cylinder has changed. Consequently, as shown in FIG. 2, there arises a case in which the imbalance determination parameter P4 which is obtained under the EGR abnormal state is smaller than the imbalance determination parameter P1 which is obtained under the EGR normal state.

In this case, if the threshold value for imbalance determination is set at (to) a value Pith slightly smaller than the imbalance determination parameter P4, an erroneous determination that the inter-cylinder air-fuel ratio imbalance state has occurred is made in the vehicle A under the EGR normal state. If the threshold value for imbalance determination is set at (to) a value P2*th* slightly smaller than the imbalance determination parameter P3, an erroneous determination that the inter-cylinder air-fuel ratio imbalance state has not occurred is made in the vehicle B under the EGR abnormal state. Accordingly, one of objects of the present invention is to provide an inter-cylinder air-fuel ratio imbalance determination apparatus which can determine that an inter-cylinder air-fuel ratio imbalance state due to the EGR gas (EGR abnormal state) has occurred as accurately as possible.

An inter-cylinder air-fuel ratio imbalance determination apparatus according to the present invention (hereinafter also referred to as a "determination apparatus of the present invention") is applied to a multi-cylinder internal combustion engine having a plurality of cylinders. The determination apparatus of the present invention is the inter-cylinder air-fuel ratio imbalance determination apparatus which determines whether or not an inter-cylinder air-fuel ratio imbalance state in which a cylinder-by-cylinder air-fuel ratio difference is larger than or equal to a predetermined value has been occurring. The cylinder-by-cylinder air-fuel ratio difference means a difference between air-fuel ratios of mixtures supplied to at least two or more of a plurality of the cylinders, the at least two or more of a plurality of the cylinders being configured so as to discharge exhaust gases to an exhaust merging portion of an exhaust passage of the engine.

The determination apparatus of the present invention comprises a plurality of fuel injection valves, EGR gas supply means, EGR gas supply control means, imbalance determination parameter obtaining means, and imbalance determination means.

A plurality of the fuel injection valves are disposed in such a manner that each of the injection valves corresponds to each of the above-mentioned at least two or more of the cylinders. Each of a plurality of the fuel injection valves injects fuel contained in an air-fuel mixture supplied to each of combustion chambers of the at least two or more of the cylinders. That is, one or more fuel injection valve(s) is/are provided for each of the cylinders. Each of the fuel injection valves injects fuel to a cylinder corresponding to that fuel injection valve.

The EGR gas supply means comprises a plurality of EGR gas supply openings, each being disposed for each of the at least two or more of the cylinders. Each of the EGR gas supply openings supplies an external EGR gas to each of the combustion chambers of the at least two or more of the cylinders.

The EGR gas supply control means realizes/establishes an EGR supplying state (EGR gas supplying state) in which the external EGR gas is supplied through (via) a plurality of the EGR gas supply openings when an operating condition of the engine satisfies a predetermined EGR execution condition. Further, the EGR gas supply control means realizes/establishes an EGR stop state (EGR gas stop state) in which the external EGR gas supply is stopped when the operating condition of the engine does not satisfy the EGR execution condition.

The air-fuel ratio sensor is disposed at the exhaust merging portion or at a portion downstream of the exhaust merging portion in the exhaust passage. The air-fuel ratio sensor outputs an output value corresponding to (varying depending on, in accordance with) an air-fuel ratio of the exhaust gas at the portion/position where the air-fuel ratio sensor is disposed.

The imbalance determination parameter obtaining means, (1) obtains, based on the output value of the air-fuel ratio sensor, an EGR supplying state imbalance determination parameter whose absolute value becomes larger as the cylinder-by-cylinder air-fuel ratio difference becomes larger when the EGR supplying state is being realized, and
(2) obtains, based on the output value of the air-fuel ratio sensor, an EGR stop state imbalance determination parameter whose absolute value becomes larger as the cylinder-by-cylinder air-fuel ratio difference becomes larger when the EGR stop state is being realized.

The EGR supplying state imbalance determination parameter and the EGR stop state imbalance determination parameter are parameters which become larger as the fluctuation of the output value of the air-fuel ratio sensor (i.e., the fluctuation of the air-fuel ratio of the exhaust gas) becomes larger, and which are obtained based on the output value of the air-fuel ratio sensor according to the same method as each other. Each of the EGR supplying state imbalance determination parameter and the EGR stop state imbalance determination parameter is, for example, a value corresponding to the above-mentioned trace length of the output value of the air-fuel ratio sensor, a value corresponding to a change amount of the output value of the air-fuel ratio sensor per unit time, a value corresponding to a change amount of a change amount of the output value of the air-fuel ratio sensor per unit time, or the like.

(3) Further, the imbalance determination parameter obtaining means obtains, based on the EGR supplying state imbalance determination parameter and the EGR stop state imbalance determination parameter, an EGR-causing imbalance determination parameter varying depending on (in accordance with) a degree of a difference between the EGR supplying state imbalance determination parameter and the EGR stop state imbalance determination parameter.

For example, the EGR-causing imbalance determination parameter may be a value (the value itself, an absolute value of the value, and the like) corresponding to (in accordance with) the difference between the EGR supplying state imbalance determination parameter and the EGR stop state imbalance determination parameter, or a value corresponding to a ratio of the EGR supplying state imbalance determination parameter to the EGR stop state imbalance determination parameter (e.g., the ratio itself, an inverse of the ratio, and the like).

The imbalance determination means compares the EGR-causing imbalance determination parameter with a predetermined EGR-causing imbalance determination threshold, and determines whether or not the inter-cylinder air-fuel ratio imbalance state has occurred based on the result of the comparison.

According to the determination apparatus of the present invention, the EGR stop state imbalance determination parameter is obtained when the EGR gas is not being supplied. Therefore, the EGR stop state imbalance determination parameter does not vary regardless of whether or not the EGR gas supply means is in the EGR normal state or in the EGR abnormal state. In other words, the EGR stop state imbalance determination parameter is a value indicating the "cylinder-by-cylinder air-fuel ratio difference" depending on factors (causes) other than EGR gas supplied by the EGR gas supply means.

On the other hand, the EGR supplying state imbalance determination parameter is obtained when the EGR supplying state is being realized. When the EGR gas supply means is in the EGR normal state, the cylinder-by-cylinder air-fuel ratio difference does not substantially change owing to the supply of the EGR gas. In other words, when the EGR gas supply means is in the EGR normal state, the EGR supplying state imbalance determination parameter becomes a value indicating the "cylinder-by-cylinder air-fuel ratio difference" depending on the factors other than EGR gas supplied by the EGR gas supply means. Accordingly, as is understood from P5 and P6 in FIG. 3 as well as P7 and P8 in FIG. 3, when the EGR gas supply means is in the EGR normal state, the EGR supplying state imbalance determination parameter of a specific vehicle becomes substantially equal to the EGR stop state imbalance determination parameter of the specific vehicle.

In contrast, when the EGR gas supply means is in the EGR abnormal state, the cylinder-by-cylinder air-fuel ratio difference increases (changes) due to the supply of the EGR gas. In other words, when the EGR gas supply means is in the EGR abnormal state, the EGR supplying state imbalance determination parameter becomes a value obtained when the cylinder-by-cylinder air-fuel ratio difference due to the EGR gas is superimposed on the cylinder-by-cylinder air-fuel ratio difference due to the factors other than EGR gas. Accordingly, as is understood from P9 and P10 in FIG. 3 as well as P11 and P12 in FIG. 3, when the EGR gas supply means is in the EGR abnormal state, the EGR supplying state imbalance determination parameter of the specific vehicle becomes larger than the EGR stop state imbalance determination parameter of the specific vehicle.

Therefore, the EGR-causing imbalance determination parameter varying depending on the degree of the difference between the EGR supplying state imbalance determination parameter and the EGR stop state imbalance determination parameter of a certain vehicle becomes a value obtained by eliminating an effect of the cylinder-by-cylinder air-fuel ratio difference due to the factors other than EGR gas. Thus, as shown in FIG. 4, the EGR-causing imbalance determination parameter is substantially equal to 0 (or equal to 1 if the EGR-causing imbalance determination parameter is the value corresponding to the ratio of the EGR supplying state imbalance determination parameter to the EGR stop state imbalance determination parameter) in any vehicles, when the EGR gas supply means is in the EGR normal state. The EGR-causing imbalance determination parameter becomes larger than a predetermined threshold DPth in any vehicles, when the EGR gas supply means is in the EGR abnormal state. Accordingly, the comparison between the EGR-causing imbalance determination parameter and the EGR-causing imbalance determination threshold DPth enables accurate determination as to whether or not the inter-cylinder air-fuel ratio imbalance state due to (caused by) the abnormality (deficiency) of the EGR gas supply means has occurred, without being affected by the individual difference among internal combustion engines.

In the determination apparatus of the present invention, the EGR execution condition may be set to a condition which is satisfied when an actual rotational speed of the engine and an actual load of the engine is in an "EGR execution region (region defined by an engine rotational speed and an engine load)".

In this case, the EGR gas supply control means may be configured so as to:

set the EGR execution region to a "predetermined usual EGR execution region", when neither the EGR supplying state imbalance determination parameter nor the EGR stop state imbalance determination parameter has been obtained, as well as when both of the EGR supplying state imbalance determination parameter and the EGR stop state imbalance determination parameter have been obtained; and set the EGR execution region to a "narrowed EGR execution region which is included in and is narrower than the usual EGR execution region", when the EGR supplying state imbalance determination parameter has been obtained and (but) the EGR stop state imbalance determination parameter has not been obtained.

According to the configuration described above, when the EGR supplying state imbalance determination parameter has already been obtained and the EGR stop state imbalance determination parameter has not been obtained yet, the EGR execution region is narrowed, so that the EGR stop state is realized more frequently. Therefore, the EGR stop state imbalance determination parameter can be obtained earlier.

In other words, according to the configuration described above, both of the EGR supplying state imbalance determination parameter and the EGR stop state imbalance determination parameter can be obtained earlier. Consequently, the EGR-causing imbalance determination parameter can be obtained earlier, and thus, the apparatus can earlier determine whether or not the inter-cylinder air-fuel ratio imbalance state due to the abnormality of the EGR gas supply means has occurred.

In this configuration, the imbalance determination parameter obtaining means is configured so as to obtain the EGR supplying state imbalance determination parameter and the EGR stop state imbalance determination parameter, when the actual rotational speed of the engine and the actual load of the engine is in a "predetermined parameter obtaining region in which the imbalance determination parameters are allowed to be obtained.". The parameter obtaining region is also a region defined by the engine rotational speed and the engine load.

That is, the imbalance determination parameter obtaining means may be configured so as to:

obtain the EGR supplying state imbalance determination parameter when the actual rotational speed of the engine and the actual load of the engine is in the parameter obtaining region in which the imbalance determination parameters are allowed to be obtained and the EGR supplying state is being realized; and obtain the EGR stop state imbalance determination parameter when the actual rotational speed of the engine and the actual load of the engine is in the parameter obtaining region and the EGR stop state is being realized.

As described above, the narrowed EGR execution region is the EGR execution region when the EGR supplying state imbalance determination parameter has been obtained but the EGR stop state imbalance determination parameter has not been obtained. Therefore, when the EGR execution region is set to the narrowed EGR execution region, the EGR stop state is realized more frequently, so that chances of obtaining the EGR stop state imbalance determination parameter are increased. However, even when the EGR stop state is realized while the engine is being operated in the region (usual EGR execution region) in which the EGR is usually executed, if the engine is not being operated in a region in which the "parameter obtaining region in which the imbalance determination parameters are allowed to be obtained", the EGR stop state imbalance determination parameter can not be obtained. That is, in such a case, it makes no sense to realize the EGR stop state.

In view of the above, the EGR gas supply control means is configured so as to set the narrowed EGR execution region to a "region which is within the usual EGR execution region but is not (or is outside of) the parameter obtaining region."

According to the above-mentioned configuration, chances of occurrence of the state in which the EGR gas is not supplied when the EGR gas is to be supplied are lowered/decreased, a possibility of deterioration of emission can be reduced.

Similarly, in a case where the EGR execution condition is set to (at) a condition which is satisfied when the actual rotational speed of the engine and the actual load of the engine is in the EGR execution region, the EGR gas supply control means may be configured so as to:

set the EGR execution region to a "predetermined usual EGR execution region", when neither the EGR supplying state imbalance determination parameter nor the EGR stop state imbalance determination parameter has been obtained, as well as when both of the EGR supplying state imbalance determination parameter and the EGR stop state imbalance determination parameter have been obtained; and set the EGR execution region to an "expanded/enlarged EGR execution region which includes and is larger/wider than the usual EGR execution region", when the EGR stop state imbalance determination parameter has been obtained and the EGR supplying state imbalance determination parameter has not been obtained.

According to the configuration described above, when the EGR stop state imbalance determination parameter has already been obtained and the EGR supplying state imbalance determination parameter has not been obtained yet, the EGR execution region is expanded/enlarged, so that the EGR supplying state is realized more frequently. Therefore, the EGR supplying state imbalance determination parameter can be obtained earlier.

In other words, according to the configuration described above, both of the EGR supplying state imbalance determination parameter and the EGR stop state imbalance determination parameter can be obtained earlier. Consequently, the EGR-causing imbalance determination parameter can be obtained earlier, and thus, the apparatus can earlier determine whether or not the inter-cylinder air-fuel ratio imbalance state due to the abnormality of the EGR gas supply means has occurred.

In this configuration as well, the imbalance determination parameter obtaining means may be configured so as to obtain the EGR supplying state imbalance determination parameter and the EGR stop state imbalance determination parameter, when the actual rotational speed of the engine and the actual load of the engine is in the predetermined parameter obtaining region.

As described above, the expanded EGR execution region is the EGR execution region when the EGR stop state imbalance determination parameter has been obtained but the EGR supplying state imbalance determination parameter has not been obtained. Accordingly, the EGR supplying state is realized more frequently, so that chances of obtaining the EGR supplying state imbalance determination parameter are increased. However, even when the EGR supplying state is realized while the engine is being operated in the region (region other than the usual EGR execution region) in which the EGR should not usually be executed, if the engine is not being operated in the parameter obtaining region, the EGR supplying state imbalance determination parameter can not be obtained. That is, in such a case, it makes no sense to realize the EGR supplying state.

In view of the above, the EGR gas supply control means is configured so as to set the expanded EGR execution region to a region which is included within at least one of the "usual EGR execution region" and the "parameter obtaining region" (that is, the region obtained by adding "region within the parameter obtaining region, and with which the usual EGR execution region does not overlap" to the "usual EGR execution region").

According to the above-mentioned configuration, chances of occurrence of the state in which the EGR gas is supplied when the EGR gas is not to be supplied are lowered/decreased, a possibility of deterioration of emission and/or deterioration of drivability can be reduced.

The EGR gas supply control means in another aspect of the determination apparatus of the present invention may be configured, in a case in which the EGR supplying state imbalance determination parameter has been obtained and the EGR stop state imbalance determination parameter has not been obtained, so as to realize the EGR supplying state (begin to supply the EGR gas) when a state in which the EGR execution condition is satisfied continues for a time period equal to or longer than a predetermined start delay time, and so as to realize the EGR stop state (stop supplying the EGR gas) when the EGR execution condition becomes unsatisfied.

According to the configuration described above, when the EGR supplying state imbalance determination parameter has already been obtained and the EGR stop state imbalance determination parameter has not been obtained yet, the EGR supplying state is not realized until the state in which the EGR execution condition is satisfied continues for the time period equal to or longer than the predetermined start delay time. In other words, since chances in which the EGR stop state is realized increase, the EGR stop state imbalance determination parameter can be obtained earlier.

Accordingly, both of the EGR supplying state imbalance determination parameter and the EGR stop state imbalance determination parameter can be obtained earlier. Consequently, the EGR-causing imbalance determination parameter can be obtained earlier, and thus, the apparatus can earlier determine whether or not the inter-cylinder air-fuel ratio imbalance state due to the abnormality of the EGR gas supply means has occurred.

In this configuration, the imbalance determination parameter obtaining means may be configured so as to:

obtain the EGR stop state imbalance determination parameter when a predetermined parameter obtaining condition for obtaining the imbalance determination parameters is satisfied and the EGR stop state is realized; and obtain the EGR supplying state imbalance determination parameter when the parameter obtaining condition is satisfied and the EGR supplying state is realized.

According to the above-mentioned configuration, the EGR stop state imbalance determination parameter is not obtained, if the parameter obtaining condition is not satisfied even when the EGR stop state is realized. That is, in such a case, it makes no sense to realize the EGR stop state until the start delay time elapses, in order to obtain the EGR stop state imbalance determination parameter.

In view of the above, the EGR gas supply control means is configured so as to realize the EGR supplying state when the parameter obtaining condition becomes unsatisfied even before the state in which the EGR execution condition is satisfied continues for the time period equal to or longer than the start delay time, in the case in which the EGR supplying state imbalance determination parameter has been obtained and the EGR stop state imbalance determination parameter has not been obtained.

According to the above-mentioned configuration, chances of occurrence of the state in which the EGR gas is not supplied when the EGR gas is to be supplied are lowered/decreased, a possibility of deterioration of emission can be reduced.

The EGR gas supply control means in another aspect of the determination apparatus of the present invention may be configured, in a case in which the EGR stop state imbalance determination parameter has been obtained and the EGR supplying state imbalance determination parameter has not been obtained, so as to realize the EGR supplying state (begin to supply the EGR gas) when the EGR execution condition becomes satisfied, and so as to realize the EGR stop state (stop supplying the EGR gas) when a state in which the EGR execution condition is unsatisfied continues for a time period equal to or longer than a predetermined stop delay time.

According to the configuration described above, the EGR supplying state is continued until the state in which the EGR execution condition is unsatisfied continues for the time period equal to or longer than the predetermined stop delay time, in the case in which the EGR stop state imbalance determination parameter has been obtained and the EGR supplying state imbalance determination parameter has not been obtained. That is, the EGR supplying state is realized more frequently, and therefore, the EGR supplying state imbalance determination parameter can be obtained earlier.

Accordingly, both of the EGR supplying state imbalance determination parameter and the EGR stop state imbalance determination parameter can be obtained earlier. Consequently, the EGR-causing imbalance determination parameter can be obtained earlier, and thus, the apparatus can earlier determine whether or not the inter-cylinder air-fuel ratio imbalance state due to the abnormality of the EGR gas supply means has occurred.

In this configuration as well, the imbalance determination parameter obtaining means may be configured so as to:

obtain the EGR stop state imbalance determination parameter when a predetermined parameter obtaining condition for obtaining the imbalance determination parameters is satisfied and the EGR stop state is realized; and obtain the EGR supplying state imbalance determination parameter when the parameter obtaining condition is satisfied and the EGR supplying state is realized.

According to the above-mentioned configuration, the EGR supplying state imbalance determination parameter is not obtained, if the parameter obtaining condition is not satisfied even when the EGR supplying state is realized. That is, in such a case, it makes no sense to realize the EGR supplying state until the stop delay time elapses, in order to obtain the EGR supplying state imbalance determination parameter.

In view of the above, the EGR gas supply control means is configured so as to realize the EGR stop state when the parameter obtaining condition becomes unsatisfied even before the state in which the EGR execution condition is unsatisfied continues for the time period equal to or longer than the stop delay time, in the case in which the EGR stop state imbalance determination parameter has been obtained and the EGR supplying state imbalance determination parameter has not been obtained.

According to the above-mentioned configuration, chances of occurrence of the state in which the EGR gas is supplied when the EGR gas should not be supplied are lowered/decreased, a possibility of deterioration of emission and/or deterioration of drivability can be reduced.

The imbalance determination means of the determination apparatus of the present invention may be configured so as to compare the EGR supplying state imbalance determination parameter with a predetermined EGR supplying state imbalance determination threshold, and so as to determine whether or not the inter-cylinder air-fuel ratio imbalance state has occurred based on the result of the comparison, as well.

The above-mentioned configuration can determine that the inter-cylinder air-fuel ratio imbalance state has been occurring in a case in which a great cylinder-by-cylinder air-fuel ratio difference is occurring, when the EGR supplying state imbalance determination parameter has been obtained and even when the EGR stop state imbalance determination parameter has not been obtained yet. This type of inter-cylinder air-fuel ratio imbalance state may occur, for example, when the injection characteristic of the fuel injection valve greatly changes.

Similarly, the imbalance determination means of the determination apparatus of the present invention may be configured so as to compare the EGR stop state imbalance determination parameter with a predetermined EGR stop state imbalance determination threshold, and determines whether or not the inter-cylinder air-fuel ratio imbalance state has occurred based on the result of the comparison, as well.

The above-mentioned configuration can determine that the inter-cylinder air-fuel ratio imbalance state has been occurring in a case in which a great cylinder-by-cylinder air-fuel ratio difference is occurring, when the EGR stop state imbalance determination parameter has been obtained and even when the EGR supplying state imbalance determination parameter has not been obtained yet. This type of inter-cylinder air-fuel ratio imbalance state may occur, for example, when the injection characteristic of the fuel injection valve greatly changes.

As described above, in the determination apparatus of the present invention, the EGR supplying state imbalance determination parameter may be a value corresponding to a change amount of the output value of the air-fuel ratio sensor per unit time, and the EGR stop state imbalance determination parameter may be a value corresponding to the change amount of the output value of the air-fuel ratio sensor per unit time.

The change amount of the output value of the air-fuel ratio sensor per unit time (i.e., value corresponding to a differential value of the output value of the air-fuel ratio sensor with respect to time) is affected by an intake air flow rate, but is hardly affected by the engine rotational speed. Therefore, it is not necessary to set the "imbalance determination threshold" which is compared with the imbalance determination parameter precisely/accurately for each engine rotational speed. This enables to shorten a development period and improve accuracy in the imbalance determination.

Further, in the determination apparatus of the present invention, the EGR supplying state imbalance determination parameter may be a value corresponding to a change amount of the change amount of the output value of the air-fuel ratio sensor per unit time, and the EGR stop state imbalance determination parameter may be a value corresponding to a change amount of the change amount of the output value of the air-fuel ratio sensor per unit time.

The change amount of the change amount of the output value of the air-fuel ratio sensor per unit time (i.e., value corresponding to a second-order differential value of the output value of the air-fuel ratio sensor with respect to time) is hardly affected by a fluctuation of an average of the air-fuel ratio of the engine. Therefore, this enables to improve accuracy in the imbalance determination.

Further, in the determination apparatus of the present invention, the EGR supplying state imbalance determination parameter may be a value corresponding to a trace length of the output value of the air-fuel ratio sensor, and the EGR stop state imbalance determination parameter may be a value corresponding to a trace length of the output value of the air-fuel ratio sensor.

This enables to easily obtain the imbalance determination parameter which represents the fluctuation of the air-fuel ratio of the exhaust gas.

MODE FOR CARRYING OUT THE INVENTION

An inter-cylinder air-fuel ratio imbalance determination apparatus (hereinafter may be simply referred to as a "determination apparatus") for an internal combustion engine according to each of embodiments of the present invention will be described with reference to the drawings. This determination apparatus is a portion of an air-fuel ratio control apparatus for controlling the air-fuel ratio of gas mixture supplied to the internal combustion engine (the air-fuel ratio of the engine), and also serves as a fuel injection amount control apparatus for controlling the amount of fuel injection and an EGR control apparatus.

<Imbalance Determination Parameter>

Each of the determination apparatuses according to each of the embodiments obtains, as an EGR supplying state imbalance determination parameter, an imbalance determination parameter while the external EGR gas is being supplied to the engine; and obtains, as an EGR stop state imbalance determination parameter, an imbalance determination parameter while the external EGR gas is not being supplied to the engine. Each of the EGR supplying state imbalance determination parameter and the EGR stop state imbalance determination parameter is a value which varies depending on (in accordance with) a fluctuation of an air-fuel ratio of the exhaust gas, and a value whose absolute value becomes larger as the cylinder-by-cylinder air-fuel ratio difference becomes larger. Each of the EGR supplying state imbalance determination parameter and the EGR stop state imbalance determination parameter is obtained, based on the output value of the air-fuel ratio sensor in accordance with the same calculation method.

Each of the determination apparatuses according to each of the embodiments obtains, as the EGR supplying state imbalance determination parameter and the EGR stop state imbalance determination parameter, a value corresponding to a change amount of the output value of the air-fuel ratio sensor per unit time (i.e., differential value of the output value of the air-fuel ratio sensor with respect to time). It should be noted that each of the EGR supplying state imbalance determination parameter and the EGR stop state imbalance determination parameter is not limited to the value corresponding to the change amount of the output value of the air-fuel ratio sensor per unit time, but may be a value corresponding to a change amount of the change amount of the output value of the air-fuel ratio sensor per unit time (i.e., second-order differential value of the output value of the air-fuel ratio sensor), or a value corresponding to a trace length of the output value of the air-fuel ratio sensor, or the like, as described later.

First Embodiment

Configuration

Figure 5:
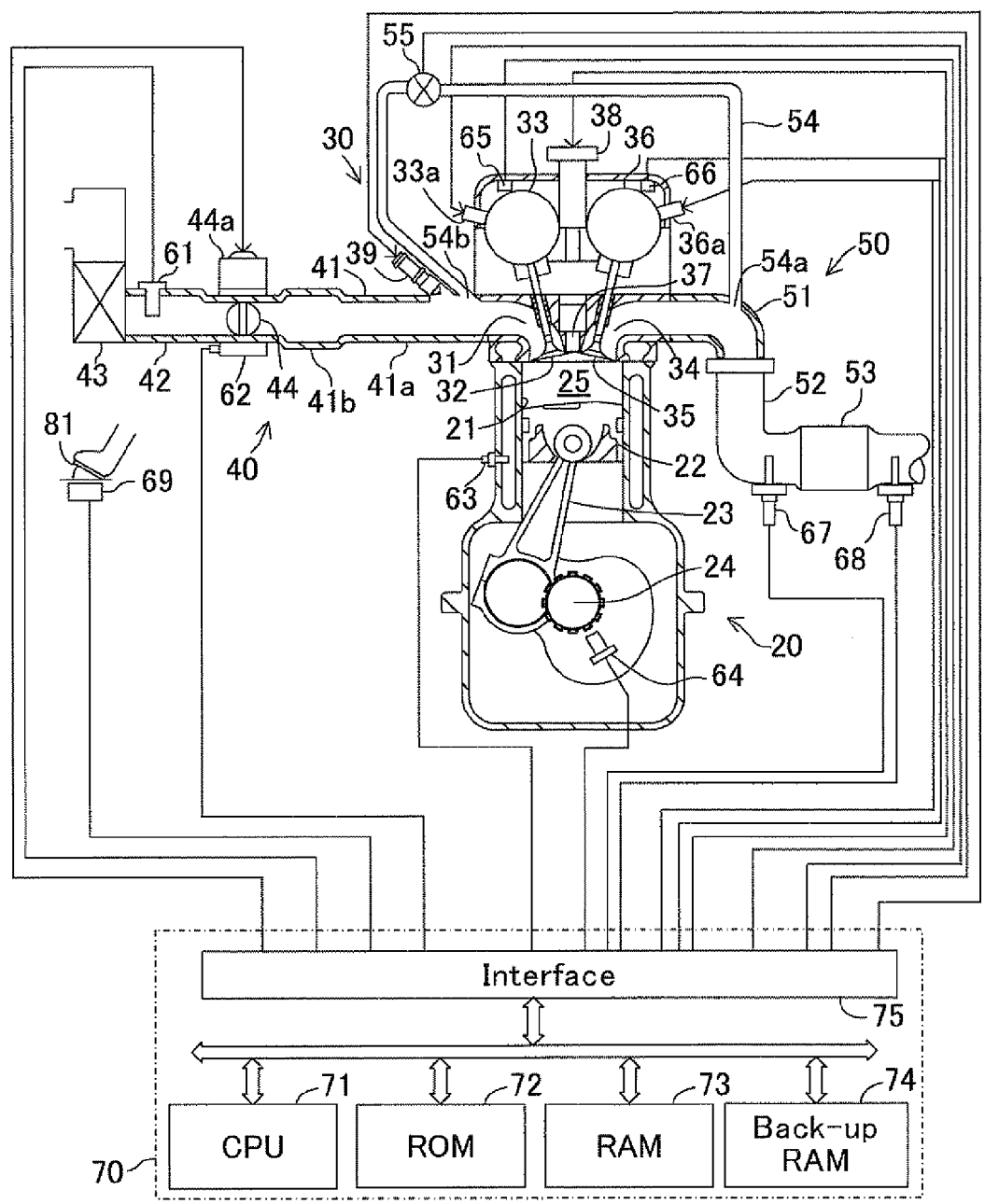
FIG. 5 is a diagram schematically showing a configuration of the internal combustion engine shown in FIG. 1.

FIG. 5 schematically shows the configuration of a system which is configured in such a manner that a determination apparatus according to a first embodiment (hereinafter also referred to as the "first determination apparatus") is applied to a spark-ignition multi-cylinder (straight 4-cylinder) four-cycle internal combustion engine 10. Although FIG. 5 shows the cross section of a specific cylinder only, the remaining cylinders have the same configuration.

The internal combustion engine 10 includes a cylinder block section 20 including a cylinder block, a cylinder block lower-case, an oil pan, etc.; a cylinder head section 30 fixedly provided on the cylinder block section 20; an intake system 40 for supplying gasoline gas mixture to the cylinder block section 20; and an exhaust system 50 for discharging exhaust gas from the cylinder block section 20 to the exterior of the engine 10.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the respective connecting rod 23, whereby the crankshaft 24 is rotated. The wall surface of the cylinder 21 and the top surface of the piston 22 form a combustion chamber 25 in cooperation with the lower surface of the cylinder head section 30.

The cylinder head section 30 includes an intake port 31 communicating with the combustion chamber 25; an intake valve 32 for opening and closing the intake port 31; a variable intake timing control apparatus 33 which includes an intake camshaft for driving the intake valve 32 and which continuously changes the phase angle of the intake camshaft; an actuator 33a of the variable intake timing control apparatus 33; an exhaust port 34 communicating with the combustion chamber 25; an exhaust valve 35 for opening and closing the exhaust port 34; a variable exhaust timing control apparatus 36 which includes an exhaust camshaft for driving the exhaust valve 35 and which continuously changes the phase angle of the exhaust camshaft; an actuator 36a of the variable exhaust timing control apparatus 36; a spark plug 37; an igniter 38 including an ignition coil for generating a high voltage to be applied to the spark plug 37; and a fuel injection valve (fuel injection means; fuel supply means) 39.

The fuel injection valves (fuel injector) 39 are disposed such that a single fuel injection valve is provided for each of the combustion chambers 25. The fuel injection valve 39 is provided at the intake port 31. When the fuel injection valve

39 is normal, the fuel injection valve 39 injects, in response to an injection instruction signal, "fuel of an amount corresponding to an instructed fuel injection amount contained in the injection instruction signal" into the corresponding intake port 31. As described above, each of a plurality of the cylinders has the fuel injection valve 39 which supplies fuel thereto independently of other cylinders.

Figure 1:
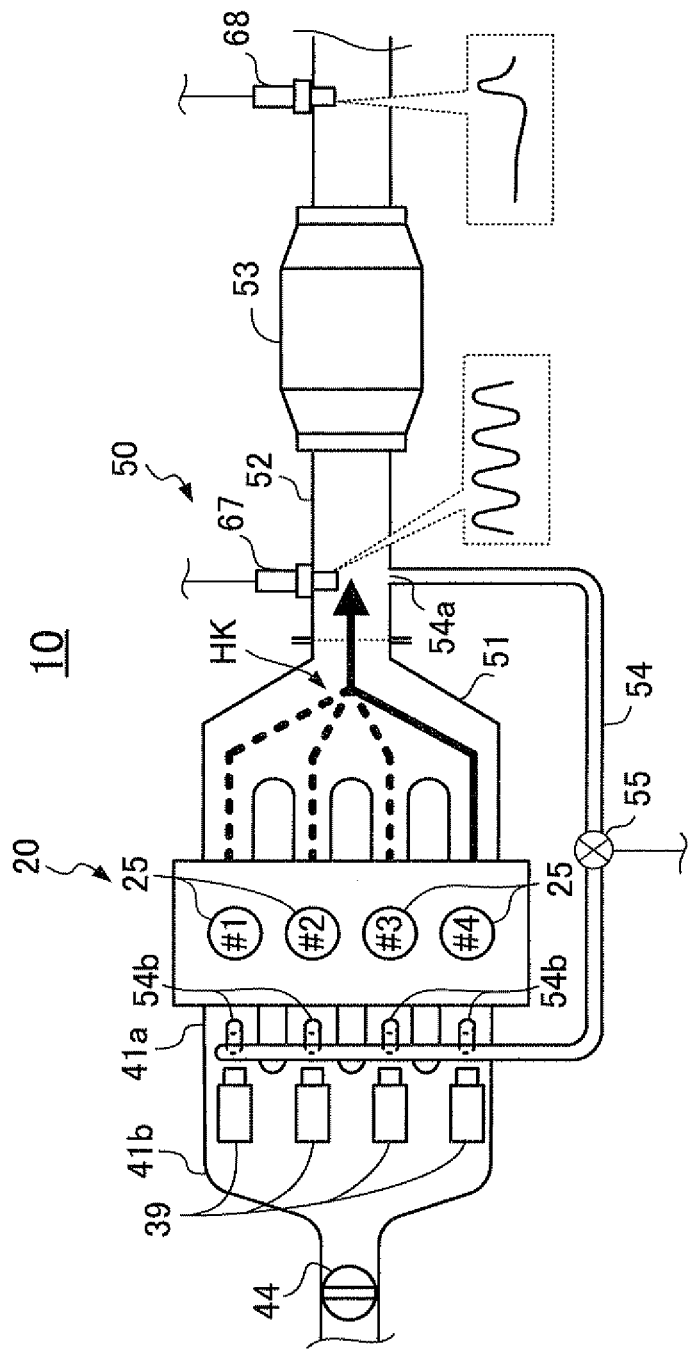
FIG. 1 is a schematic plan view of an internal combustion engine to which the inter-cylinder air-fuel ratio imbalance determination apparatus according to each of the embodiments of the present invention is applied.

The intake system 40 includes an intake manifold 41, an intake pipe 42, an air filter 43, and a throttle valve 44. As shown in FIG. 1 as well, the intake manifold 41 is composed of a plurality of branch portions 41a and a surge tank 41b. One end of each branch portion 41a is connected to each of a plurality of the intake ports 31. The other end of each branch portion 41a is connected to the surge tank 41b. One end of the intake pipe 42 is connected to the surge tank 41b. The air filter 43 is provided at the other end of the intake pipe 42. The throttle valve 44 is provided within the intake pipe 42, and is configured so as to change an opening cross sectional area of the intake passage. The throttle valve 44 is rotated within the intake pipe 42 by a throttle valve actuator 44a (a portion of throttle valve drive means) composed of a DC motor.

The exhaust system 50 includes an exhaust manifold 51 having a plurality of branch portions, whose one ends are connected to the exhaust ports 34 of the cylinders; an exhaust pipe 52 which is connected to a merging portion (exhaust merging portion HK of the exhaust manifold 51 shown in FIG. 1) of the exhaust manifold 51 where all of the other ends of a plurality of the branch portions merge together; an upstream catalyst 53 disposed in the exhaust pipe 52; and a unillustrated downstream catalyst disposed in the exhaust pipe 52 to be located downstream of the upstream catalyst 53. The exhaust ports 34, the exhaust manifold 51, and the exhaust pipe 52 constitute an exhaust passage. In this manner, the upstream catalyst 53 is disposed at the "position downstream of the exhaust merging portion HK where the exhaust gases discharged from all of the combustion chambers 25 (at lease two or more of the combustion chambers) merge" within the exhaust passage.

Each of the upstream catalyst 53 and the downstream catalyst is a so-called three-way catalyst unit (exhaust purifying catalyst) carrying/supporting an active component (a metal for an oxidation catalyst and a metal for a reducing catalyst) formed of a noble metal such as platinum. Each of the catalysts has a function of oxidizing unburned combustibles such as HC, CO, and $H_2$ and reducing nitrogen oxides (NOx) when the air-fuel ratio of gas flowing into each catalyst is the stoichiometric air-fuel ratio. This function is also called a "catalytic function." Further each of the catalysts has an oxygen storage function of occluding (storing) oxygen. This oxygen storage function enables removal of the unburned combustibles and the nitrogen oxides even when the air-fuel ratio deviates from the stoichiometric air-fuel ratio. This oxygen storage function is realized by ceria ($CeO_2$) or the like carried/supported by the catalyst.

Moreover, the engine 10 includes an EGR gas supply means (exhaust gas recirculation system). The EGR gas supply means includes an exhaust recirculation pipe 54 which constitutes an external EGR passage, and an EGR control valve 55.

As shown in FIG. 1, one end 54a of the exhaust recirculation pipe 54 is connected to the exhaust merging portion HK of the exhaust manifold 51, or to the exhaust pipe 52 at a position upstream of the upstream catalyst 53. As shown in FIG. 1, the other end of the exhaust recirculation pipe 54 branches into branch portions. The number of the branch portions is the same as that of the cylinders. An end of each of the branch portions is opened to form an EGR gas supply opening 54b. Each of a plurality of the EGR gas supply openings 54b is disposed at each of a plurality of the branch portions 41a of the intake manifold 41. That is, the EGR gas supply means comprises a plurality of the EGR gas supply openings 54b, each being disposed for each of the at least two or more of the cylinders (in the present example all of the cylinders) so as to supply an external EGR gas to each of the combustion chambers 25 through (via) EGR gas supply openings 54b. It should be noted that, hereinafter, an "EGR gas" simply means the external EGR gas.

The EGR control valve 55 is disposed in the exhaust recirculation pipe 54. The EGR control valve 55 contains a DC motor as a drive source. The EGR control valve 55 is designed to change an opening degree in response to a duty ratio DEGR which is an instruction signal for the DC motor, to thereby change the channel cross sectional area of the exhaust recirculation pipe 54. When the duty ratio DEGR is "0", the EGR control valve 55 completely closes the exhaust recirculation pipe 54. At this time, an EGR stop state in which the EGR gas is not supplied to the combustion chambers 25 is realized/accomplished. When the duty ratio DEGR is not "0", the EGR control valve 55 increases the channel cross sectional area of the exhaust recirculation pipe 54 as the duty ratio DEGR becomes larger. At this time, an EGR supplying state in which the EGR gas is supplied to the combustion chambers 25 is realized/accomplished.

Referring back to FIG. 5 again, this system includes a hot-wire air flowmeter 61, a throttle position sensor 62, a water temperature sensor 63, a crank position sensor 64, an intake-cam position sensor 65, an exhaust-cam position sensor 66, an upstream air-fuel ratio sensor 67, a downstream air-fuel ratio sensor 68, and an accelerator opening sensor 69.

The air flowmeter 61 outputs a signal representing the mass flow rate (intake air flow rate) Ga of intake air flowing through the intake pipe 42. That is, the intake air flow rate Ga represents the amount of air taken into the engine 10 per unit time.

The throttle position sensor 62 detects the opening of the throttle valve 44 (throttle valve opening), and outputs a signal representing the detected throttle valve opening TA.

The water temperature sensor 63 detects the temperature of cooling water of the internal combustion engine 10, and outputs a signal representing the detected cooling water temperature THW.

The crank position sensor 64 outputs a signal including a narrow pulse generated every time the crankshaft 24 rotates 10° and a wide pulse generated every time the crankshaft 24 rotates 360°. This signal is converted into an engine rotational speed NE by an electric controller 70, which will be described later.

The intake-cam position sensor 65 outputs a single pulse when the intake camshaft rotates 90 degrees from a predetermined angle, when the intake camshaft rotates 90 degrees after that, and when the intake camshaft further rotates 180 degrees after that. On the basis of the signals from the crank position sensor 64 and the intake-cam position sensor 65, the electric controller 70, which will be described later, obtains the absolute crank angle CA, while using, as a reference, a compression top dead center of a reference cylinder (e.g., the first cylinder). This absolute crank angle CA is set to a "0° crank angle" at the compression top dead center of the reference cylinder, increases up to a 720° crank angle in accordance with the rotational angle of the crank angle, and is again set to the "0° crank angle" at that point in time.

The exhaust-cam position sensor 66 outputs a single pulse when the exhaust camshaft rotates 90 degrees from a predetermined angle, when the exhaust camshaft rotates 90 degrees after that, and when the exhaust camshaft further rotates 180 degrees after that.

As shown in FIGS. 1 and 5, the upstream air-fuel ratio sensor 67 (the air-fuel ratio sensor in the present invention) is disposed in "either one of the exhaust manifold 51 and the exhaust pipe 52 (that is, the exhaust passage)" at a position between the merging portion (exhaust merging portion HK) of the exhaust manifold 51 and the upstream catalyst 53. The upstream air-fuel ratio sensor 67 is a "limiting-current-type wide range air-fuel ratio sensor including a diffusion resistance layer" disclosed in, for example, Japanese Patent Application Laid-Open (kokai) Nos. H11-72473, 2000-65782, and 2004-69547.

Figure 6:
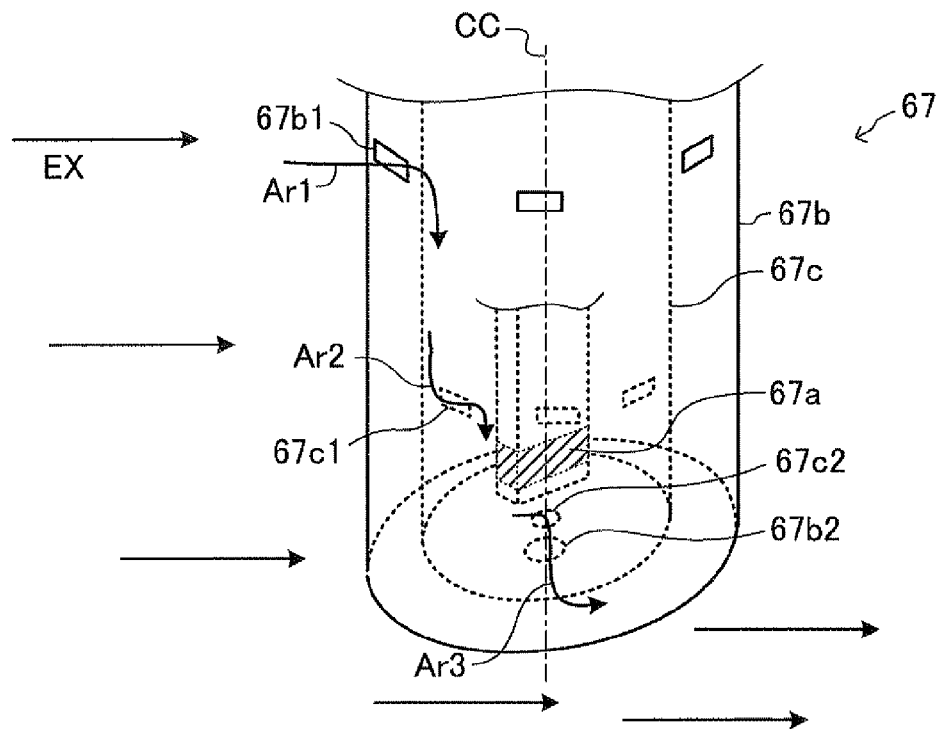
FIG. 6 is a partial schematic perspective view of the air-fuel ratio sensor (upstream air-fuel ratio sensor) shown in FIGS. 1 and 5.
Figure 7:
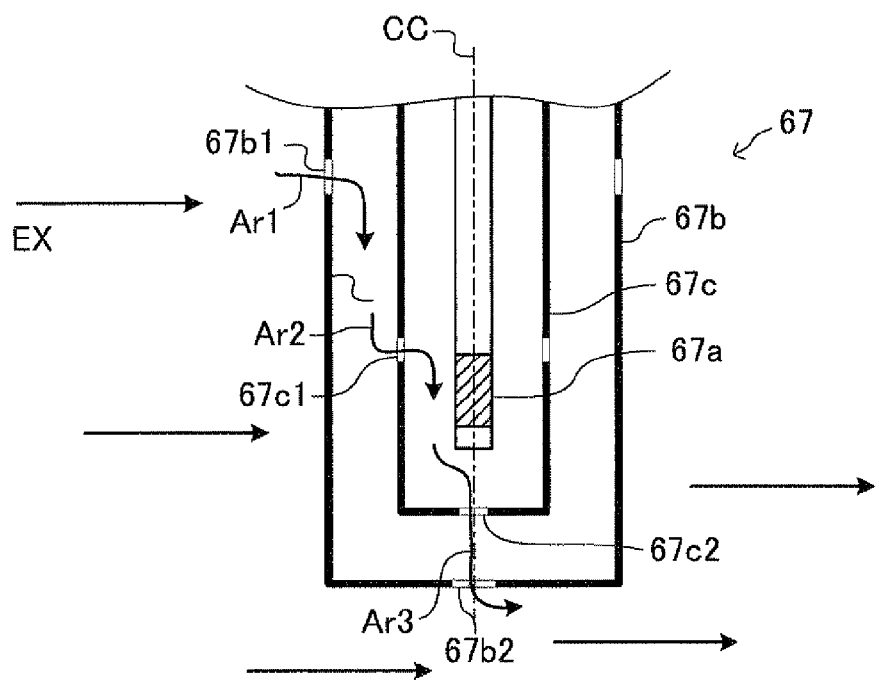
FIG. 7 is a partial sectional view of the air-fuel ratio sensor shown in FIGS. 1 and 5.

As shown in FIGS. 6 and 7, the air-fuel ratio sensor 67 includes an air-fuel ratio detection element 67*a*, an outer protective cover 67*b*, and an inner protective cover 67*c*.

The outer protective cover 67*b* is a hollow cylinder formed of metal. The outer protective cover 67*b* accommodates the inner protective cover 67*c* so as to cover it. The outer protective cover 67*b* has a plurality of inflow holes 67*b*1 formed in its peripheral wall. The inflow holes 67*b*1 are through holes for allowing the exhaust gas EX (the exhaust gas which is present outside the outer protective cover 67*b*) flowing through the exhaust passage to flow into the space inside the outer protective cover 67*b*. Further, the outer protective cover 67*b* has an outflow hole 67*b*2 formed in its bottom wall so as to allow the exhaust gas to flow from the space inside the outer protective cover 67*b* to the outside (exhaust passage).

The inner protective cover 67*c* formed of metal is a hollow cylinder whose diameter is smaller than that of the outer protective cover 67*b*. The inner protective cover 67*c* accommodates an air-fuel ratio detection element 67*a* so as to cover it. The inner protective cover 67*c* has a plurality of inflow holes 67*c*1 in its peripheral wall. The inflow holes 67*c*1 are through holes for allowing the exhaust gas—which has flowed into the "space between the outer protective cover 67*b* and the inner protective cover 67*c*" through the inflow holes 67*b*1 of the outer protective cover 67*b*—to flow into the space inside the inner protective cover 67*c*. In addition, the inner protective cover 67*c* has an outflow hole 67*c*2 formed in its bottom wall so as to allow the exhaust gas to flow from the space inside the inner protective cover 67*c* to the outside.

Figure 8:
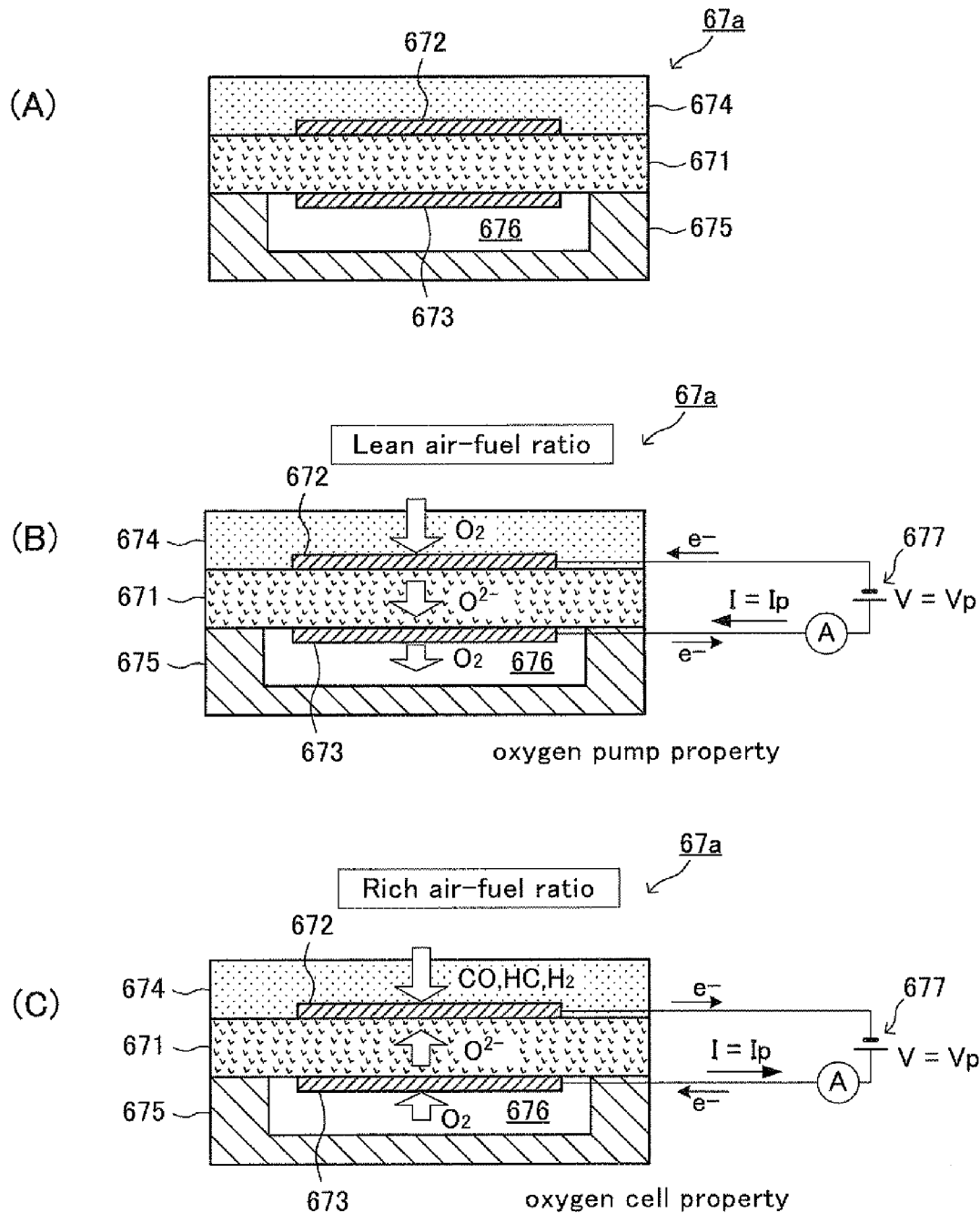
FIG. 8(A) to (C) of FIG. 8 are schematic sectional views of an air-fuel ratio detection element provided in the air-fuel ratio sensor shown in FIGS. 1 and 5.

As shown in (A) to (C) of FIG. 8, the air-fuel-ratio detection element 67*a* includes a solid electrolyte layer 671, an exhaust-gas-side electrode layer 672, an atmosphere-side electrode layer 673, a diffusion resistance layer 674, and a partition section 675.

The solid electrolyte layer 671 is formed of an oxygen-ion-conductive sintered oxide. In this embodiment, the solid electrolyte layer 671 is a "stabilized zirconia element" which is a solid solution of $ZrO_2$ (zirconia) and CaO (stabilizer). The solid electrolyte layer 671 exhibits an "oxygen cell property" and an "oxygen pump property," which are well known, when its temperature is equal to or higher an activation temperature thereof.

The exhaust-gas-side electrode layer 672 is formed of a noble metal having a high catalytic activity, such as platinum (Pt). The exhaust-gas-side electrode layer 672 is formed on one of surfaces of the solid electrolyte layer 671. The exhaust-gas-side electrode layer 672 is formed through chemical plating, etc. so as to exhibit a sufficient degree of permeability (that is, it is formed into a porous layer).

The atmosphere-side electrode layer 673 is formed of a noble metal having a high catalytic activity, such as platinum (Pt). The atmosphere-side electrode layer 673 is formed on the other of the surfaces of the solid electrolyte layer 671 in such a manner it faces the exhaust-gas-side electrode layer 672 across the solid electrolyte layer 671. The atmosphere-side electrode layer 673 is formed through chemical plating, etc. so as to exhibit adequate permeability (that is, it is formed into a porous layer).

The diffusion resistance layer (diffusion-controlling layer) 674 is formed of a porous ceramic material (heat-resistant inorganic material). The diffusion resistance layer 674 is formed through, for example, plasma spraying in such a manner that it covers the outer surface of the exhaust-gas-side electrode layer 672.

The partition section 675 is formed of dense and gas-nonpermeable alumina ceramic. The partition section 675 is configured so as to form an "atmospheric chamber 676" which accommodates the atmosphere-side electrode layer 673. Air is introduced into the atmospheric chamber 676.

A power supply 677 is connected to the upstream air-fuel ratio sensor 67. The power supply 677 applies a voltage V so that the atmosphere-side electrode layer 673 is held at a high potential and the exhaust-gas-side electrode layer 672 is held at a low potential.

As shown in (B) of FIG. 8, the air-fuel ratio sensor 67 having the above-mentioned structure ionizes the oxygen that has reached the exhaust-gas-side electrode layer 672 through the diffusion resistance layer 674, and leads the ionized oxygen to the atmosphere-side electrode layer 673, when the air-fuel ratio of the exhaust gas is leaner than the stoichiometric air-fuel ratio.

Figure 9:
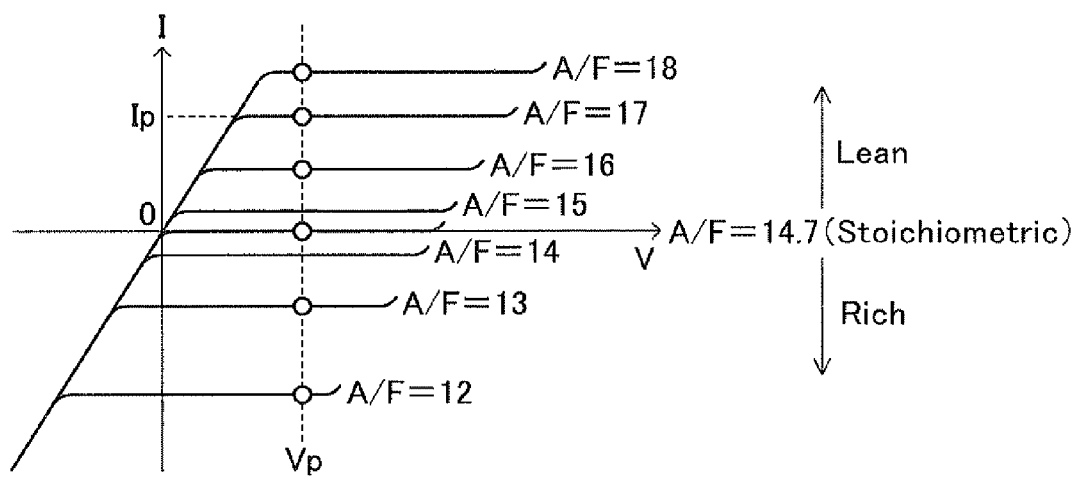
FIG. 9 is a graph showing the relation between the air-fuel ratio of exhaust gas and the limiting current of the air-fuel ratio sensor.

As a result, a current I flows from the positive terminal of the power supply 677 to the negative terminal of the power supply 677. As shown in FIG. 9, when the voltage V is set to a voltage higher than a predetermined voltage Vp, the magnitude of the current I becomes a constant value which is proportional to the concentration of the oxygen which has reached the exhaust-gas-side electrode layer 672 (the oxygen partial pressure, or the air-fuel ratio of the exhaust gas). The upstream air-fuel ratio sensor 67 converts this current (i.e., limiting current Ip) to a voltage value, and outputs it as an output value Vabyfs.

In contract, as shown in (C) of FIG. 8, when the air-fuel ratio of the exhaust gas is richer than the stoichiometric air-fuel ratio, the upstream air-fuel-ratio sensor 67 ionizes the oxygen in the atmospheric chamber 676 and leads the ionized oxygen to the exhaust-gas-side electrode layer 672 so as to oxidize the unburned substances (HC, CO, $H_2$, etc) which have reached the exhaust-gas-side electrode layer 672 through the diffusion resistance layer 674. As a result, a current I flows from the negative terminal of the power supply 677 to the positive terminal of the power supply 677.

As shown in FIG. 9, when the voltage V is set to the predetermined voltage Vp or higher, the magnitude of this current I also becomes a constant value which is proportional to the concentration of the unburned substances which have reached the exhaust-gas-side electrode layer 672 (i.e., the air-fuel ratio of the exhaust gas). The upstream air-fuel ratio sensor 67 converts this current (i.e., limiting current Ip) to a voltage value, and outputs it as an output value Vabyfs.

Figure 10:
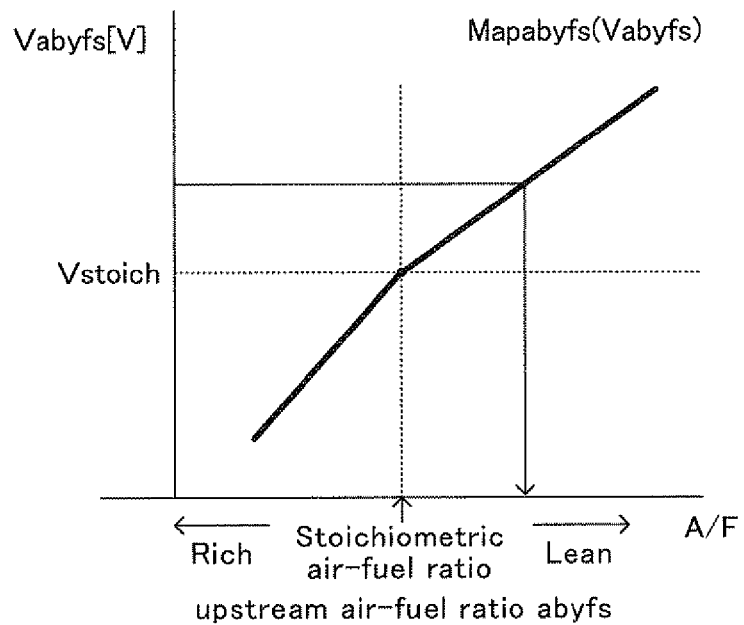
FIG. 10 is a graph showing the relation between the air-fuel ratio of exhaust gas and the output value of the air-fuel ratio sensor.

That is, as shown in FIG. 10, the air-fuel-ratio detection element 67*a* outputs, as an "air-fuel ratio sensor output," the output value Vabyfs corresponding to the air-fuel ratio (upstream air-fuel ratio abyfs, detected air-fuel ratio abyfs) of the gas which flows at the position where the air-fuel ratio sensor 67 is disposed and reaches the air-fuel-ratio detection element 67*a* through the inflow holes 67*b*1 of the outer protective cover 67*b* and the inflow holes 67*c*1 of the inner protective cover 67*c*. The output value Vabyfs increases as the air-fuel ratio of the gas reaching the air-fuel-ratio detection element 67a becomes larger (leaner). That is, the output value Vabyfs is substantially proportional to the air-fuel ratio of the exhaust gas reaching the air-fuel-ratio detection element 67a.

The electric controller 70 stores the air-fuel ratio conversion table (map) Mapabyfs shown in FIG. 10, and applies the output value Vabyfs of the air-fuel ratio sensor 67 to the air-fuel ratio conversion table Mapabyfs so as to detect the actual upstream air-fuel ratio (or to obtain the detected air-fuel ratio abyfs).

Meanwhile, the upstream air-fuel ratio sensor 67 is disposed in such a manner that the outer protective cover 67b is exposed in either the exhaust manifold 51 or the exhaust pipe 52, at a position between the merging portion (exhaust merging portion HK) where a plurality of the branch portions of the exhaust manifold 51 merge and the upstream catalyst 53.

More specifically, as shown in FIGS. 6 and 7, the air-fuel ratio sensor 67 is disposed in the exhaust passage in such a manner that the bottom surface of the protective cover (67b, 67c) is parallel to a flow of the exhaust gas EX, and a center axis CC of the protective covers (67b, 67c) is perpendicular to the flow of the exhaust gas EX. Accordingly, the exhaust gas EX within the exhaust passage which has reached the inflow hole 67b1 of the outer protective cover 67b is sucked into the inside of the outer protective cover 67b and the inner protective cover 67c owing to the flow (stream) of the exhaust gas EX flowing in the vicinity of the outflow holes 67b2 of the outer protective cover 67b.

Accordingly, the exhaust gas EX flowing through the exhaust gas passage flows into a space between the outer protective cover 67b and the inner protective cover 67c via inflow holes 67b1 of the outer protective cover 67b, as shown by an arrow Ar1 in FIGS. 6 and 7. Subsequently, the exhaust gas, as shown by an arrow Ar2, flows into the inside of the inner protective cover 67c via the inflow holes 67c1 of the inner protective cover 67c, and thereafter, reaches the air-fuel ratio detection element 67a. Then, the exhaust gas, as shown by an arrow Ar3, flows out to the exhaust gas passage via the outflow holes 67c2 of the inner protective cover 67c and the outflow holes 67b2 of the outer protective cover 67b.

Thus, a flow rate of the exhaust gas in "the outer protective cover 67b and inner protective cover 67c" varies depending on the flow rate of the exhaust gas EX flowing in the vicinity of the outflow holes 67b2 of the outer protective cover 67b (and accordingly, depending on the intake air-flow rate Ga which is the intake air amount per unit time). In other words, a time duration from a "point in time at which an exhaust gas having a specific air-fuel ratio (first exhaust gas) reaches the inflow holes 67b1" to a "point in time at which the first exhaust gas reaches the air-fuel ratio detection element 67a" depends on the intake air-flow rate Ga, but does not depend on the engine rotational speed NE. This can be true even in a case in which the upstream air-fuel ratio sensor 67 has the inner protective cover 67c only.

Referring back to FIG. 5, the downstream air-fuel ratio sensor 68 is disposed in the exhaust pipe 52, at a position downstream of the upstream catalyst 53 and upstream of the downstream catalyst (i.e., in the exhaust passage between the upstream catalyst 53 and the downstream catalyst). The downstream air-fuel ratio sensor 68 is a well-known electromotive-force-type oxygen concentration sensor (well-known concentration-cell-type oxygen concentration sensor using stabilized zirconia). The downstream air-fuel ratio sensor 68 is designed to generate an output value Voxs corresponding to the air-fuel ratio of a gas to be detected; i.e., the gas which flows through a portion of the exhaust passage where the downstream-side air-fuel ratio sensor 68 is disposed (that is, the air-fuel ratio of the gas which flows out of the upstream catalyst 53 and flows into the downstream catalyst; namely, the time average of the air-fuel ratio of the air-fuel mixture supplied to the engine).

Figure 11:
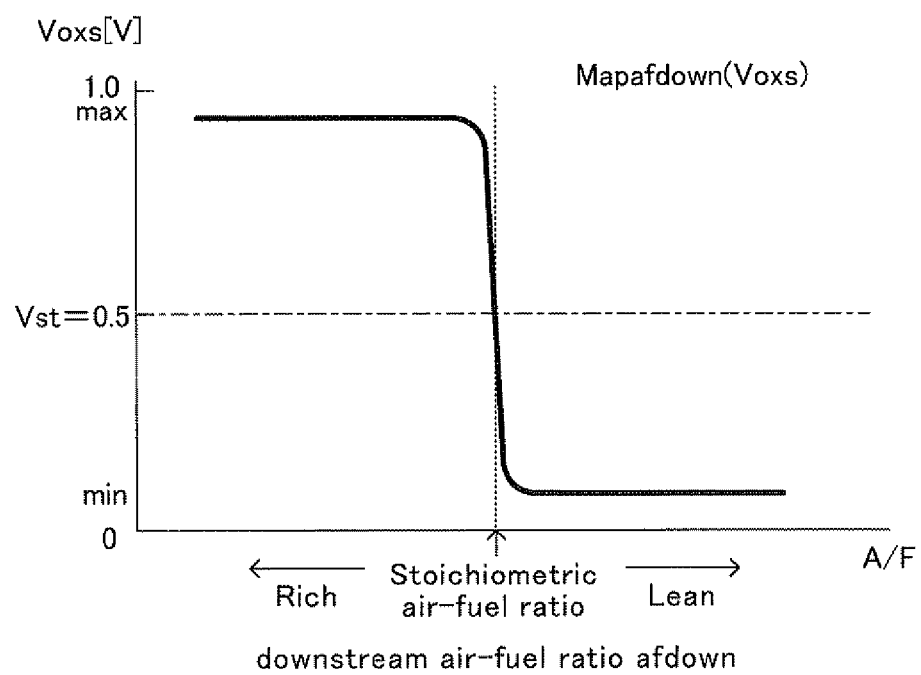
FIG. 11 is a graph showing the relation between the air-fuel ratio of exhaust gas and an output value of the downstream air-fuel ratio sensor shown in FIGS. 1 and 5.

As shown in FIG. 11, this output value Voxs becomes a "maximum output value max (e.g., about 0.9 V)" when the air-fuel ratio of the exhaust gas to be detected is richer than the stoichiometric air-fuel ratio, becomes a "minimum output value min (e.g., about 0.1 V) when the air-fuel ratio of the exhaust gas to be detected is leaner than the stoichiometric air-fuel ratio, and becomes a voltage Vst (midpoint voltage Vst, e.g., about 0.5 V) which is approximately the midpoint value between the maximum output value max and the minimum output value min when the air-fuel ratio of the exhaust gas to be detected is the stoichiometric air-fuel ratio. Further, this voltage Vox changes suddenly from the maximum output value max to the minimum output value min when the air-fuel ratio of the exhaust gas to be detected changes from the air-fuel ratio richer than the stoichiometric air-fuel ratio to the air-fuel ratio leaner than the stoichiometric air-fuel ratio, and changes suddenly from the minimum output value min to the maximum output value max when the air-fuel ratio of the exhaust gas to be detected changes from the air-fuel ratio leaner than the stoichiometric air-fuel ratio to the air-fuel ratio richer than the stoichiometric air-fuel ratio. Accordingly, the voltage Vst is the output value Vox corresponding to the stoichiometric air-fuel ratio.

The accelerator opening sensor 69 shown in FIG. 5 is designed to output a signal which indicates the operation amount Accp of the accelerator pedal 81 operated by the driver (accelerator pedal operation amount Accp). The accelerator pedal operation amount Accp increases as the opening (accelerator pedal operation amount) of the accelerator pedal 81 becomes larger.

The electric controller 70 is a well-known microcomputer which includes "a CPU 71; a ROM 72 in which a program executed by the CPU 71, tables (maps and/or functions), constants, etc. are stored in advance; a RAM 73 in which the CPU 71 temporarily stores data as needed; a backup RAM 74; and an interface 75 which includes an AD converter, etc", that are mutually connected via a bus.

The backup RAM 74 is supplied with an electric power from a battery mounted on a vehicle on which the engine 10 is mounted, regardless of a position (off-position, start position, on-position, and so on) of an unillustrated ignition key switch of the vehicle. While the electric power is supplied to the backup RAM 74, data is stored in (written into) the backup RAM 74 according to an instruction of the CPU 71, and the backup RAM 74 holds (retains, stores) the data in such a manner that the data can be read out. When the battery is taken out from the vehicle, and thus, when the backup RAM 74 is not supplied with the electric power, the backup RAM 74 can not hold the data. Accordingly, the CPU 71 initializes the data (sets the data to default values) to be stored in the backup RAM 74 when the electric power starts to be supplied to the backup RAM 74 again.

The interface 75 is connected to sensors 61 to 69 so as to send signals from these sensors to the CPU 71. In addition, the interface 75 is designed to send drive signals (instruction signals) to an actuator 33a of a variable intake timing controller 33, an actuator 36a of a variable exhaust timing controller 36, each of igniters 38 of the cylinders, fuel injection valves 39 each of which is provided for each of the cylinders, a throttle valve actuator 44a, an EGR control valve 55, etc. in response to instructions from the CPU 71.

The electric controller 70 is designed to send an instruction signal to the throttle valve actuator 44a so that the throttle valve opening TA increases as the obtained accelerator pedal operation amount Accp increases. That is, the electric controller 70 has throttle valve drive means for changing the opening of the "throttle valve 44 disposed in the intake passage of the engine 10" in accordance with the acceleration operation amount (accelerator pedal operation amount Accp) of the engine 10 which is changed by the driver.

(Outline of Operations of the Inter-Cylinder Air-Fuel Ratio Imbalance Determination Apparatus)

Next, there will be described the outline of operations of the "inter-cylinder air-fuel ratio imbalance determination" which is adopted/used by the first determining apparatus and the other determining apparatuses according to the other embodiments (hereinafter, referred to as "first determining apparatuses etc.").

The first determining apparatuses etc. comprises a plurality of EGR gas supply openings 54b. Therefore, when one of a plurality of EGR gas supply openings 54b is clogged under the EGR supplying state, the EGR gas is not supplied to a cylinder corresponding to the EGR gas supply opening which is clogged. Accordingly, an amount of an air (fresh air) supplied to that cylinder becomes larger than that of an air supplied to the other cylinder by an amount corresponding to the EGR gas which is to be supplied to that cylinder. Meanwhile, as long as the fuel injection valves 39 are normal, an amount of a fuel injected from each of the fuel injection valves 39, each disposed for each of the cylinders, is substantially equal to each other. As a result, an air-fuel ratio of a mixture supplied to that cylinder corresponding to the EGR gas supply opening which is clogged deviates/changes toward a lean side compared to air-fuel ratios of mixtures supplied to the other cylinders. That is, an inter-cylinder air-fuel ratio imbalance state due to the EGR gas (an EGR-causing inter-cylinder air-fuel ratio imbalance state) occurs.

In view of the above, the first determining apparatuses etc. obtain, based on the output value Vabyfs of the air-fuel ratio sensor 67, an "EGR supplying state imbalance determination parameter whose absolute value becomes larger as the cylinder-by-cylinder air-fuel ratio difference becomes larger" when the EGR supplying state is being realized, and an "EGR stop state imbalance determination parameter whose absolute value becomes larger as the cylinder-by-cylinder air-fuel ratio difference becomes larger" when the EGR stop state is being realized.

The EGR stop state imbalance determination parameter is a "value varying depending on a change amount of a detected air-fuel ratio abyfs represented by the output value Vabyfs of the air-fuel ratio sensor 67 per unit time (a constant sampling time ts)" in the case where the EGR stop state is being realized (i.e., the case where the EGR gas is not being supplied to the combustion chambers 25).

The EGR supplying state imbalance determination parameter is a "value varying depending on a change amount of the detected air-fuel ratio abyfs represented by the output value Vabyfs of the air-fuel ratio sensor 67 per unit time (a constant sampling time ts)" in the case where the EGR supplying state is being realized (i.e., the case where the EGR gas is being supplied to the combustion chambers 25).

The detected air-fuel ratio abyfs represented by the output value Vabyfs of the air-fuel ratio sensor 67 is the air-fuel ratio obtained by applying the output value Vabyfs to the air-fuel ratio conversion table Mapabyfs shown in FIG. 10. The "change amount of the detected air-fuel ratio abyfs per unit time" can be said as (to be) a time differential value d(abyfs)/dt of the detected air-fuel ratio abyfs, if the unit time is very short, e.g., about 4 ms. Accordingly, the "change amount of the detected air-fuel ratio abyfs per unit time" will also simply be referred to as a "differential value d(Vabyfs)/dt of the detected air-fuel ratio abyfs" or a "detected air-fuel ratio change rate ΔAF."

Further, the first determining apparatuses etc. obtains an EGR-causing imbalance determination parameter varying depending on (in accordance with) a degree of a difference between the EGR supplying state imbalance determination parameter and the EGR stop state imbalance determination parameter, compares the obtained EGR-causing imbalance determination parameter with a EGR-causing imbalance determination threshold, and determines whether or not the inter-cylinder air-fuel ratio imbalance state has occurred based on the result of the comparison.

Further, the first determining apparatuses etc, determines whether or not the inter-cylinder air-fuel ratio imbalance state has occurred based on a result of a comparison between the EGR supplying state imbalance determination parameter and a predetermined EGR supplying state imbalance determination threshold, and determines whether or not the inter-cylinder air-fuel ratio imbalance state has occurred based on a result of a comparison between the EGR stop state imbalance determination parameter and a predetermined EGR stop state imbalance determination threshold.

In the mean time, the above-described differential value d(abyfs)/dt is a parameter whose absolute value becomes larger as the cylinder-by-cylinder air-fuel ratio difference becomes larger. This point will next be described.

Exhaust gases from individual cylinders reach the air-fuel ratio sensor 67 in the order of ignition (namely, in the order of exhaust). If the inter-cylinder air-fuel ratio imbalance state has not being occurring (if the cylinder-by-cylinder air-fuel ratio difference is small), the air-fuel ratios of the exhaust gases which are discharged from the respective cylinders and reach the air-fuel ratio sensor 67 are almost the same to each other. Accordingly, when the inter-cylinder air-fuel ratio imbalance state has not being occurring, the detected air-fuel ratio abyfs represented by the output value Vabyfs of the air-fuel ratio sensor 67 changes, for example, as indicated by the broken line C1 in (B) of FIG. 12. That is, when the inter-cylinder air-fuel ratio imbalance state has not being occurring, the waveforms of the output value Vabyfs of the air-fuel ratio sensor 67 and the detected air-fuel ratio abyfs are nearly flat. Thus, as shown by the broken line C3 in (C) of FIG. 12, when the inter-cylinder air-fuel ratio imbalance state has not being occurring, an absolute value of the detected air-fuel ratio change rate ΔAF is small.

Meanwhile, when only an air-fuel ratio of a specific cylinder greatly deviates from the stoichiometric air-fuel ratio, an air-fuel ratio of an exhaust gas of the specific cylinder (air-fuel ratio of the imbalanced cylinder) is greatly different from air-fuel ratios of exhaust gases of cylinders other than the specific cylinder (air-fuel ratio of the balanced cylinder). That is, the cylinder-by-cylinder air-fuel ratio difference becomes larger.

Figure 12:
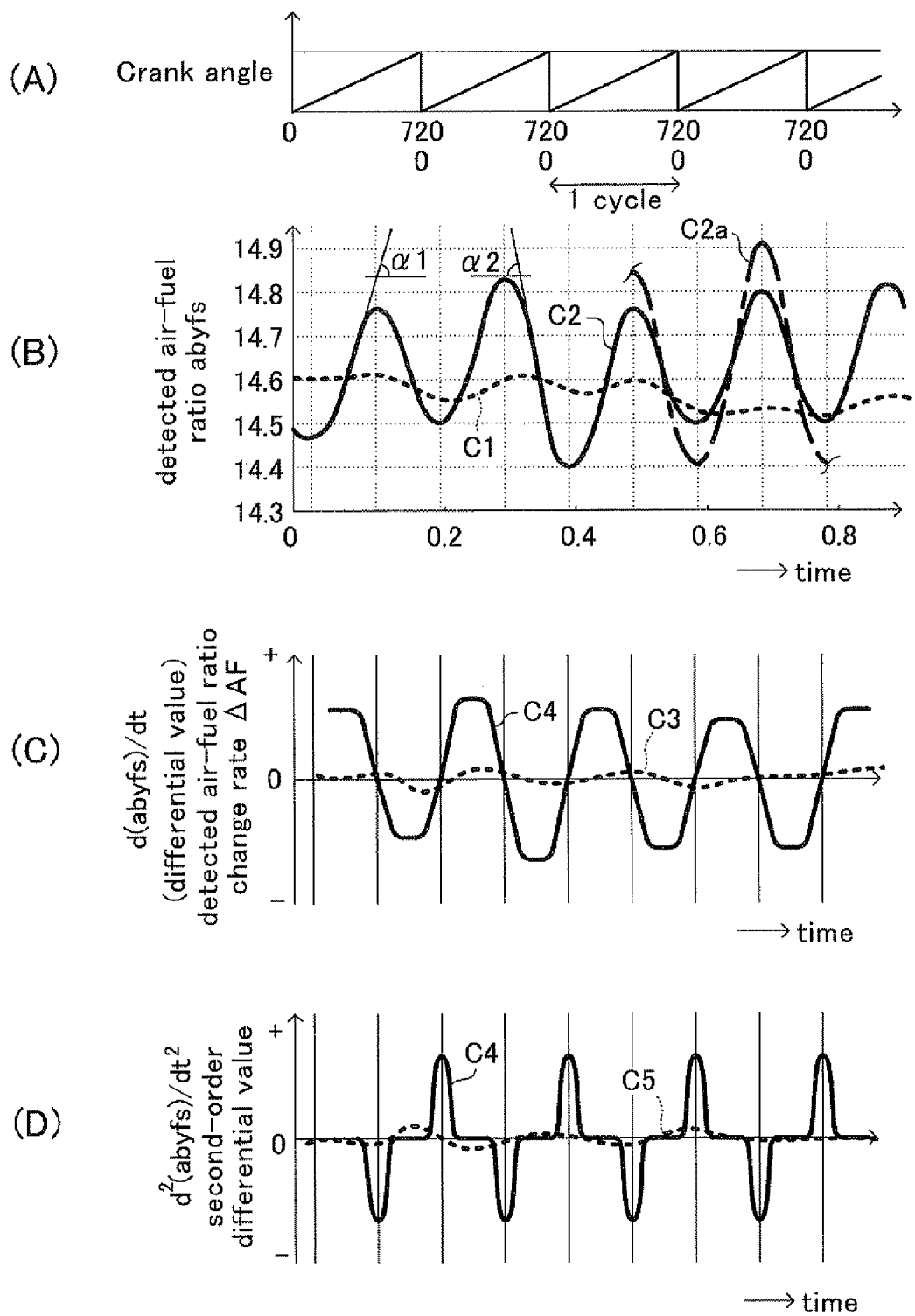
FIG. 12 is a time chart showing "behaviors of values relating the imbalance determination parameter", when the inter-cylinder air-fuel ratio imbalance state has been occurring and the inter-cylinder air-fuel ratio imbalance state has not been occurring.

Accordingly, the detected air-fuel ratio abyfs (and the output value Vabyfs) when the inter-cylinder air-fuel-ratio imbalance state is occurring changes/fluctuates greatly, at intervals corresponding to a crank angle of 720° (a crank angle required for the engine to complete one combustion stroke in every and all of the cylinders that are the first to fourth cylinders, which discharge exhaust gases reaching the single air-fuel ratio sensor 67) in a case where the engine is a four-cylinder four-cycle type, for example, as indicated by a solid line C2 in (B) of FIG. 12. Therefore, as shown by the solid line C4 in (C) of FIG. 12, when the inter-cylinder air-fuel-ratio imbalance state is occurring, the absolute value of the detected air-fuel ratio change rate ΔAF becomes large.

Furthermore, the detected air-fuel ratio abyfs fluctuates more greatly as the air-fuel ratio of the imbalanced cylinder deviates more from the air-fuel ratio of the balanced cylinder. For example, if the detected air-fuel ratio abyfs changes as indicated by the solid line C2 in (B) of FIG. 12 when a magnitude of a difference between the air-fuel ratio of the imbalanced cylinder and the air-fuel ratio of the balanced cylinder is a first value, the detected air-fuel ratio abyfs changes as indicated by the alternate long and short dash line C2a in (B) of FIG. 12 when the magnitude of the difference between the air-fuel ratio of the imbalanced cylinder and the air-fuel ratio of the balanced cylinder is a "second value larger than the first value." Accordingly, the absolute value of the detected air-fuel ratio change rate $\Delta AF$ (differential value d(abyfs)/dt) becomes larger as the air-fuel ratio of the imbalanced cylinder deviates more greatly from the air-fuel ratio of the balanced cylinder (i.e., as the cylinder-by-cylinder air-fuel ratio difference becomes larger).

In view of the above, the first determining apparatuses etc. obtains, as the imbalance determination parameter (the EGR supplying state imbalance determination parameter and the EGR stop state imbalance determination parameter), an "air-fuel ratio change rate indicating amount varying depending on (in accordance with) the detected air-fuel ratio change rate $\Delta AF$." The air-fuel ratio change rate indicating amount is, for example, an absolute value of the detected air-fuel ratio change rate $\Delta AF$ which is obtained every time the sampling time is elapses, an average of the absolute values of a plurality of the detected air-fuel ratio change rates $\Delta AF$, a maximum value among the absolute values of a plurality of the detected air-fuel ratio change rates $\Delta AF$, and the like. It should be noted that the first determining apparatuses etc. may be configured so as to obtain, as the imbalance determination parameter, a parameter other than those, as described later.

Meanwhile, the cylinder-by-cylinder air-fuel ratio difference becomes large when a state has occurred where the injection valve 39 injects the fuel in an amount excessively larger or smaller than the instructed fuel injection amount. Thus, the absolute value of the detected air-fuel ratio change rate $\Delta AF$ which is the differential value d(abyfs)/dt becomes large.

On one hand, as described before, when one of a plurality of the EGR gas supply openings 54b is clogged, an amount of the air (fresh air) supplied to that cylinder becomes larger than that of the air supplied to the other cylinder by the amount corresponding to the EGR gas which is to be supplied to that cylinder, under the EGR supplying state.

On the other hand, as long as the fuel injection valves 39, each of which is provided for each of the cylinders, are normal, an amount of the fuel injected from each of the fuel injection valves is substantially equal to each other. As a result, an air-fuel ratio of the mixture supplied to the cylinder corresponding to the clogged EGR gas supply opening 54b deviates/changes toward a lean side compared to air-fuel ratios of mixtures supplied to the other cylinders, under the EGR supplying state. That is, the inter-cylinder air-fuel ratio imbalance state due to the EGR gas occurs.

However, it is not easy to determine whether or not the inter-cylinder air-fuel ratio imbalance state due to the EGR gas occurs based on a simple comparison between the above-described air-fuel ratio change rate indicating amount and a threshold.

The reason for this is that there must inevitably be an individual difference (individual specificity) among internal combustion engines including a mixture supply system (e.g., shapes of the intake ports, and fuel injection property of each fuel injection valve). Accordingly, the cylinder-by-cylinder air-fuel ratio difference is not equal to 0, even when the EGR gas supplying means is in the EGR normal state (i.e., all of the EGR gas supply openings 54b are normal). Therefore, even when the EGR gas supplying means is in the EGR normal state, the cylinder-by-cylinder air-fuel ratio difference of a vehicle A on which a specific type of an internal combustion engine is mounted is not necessarily equal to that of a vehicle B on which the same specific type of an internal combustion engine is mounted.

Figure 2:
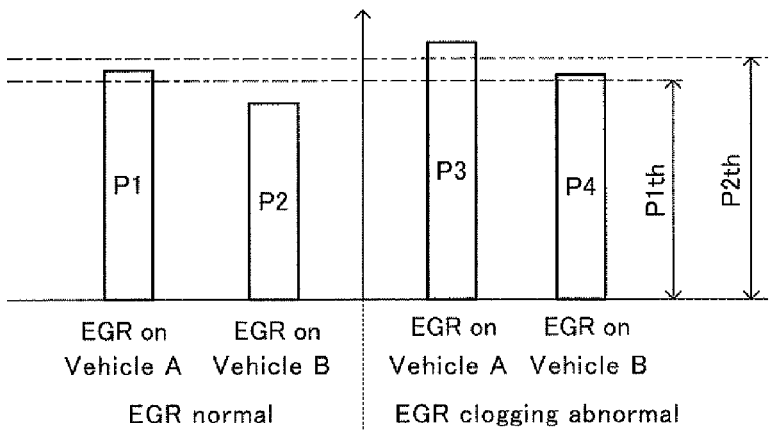
FIG. 2 is a graph showing "imbalance determination parameters under an EGR normal state and imbalance determination parameters under an EGR abnormal state" that are obtained during an EGR supplying state, in two vehicles different from each other.

That is, as shown in FIG. 2, even when the EGR gas supplying means is in the EGR normal state, the "imbalance determination parameter P1 of the vehicle A in the EGR supplying state" does not coincide with the "imbalance determination parameter P2 of the vehicle B in the EGR supplying state,"

When the "EGR abnormal states in which one of the EGR gas supply openings 54b is clogged" has occurred, in each of the vehicle A and the vehicle B, the imbalance determination parameters change into the parameters P3 and P4, respectively. As described before, the imbalance determination parameter becomes larger, when the EGR abnormal state occurs. Accordingly, in the vehicle A, the imbalance determination parameter P3 becomes larger than the imbalance determination parameter P1. Similarly, in the vehicle B, the imbalance determination parameter P4 becomes larger than the imbalance determination parameter P2.

However, since an EGR rate is not so large, a change amount in the cylinder-by-cylinder air-fuel ratio difference is small when a state has changed from the EGR normal state to the EGR abnormal state, compared with the case in which the property of the fuel injection valve 39 for the specific cylinder has changed. Consequently, as shown in FIG. 2, there arises a case in which the imbalance determination parameter P4 of the vehicle B which is obtained in the EGR abnormal state is smaller than the imbalance determination parameter P1 of the vehicle A which is obtained under the EGR normal state.

In this case, when the threshold value for imbalance determination is set at (to) a value Pith slightly smaller than the imbalance determination parameter P4, an erroneous determination that the inter-cylinder air-fuel ratio imbalance state has occurred is made in the vehicle A under the EGR normal state. When the threshold value for imbalance determination is set at (to) a "value P2th, which is larger than the value Pith and slightly smaller than the imbalance determination parameter P3" in order avoid such an erroneous determination, another erroneous determination that the inter-cylinder air-fuel ratio imbalance state has not occurred is made in the vehicle B under the EGR abnormal state.

In view of the above, the present inventor focuses on a difference between the EGR supplying state imbalance determination parameter and the EGR stop state imbalance determination parameter in a certain vehicle. Since the EGR stop state imbalance determination parameter is an imbalance determination parameter obtained when the EGR gas is not being supplied (under the EGR stop state). Therefore, the EGR stop state imbalance determination parameter is a value reflecting (depending on) the cylinder-by-cylinder air-fuel ratio difference due to (caused by) the above-described individual difference of the engine 10. In contrast, the EGR supplying state imbalance determination parameter is a value obtained when the "cylinder-by-cylinder air-fuel ratio difference caused by the EGR abnormal state" is superimposed on the cylinder-by-cylinder air-fuel ratio difference due to the individual difference of the engine 10.

Figure 3:
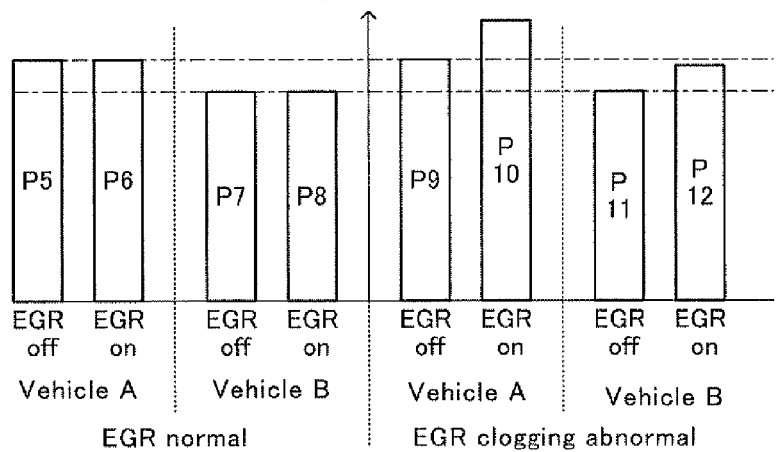
FIG. 3 is a graph showing "imbalance determination parameters under the EGR normal state and imbalance determination parameters under the EGR abnormal state" that are obtained during the EGR supplying state and the EGR stop state, respectively, in the two vehicles different from each other.
Figure 4:
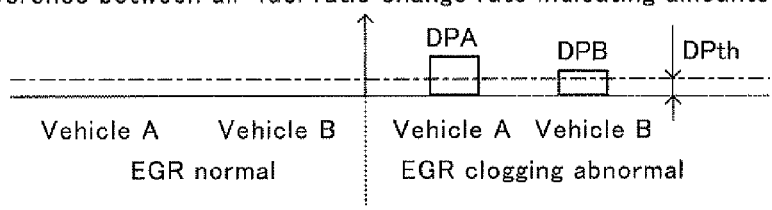
FIG. 4 is a graph showing EGR-causing imbalance determination parameters that are obtained during the EGR supplying state and the EGR stop state, respectively, in the two vehicles different from each other.

That is, as shown in a left half side of each of FIGS. 3 and 4, when the EGR abnormal state has not occurred, a difference between the EGR supplying state imbalance determination parameter and the EGR stop state imbalance determination parameter is nearly "0" regardless of the vehicle. In contrast, as shown in a right half side of each of FIGS. 3 and 4, when the EGR normal state has not occurred, the difference between the EGR supplying state imbalance determination parameter and the EGR stop state imbalance determination parameter becomes larger than a certain value DPth.

In view of the above, the first determining apparatuses etc. obtains the EGR stop state imbalance determination parameter Poff and the EGR supplying state imbalance determination parameter Pon, and obtains an EGR-causing imbalance determination parameter Pegr (e.g., |Pon−Poff|, (Pon/Poff), and the like) which varies depending on (in accordance with) a degree of the difference between the obtained EGR supplying state imbalance determination parameter Pon and the obtained EGR stop state imbalance determination parameter Poff.

Further, the first determining apparatuses etc. compares the EGR-causing imbalance determination parameter Pegr with a predetermined EGR-causing imbalance determination threshold Pegrth (=DPth), and determines whether or not the inter-cylinder air-fuel ratio imbalance state due to the EGR gas has occurred based on the result of the comparison. These are the principle of the first determining apparatuses etc. for the inter-cylinder air-fuel ratio imbalance determination.

It should be noted that the first determining apparatuses etc. also determines whether or not the cylinder-by-cylinder air-fuel ratio difference is excessively large due to factors (e.g., change in the injection property of the fuel injection valve 39) other than the non-uniformity of the amount of the EGR gas supplied to each of the cylinders. Specifically, they determine that the inter-cylinder air-fuel-ratio imbalance state has occurred, when the EGR stop state imbalance determination parameter Poff becomes equal to or larger than an EGR stop state imbalance determination threshold and/or when the EGR supplying state imbalance determination parameter Pon becomes equal to or larger than an EGR supplying state imbalance determination threshold.

(Actual Operation)
<Fuel Injection Amount Control>

Figure 13:
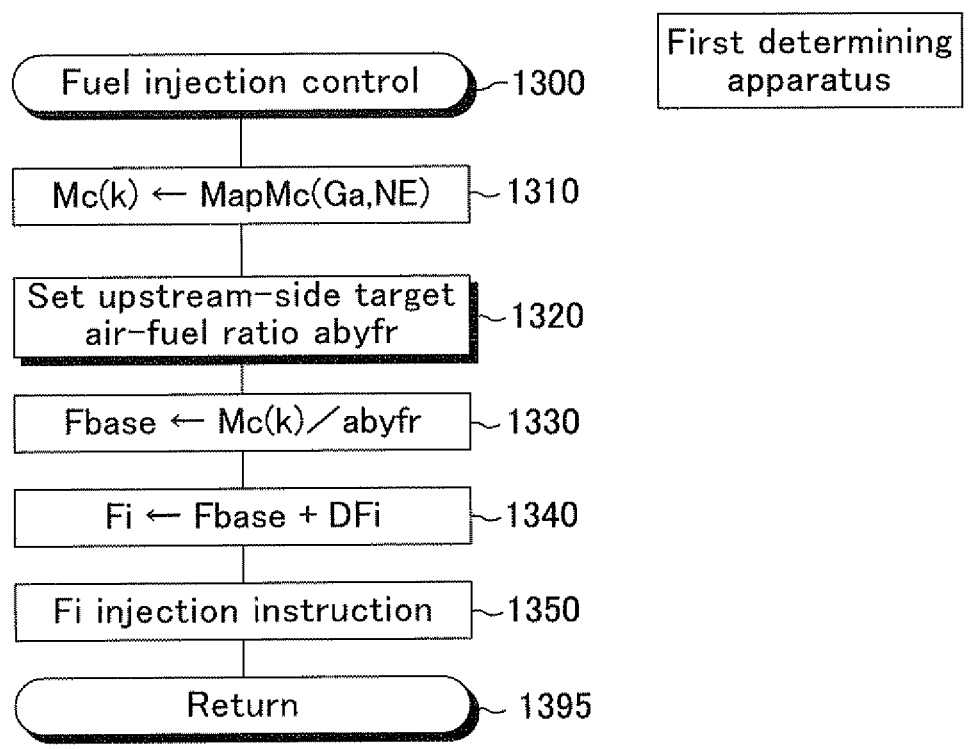
FIG. 13 is a flowchart showing a routine executed by a CPU of an inter-cylinder air-fuel ratio imbalance determination apparatus (first determination apparatus) according to a first embodiment of the present invention.

The CPU 71 of the first determination apparatus is designed to repeatedly execute a "routine for calculating the instructed fuel injection amount Fi and for instructing a fuel injection" shown in FIG. 13 for an arbitrary cylinder (hereinafter also referred to as a "fuel injection cylinder") each time the crank angle of that cylinder reaches a predetermined crank angle before an intake top dead center (e.g., BTDC 90° CA). Accordingly, when the predetermined timing comes, the CPU 71 starts processing from step 1300 to execute steps 1320 to 1350 (which will be described below) one after another, and then proceeds to step 1395 to end the present routine tentatively.

Step 1310: The CPU 71 obtains an "in-cylinder intake air amount Mc(k)", namely, the "amount of air taken into the fuel injection cylinder", on the basis of the "intake air flow rate Ga measured using the air flow meter 61, the engine rotational speed NE obtained on the basis of the signal from the crank position sensor 64, and a lookup table MapMc." The in-cylinder intake air amount Mc(k) in each intake stroke is stored with information specifying that intake stroke in the RAM. The in-cylinder intake air amount Mc(k) may be computed from a well-known air model (a model established in conformity with a physical law simulating the behavior of air in the intake passage).

Step 1320: The CPU 71 sets an upstream-side target air-fuel ratio abyfr in accordance with the operation state of the engine 10. The first determination apparatus sets the upstream-side target air-fuel ratio abyfr to the stoichiometric air-fuel ratio stoich except for special cases.

Step 1330: The CPU 71 obtains a basic fuel injection amount Fbase through dividing the in-cylinder intake air amount Mc(k) by the upstream-side target air-fuel ratio abyfr. Accordingly, the basic fuel injection amount Fbase is a feed-forward amount for the fuel injection amount which is required for realizing/achieving the upstream-side target air-fuel ratio abyfr (stoichiometric air-fuel ratio).

Step 1340: The CPU 71 corrects the basic fuel injection amount Fbase on the basis of a main feedback amount DFi. More specifically, the CPU 71 computes an instructed fuel injection amount (final fuel injection amount) Fi by adding the main feedback amount DFi to the basic fuel injection amount Fbase. The main feedback amount DFi will be described later.

Step 1350: The CPU 71 sends the injection instruction signal to the fuel injection valve 39 provided for the fuel injection cylinder, so that fuel of the instructed injection amount Fi is injected from that fuel injection valve 39.

<Computation of the Main Feedback Amount>

Figure 14:
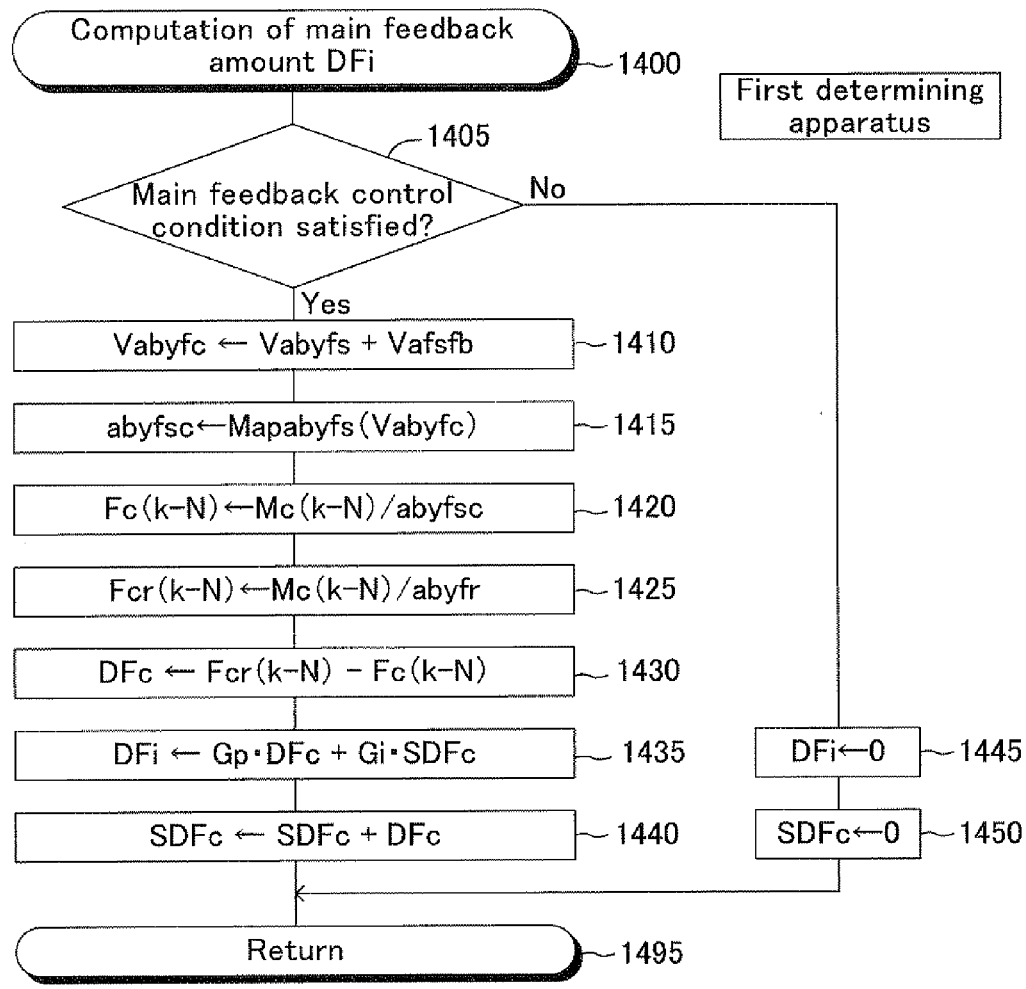
FIG. 14 is a flowchart showing another routine executed by the CPU of the first determination apparatus.

The CPU 71 repeatedly executes a "main feedback amount computation routine" shown by a flowchart of FIG. 14 each time a predetermined time elapses. Accordingly, when the predetermined timing comes, the CPU 71 starts processing from step 1400, and proceeds to step 1405 to determine whether or not a "main feedback control condition (upstream-side air-fuel ratio feedback control condition)" is satisfied.

The main feedback control condition is satisfied when all of the following conditions are satisfied:
(A1) The upstream air-fuel ratio sensor 67 has been activated.
(A2) An engine load (load factor) KL is equal to or smaller than a threshold KLth.
(A3) Fuel cut control is not being performed.

In the present embodiment, the load factor KL is obtained in accordance with the formula (1) given below. An accelerator pedal operation amount Accp may be used instead of the load factor KL. In the formula (1), Mc is the in-cylinder intake air amount, $\rho$ is the density of air (unit: g/l), L is the displacement of the engine 10 (unit: l), "4" is the number of the cylinders of the engine 10.

$$KL=(Mc/(\rho \cdot L/4)) \cdot 100\% \qquad (1)$$

A description will be continued on the assumption that the main feedback control condition is satisfied. In this case, the CPU 71 makes a "Yes" determination at step 1405 to execute processes from steps 1410 to 1440 described below one after another, and then proceeds to step 1495 to end the present routine tentatively.

Step 1410: The CPU 71 obtains an output value Vabyfc for a feedback control, according to a formula (2) described below. In the formula (2), Vabyfs is the output value of the upstream air-fuel ratio sensor 67, Vafsfb is the sub feedback amount calculated based on the output value Voxs of the downstream air-fuel ratio sensor 68. These values are values that are currently obtained. The way by which the sub feedback amount Vafsfb is calculated is well known. For example, the sub feedback amount Vafsfb is decreased when the output value Voxs of the downstream air-fuel ratio sensor 68 is a value indicating an air-fuel ratio richer than the stoichiometric air-fuel ratio corresponding to the value Vst, and is increased when the output value Voxs of the downstream air-fuel ratio sensor 68 is a value indicating an air-fuel ratio leaner than the stoichiometric air-fuel ratio corresponding to the value Vst. Note that the first determining apparatus may set the sub feedback amount Vafsfb to (at) "0".

$$Vabyfc=Vabyfs+Vafsfb \qquad (2)$$

Step 1415: The CPU 71 obtains an air-fuel ratio abyfsc for a feedback control by applying the output value Vabyfc for a feedback control to the table Mapabyfs shown in FIG. 10, as shown by a formula (3) described below.

$$abyfsc = Mapabyfs(Vabyfc) \quad (3)$$

Step 1420: According to a formula (4) described below, the CPU 71 obtains a "cylinder fuel supply amount Fc(k−N)" which is an "amount of the fuel actually supplied to the combustion chamber 25 for a cycle at a timing N cycles before the present time." That is, the CPU 71 obtains the "cylinder fuel supply amount Fc(k−N)" through dividing the "cylinder intake air amount Mc(k−N) which is the cylinder intake air amount for the cycle the N cycles (i.e., N·720° crank angle) before the present time" by the "air-fuel ratio abyfsc for a feedback control."

$$Fc(k-N) = Mc(k-N)/abyfsc \quad (4)$$

The reason why the cylinder intake air amount Mc(k−N) for the cycle N cycles before the present time is divided by the air-fuel ratio abyfsc for a feedback control in order to obtain the cylinder fuel supply amount Fc(k−N) is because the "exhaust gas generated by the combustion of the mixture in the combustion chamber 25" requires time "corresponding to the N cycles" to reach the upstream air-fuel ratio sensor 67.

Step 1425: The CPU 71 obtains a "target cylinder fuel supply amount Fcr(k−N)" which is a "fuel amount which was supposed to be supplied to the combustion chamber 25 for the cycle the N cycles before the present time", according to a formula (5) described below. That is, the CPU 71 obtains the target cylinder fuel supply amount Fcr(k−N) through dividing the cylinder intake air amount Mc(k−N) for the cycle the N cycles before the present time by the target upstream-side air-fuel ratio abyfr.

$$Fcr(k-N) = Mc(k-N)/abyfr \quad (5)$$

Step 1430: The CPU 71 obtains an "error DFc of the cylinder fuel supply amount", according to a formula (6) described below. That is, the CPU 71 obtains the error DFc of the cylinder fuel supply amount by subtracting the cylinder fuel supply amount Fc(k−N) from the target cylinder fuel supply amount Fcr(k−N). The error DFc of the cylinder fuel supply amount represents excess and deficiency of the fuel supplied to the cylinder the N cycle before the present time.

$$DFc = Fcr(k-N) - Fc(k-N) \quad (6)$$

Step 1435: The CPU 71 obtains the main feedback amount DFi, according to a formula (7) described below. In the formula (7) below, Gp is a predetermined proportion gain, and Gi is a predetermined integration gain. Further, a "value SDFc" in the formula (7) is an "integrated value of the error DFc of the cylinder fuel supply amount". That is, the CPU 71 calculates the "main feedback amount DFi" based on a proportional-integral control to have the air-fuel ratio abyfsc for a feedback control become equal to the target air-fuel ratio abyfr.

$$DFi = Gp \cdot DFc + Gi \cdot SDFc \quad (7)$$

Step 1440: The CPU 71 obtains a new integrated value SDFc of the error of the cylinder fuel supply amount by adding the error DFc of the cylinder fuel supply amount obtained at the step 1430 to the current integrated value SDFc of the error DFc of the cylinder fuel supply amount.

As described above, the main feedback amount DFi is obtained based on the proportional-integral control. The main feedback amount DFi is reflected in (onto) the final fuel injection amount Fi by the process of the step 1350 shown in FIG. 13.

In contrast, when the determination is made at step 1405, and if the main feedback condition is not satisfied, the CPU 71 makes a "No" determination at step 1405 to proceed to step 1445, at which the CPU 71 sets the value of the main feedback amount DFi to (at) "0". Subsequently, the CPU 71 stores "0" into the integrated value SDFc of the error of the cylinder fuel supply amount at step 1450. Thereafter, the CPU 71 proceeds to step 1495 to end the present routine tentatively. As described above, when the main feedback condition is not satisfied, the main feedback amount DFi is set to (at) "0". Accordingly, the correction for the base fuel injection amount Fbase with the main feedback amount DFi is not performed.

<EGR Control>

Processes for performing the "EGR control" will next be described. The CPU 71 executes an "EGR control routine" shown by a flowchart of FIG. 15 every time a predetermined time elapses.

Figure 15:
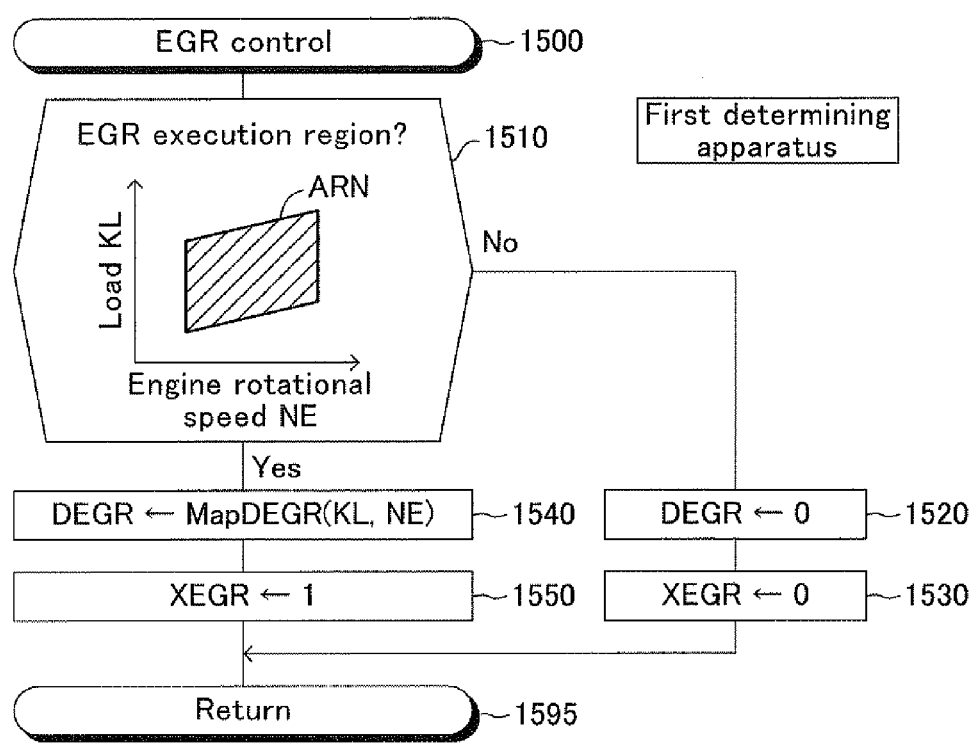
FIG. 15 is a flowchart showing another routine executed by the CPU of the first determination apparatus.

Accordingly, when the predetermined timing comes, the CPU 71 starts processing from step 1500 shown in FIG. 15 to proceed to step 1510, at which the CPU 71 determines whether or not an engine operating state represented by operating parameters (in the present example, the load KL and the engine rotational speed NE) of the engine 10 is in an EGR execution region. As shown in a block of step 1510, the EGR execution region is a region (a shaded area) within a "line ARN formed of a set of points, each of which is defined by the load KL and the engine rotational speed NE." This step 1510 can be said to be a step for determining whether or not the operating state of the engine 10 satisfies a predetermined EGR execution condition.

When the engine operating state is not in the EGR execution region, the CPU 71 makes a "No" determination at step 1510 to proceed to step 1520, at which the CPU 71 sets the duty ratio DEGR to (at) "0". Consequently, the EGR control valve 55 is fully closed, and therefore, the EGR gas (external EGR gas) is not supplied to the engine 10 (combustion chambers 25). That is, the EGR stop state is realized/achieved. Subsequently, the CPU 71 proceeds to step 1530 to set a value of the EGR supplying flag XEGR to (at) "0", and then, proceeds to step 1595 to end the present routine tentatively. It should be noted that the value of the EGR supplying flag XEGR is set to (at) "0" in an initial routine which is executed when an ignition key switch of the vehicle equipped with the engine 10 is turned from the OFF position to the ON position.

In contrast, when the CPU 71 executes the process of step 1510, and if the engine operating state is in the EGR execution region, the CPU 71 makes a "Yes" determination at step 1510 to proceed to step 1540, at which the CPU 71 determines the duty ratio DEGR by applying "the load KL and the engine rotational speed NE" at that point in time to a table MapDE-GR(KL,NE). That is, the CPU 71 calculates the duty ratio DEGR based on the load KL and the engine rotational speed NE, and sends the instruction signal based on the duty ratio DEGR to the EGR control valve 55. Here, the duty ratio DEGR thus determined is a positive value. Accordingly, the EGR control valve 55 is opened in accordance with the duty ratio DEGR, so that the EGR gas is supplied to each of the combustion chambers 25 of the cylinders via each of the EGR gas supply openings 54b. As a result, the EGR supplying state is realized/achieved.

Subsequently, the CPU 71 proceeds to step 1550 to set the value of the EGR supplying flag XEGR to (at) "1". Accordingly, the EGR supplying flag XEGR indicates that the EGR supplying state is being realized when the value of the flag XEGR is equal to "1", and indicates that the EGR stop state is being realized when the value of the flag XEGR is equal to "0." Thereafter, the CPU 71 proceeds to step 1595 to end the present routine tentatively.

<Obtaining the EGR Stop State Imbalance Determination Parameter>

Processes for obtaining the "EGR stop state imbalance determination parameter" will next be described. The CPU 71 executes a routine shown by a flowchart of FIG. 16 every time 4 ms (4 ms=a predetermined sampling time ts) elapses.

Accordingly, when the predetermined timing comes, the CPU 71 starts processing from step 1600 to proceed to step 1605, at which the CPU 71 determines whether or not a value of an obtaining parameter permission flag Xkyoka is "1".

The value of the obtaining parameter permission flag Xkyoka is set to (at) "0" in the above-described initial routine. Further, the value of the obtaining parameter permission flag Xkyoka is set to (at) "1" by an execution of an unillustrated routine, when a parameter obtaining condition is satisfied at a point in time when the reference cylinder (in the present example the first cylinder) reaches the top dead center of the compression stroke. The parameter obtaining condition is satisfied when all of obtaining permission conditions described below are satisfied. Each of the obtaining permission conditions is a condition required to stably obtain the imbalance determination parameters (the EGR supplying state imbalance determination parameter and the EGR stop state imbalance determination parameter). Further, the value of the obtaining parameter permission flag Xkyoka is immediately set to (at) "0" when the parameter obtaining condition becomes unsatisfied. That is, the value of the obtaining parameter permission flag Xkyoka is set to (at) "0" when at least one of a plurality of the obtaining permission conditions becomes unsatisfied. It should be noted that the obtaining permission conditions are not limited to the conditions described below.

(Obtaining permission condition 1) The cooling water temperature THW is equal to or higher than a threshold cooling water temperature THWth.

(Obtaining permission condition 2) A state in which a change amount ΔAccp of the accelerator pedal operation amount Accp per unit time is equal to or smaller than a threshold accelerator pedal change amount ΔAccpth has continued for a predetermined time or longer.

(Obtaining permission condition 3) A state in which the intake air flow rate Ga is equal to or larger than a threshold intake air flow rate Gath has continued for a predetermined time or longer.

(Obtaining permission condition 4) A state in which the engine rotational speed NE is equal to or lower than a threshold rotational speed NEth has continued for a predetermined time or longer.

It is assumed here that the value of the obtaining parameter permission flag Xkyoka is equal to "1". In this case, the CPU makes a "Yes" determination at step 1605 to proceed to step 1610, at which the CPU 71 determines whether or not the value of the EGR supplying flag XEGR is equal to "0."

When the value of the EGR supplying flag XEGR is equal to "0", the CPU 71 makes a "Yes" determination at step 1610 to execute processes of steps 1615 to 1630 (which will be described below) one after another, and then proceeds to step 1635.

Step 1615: The CPU 71 stores the detected air-fuel ratio abyfs (refer to step 1625 described later) which was obtained when the present routine was previously executed as a previous detected air-fuel ratio abyfsold. That is, the previous detected air-fuel ratio abyfsold is the detected air-fuel ratio abyfs 4 ms (the sampling time ts) before the present time. An initial value of the previous detected air-fuel ratio abyfsold is set at a value corresponding to the stoichiometric air-fuel ratio in the above-described initial routine.

Step 1620: The CPU 71 obtains the output value Vabyfs of the air-fuel ratio sensor 67 at that point in time through an A/D conversion.

Step 1625: The CPU 71 obtains a present (current) detected air-fuel ratio abyfs by applying the output value Vabyfs of the air-fuel ratio sensor 67 to the air-fuel ratio conversion table Mapabyfs shown in FIG. 10.

Step 1630: The CPU 71 updates/renews a detected air-fuel ratio change rate ΔAFoff under the EGR stop state, an integrated value SAFDoff of an absolute value of the detected air-fuel ratio change rate ΔAFoff, and a cumulated number counter Cnoff. The ways in which these values are renewed will next be described more specifically.

(A) Renewal of the Detected Air-Fuel Ratio Change Rate ΔAFoff:

The CPU 71 obtains the detected air-fuel ratio change rate ΔAFoff by subtracting the previous detected air-fuel ratio abyfsold from the present detected air-fuel ratio abyfs. That is, when the present detected air-fuel ratio abyfs is expressed as abyfs(n) and the previous detected air-fuel ratio abyfs is expressed as abyfs(n−1), the CPU 71 obtains the "present detected air-fuel ratio change rate ΔAFoff(n)" at step 1630, according to a formula (8) described below.

$$\Delta AFoff(n) = abyfs(n) - abyfs(n-1) \tag{8}$$

(B) Renewal of the Integrated Value SAFDoff of the Absolute Value |ΔAFoff| of the Detected Air-Fuel Ratio Change Rate ΔAFoff:

The CPU 71 obtains the present integrated value SAFDoff (n) according to a formula (9) described below. That is, the CPU 71 renews the integrated value SAFDoff by adding the absolute value |ΔAFoff(n)| of the present detected air-fuel ratio change rate ΔAFoff(n) calculated as above to the previous integrated value SAFDoff(n−1) at the point in time when the CPU 71 proceeds to step 1630.

$$SAFDoff(n) = SAFDoff(n-1) + |\Delta AFoff(n)| \tag{9}$$

The reason why the "absolute value |ΔAFoff(n)| of the present detected air-fuel ratio change rate" is added to the integrated value SAFDoff is that the detected air-fuel ratio change rate ΔAFoff(n) can become both a positive value and a negative value, as understood from (B) and (C) in FIG. 12. It should be noted that the integrated value SAFDoff is set to (at) "0" in the initial routine described above.

(C) Renewal of the Cumulated Number Counter Cnoff of the Absolute Value of the Detected Air-Fuel Ratio Change Rate ΔAFoff Added to the Integrated Value SAFDoff:

The CPU 71 increments a value of the counter Cnoff by "1" according to a formula (10) described below. The Cnoff(n) represents the counter Cnoff after the renewal, and the Cnoff (n−1) represents the counter Cnoff before the renewal. The value of the counter Cnoff is set to (at) "0" in the initial routine described above, and is also set to (at) "0" at step 1660 described later. The value of the counter Cnoff therefore represents the number of data of the absolute value |ΔAFoff| of the detected air-fuel ratio change rate ΔAFoff which has been accumulated in the integrated value SAFDoff.

$$Cnoff(n) = Cnoff(n-1) + 1 \tag{10}$$

Subsequently, the CPU 71 proceeds to step 1635 to determine whether or not the crank angle CA (the absolute crank angle CA) measured with reference to the top dead center of the compression stroke of the first cylinder serving as the reference cylinder reaches 720° crank angle. When the absolute crank angle CA is less than 720° crank angle, the CPU 71 makes a "No" determination at step 1635 to directly proceed to step 1695 at which the CPU 71 ends the present routine tentatively.

It should be noted that step 1635 is a step to define the smallest unit period (a unit combustion cycle period) for obtaining a mean value (or average) of the absolute values |ΔAFoff| of the detected air-fuel ratio change rates ΔAFoff. Here, the 720° crank angle corresponds to the smallest unit period. The smallest unit period may obviously be shorter than the 720° crank angle, however, may preferably be a time period longer than or equal to a period having an integral multiple of the sampling time ts.

Meanwhile, if the absolute crank angle CA reaches 720° crank angle when the CPU 71 executes the process of step 1635, the CPU 71 makes a "Yes" determination at step 1635 to proceed to step 1640. The CPU 71, at step 1640 performs:
(D) calculation of a mean value (average) AveΔAFoff of the absolute values |ΔAFoff| of the detected air-fuel ratio change rates ΔAFoff,
(E) calculation of an integrated value Saveoff of the mean value AveΔAFoff, and
(F) increment of a cumulated number counter Csoff.

The ways in which these values are renewed will be next be described more specifically.
(D) Calculation of the Mean Value AveΔAFoff of the Absolute Values |ΔAFoff| of the Detected Air-Fuel Ratio Change Rates ΔAFoff:

The CPU 71 calculates the mean value AveΔAFoff (=SAFDoff/Cnoff) of the absolute values |ΔAFoff| during a last unit combustion cycle period through dividing the integrated value SAFDoff by the value of the counter Cnoff. Thereafter, the CPU 71 sets the integrated value SAFDoff to (at) "0".
(E) Calculation of the Integrated Value Saveoff of the Mean Value AveΔAFoff:

The CPU 71 obtains the present integrated value Saveoff (n) according to a formula (11) described below. That is, the CPU 71 renews the integrated value Saveoff by adding the present mean value AveΔAFoff obtained as described above to the previous integrated value Saveoff(n−1) at the point in time when the CPU 71 proceeds to step 1640. The value of the integrated value Saveoff(n) is set to (at) "0" in the initial routine described above.

$$Saveoff(n)=Saveoff(n-1)+Ave\Delta AFoff \quad (11)$$

(F) Increment of the Cumulated Number Counter Csoff:

The CPU 71 increments a value of the counter Csoff by "1" according to a formula (12) described below. The Csoff(n) represents the counter Csoff after the renewal, and the Csoff (n−1) represents the counter Csoff before the renewal. The value of the counter Csoff is set to (at) "0" in the initial routine described above. The value of the counter Csoff therefore represents the number of data of the mean value AveΔAFoff which has been accumulated in the integrated value Saveoff.

$$Csoff(n-1)+1 \quad (12)$$

Subsequently, the CPU 71 proceeds to step 1645 to determine whether or not the value of the counter Csoff is larger than or equal to a threshold value Csoffth. When the value of the counter Csos is smaller than the threshold value Csoffth, the CPU 71 makes a "No" determination at step 1645 to directly proceed to step 1695 at which the CPU 71 ends the present routine tentatively. It should be noted that the threshold value Csoffth is a natural number, and is preferably larger than or equal to 2.

Meanwhile, if the value of the counter Csoff is larger than or equal to the threshold value Csoffth when the CPU 71 executes the process of step 1645, the CPU 71 makes a "Yes" determination at step 1645 to proceed to step 1650 at which the CPU 71 calculates the EGR stop state imbalance determination parameter Poff.

More specifically, the CPU 71 calculates the EGR stop state imbalance determination parameter Poff through dividing the integrated value Saveoff by the value of the counter Csoff (=Csoffth) according to a formula (13) described below. The EGR stop state imbalance determination parameter Poff is a value obtained by averaging the mean values of the absolute values |ΔAFoff| of the detected air-fuel ratio change rates ΔAFoff, the mean value being obtained for each of the unit combustion cycle periods, over a plurality (Csoffth) of the unit combustion cycle periods, in the period in which the EGR stop state is being realized. Accordingly, the EGR stop state imbalance determination parameter Poff is the imbalance determination parameter which becomes larger as the cylinder-by-cylinder air-fuel ratio difference becomes larger.

$$Poff=Saveoff/Csoffth \quad (13)$$

Subsequently, the CPU 71 proceeds to step 1655 to set a value of an EGR stop state imbalance determination parameter calculation completion flag XPoff to (at) "1". Thereafter, the CPU 71 proceeds to step 1695 to end the present routine tentatively. It should be noted that the value of the EGR stop state imbalance determination parameter calculation completion flag XPoff is set to (at) "0" in the initial routine described before. Therefore, the EGR stop state imbalance determination parameter calculation completion flag XPoff indicates that the EGR stop state imbalance determination parameter Poff has been obtained since a start of the present operation of the engine 10 when the value of the flag XPoff is equal to "1", and indicates that the EGR stop state imbalance determination parameter Poff has not been obtained yet since the start of the present operation of the engine 10 when the value of the flag XPoff is equal to "0."

In contrast, in a case where the value of the obtaining parameter permission flag Xkyoka is not "1" when the CPU 71 proceeds to step 1605, and in a case where the value of the EGR supplying flag XEGR is not "0" when the CPU 71 proceeds to step 1610, the CPU 71 proceeds to step 1660. Thereafter, the CPU 71 sets (or clears) each of the values (e.g., ΔAFoff, SAFDoff, Cnoff, and so on) to (at) "0" at step 1660. Subsequently, the CPU 71 directly proceeds to step 1695 to end the present routine tentatively. In this manner, the EGR stop state imbalance determination parameter Poff is obtained.

<Obtaining the EGR Supplying State Imbalance Determination Parameter>

Processes for obtaining the "EGR supplying state imbalance determination parameter" will next be described. The CPU 71 obtains calculates the EGR supplying state imbalance determination parameter Pon according to a method which is the same as one that is used when the EGR stop state imbalance determination parameter Poff is obtained.

Figure 17:
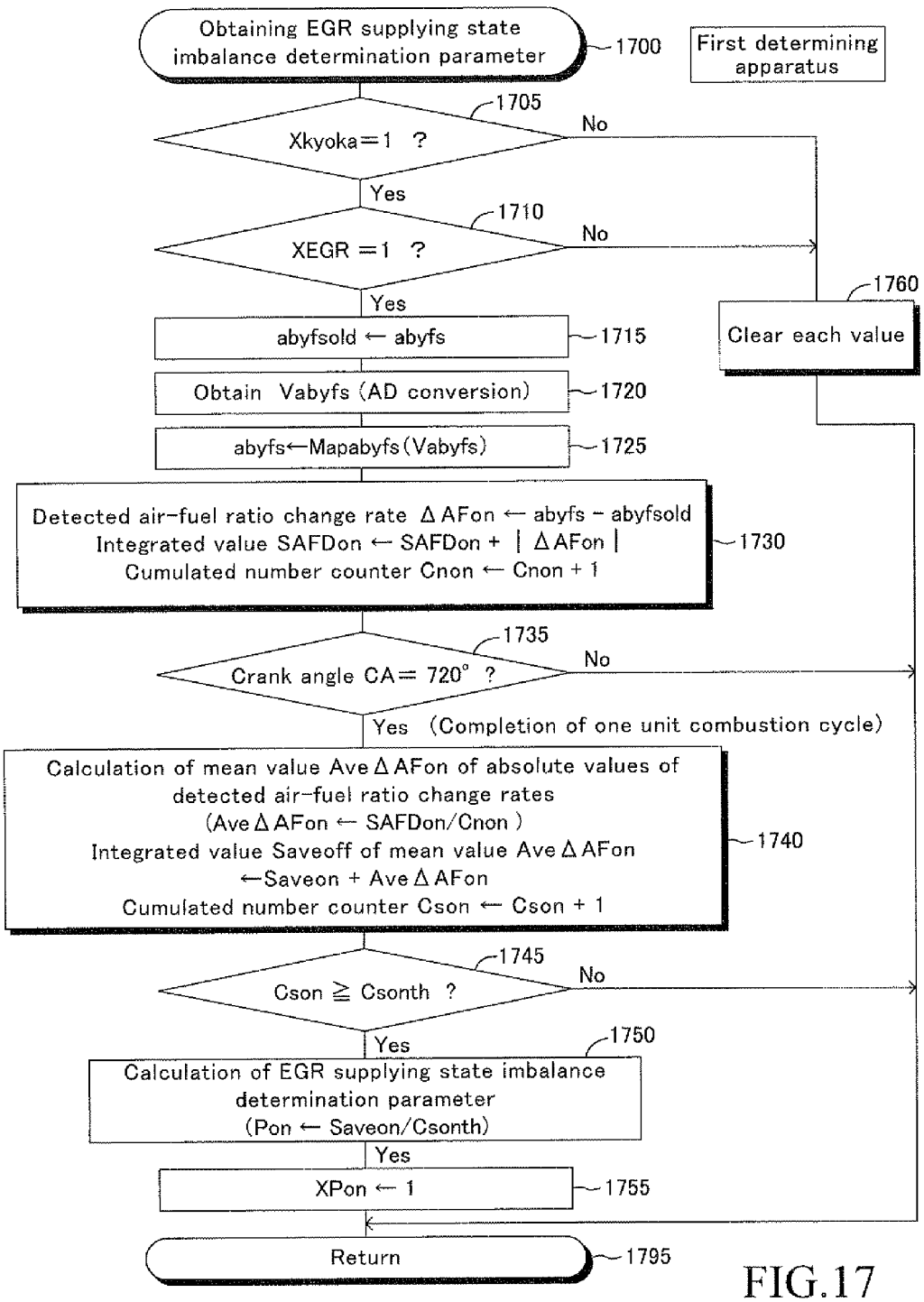
FIG. 17 is a flowchart showing another routine executed by the CPU of the first determination apparatus.

More specifically, the CPU 71 executes a routine shown by a flowchart of FIG. 17 every time 4 ms (4 ms=a predetermined sampling time ts) elapses.

Accordingly, when the predetermined timing comes, the CPU 71 starts processing from step 1700 to proceed to step 1705, at which the CPU 71 determines whether or not the value of the obtaining parameter permission flag Xkyoka described above is "1,"

It is assumed here that the value of the obtaining parameter permission flag Xkyoka is equal to "1". In this case, the CPU makes a "Yes" determination at step 1705 to proceed to step 1710, at which the CPU 71 determines whether or not the value of the EGR supplying flag XEGR is equal to "1,"

When the value of the EGR supplying flag XEGR is equal to "1", the CPU 71 makes a "Yes" determination at step 1710 to execute processes of steps 1715 to 1730 (which will be described below) one after another, and then proceeds to step 1735.

Step 1715: The CPU 71 stores the detected air-fuel ratio abyfs (refer to step 1725 described later) which was obtained when the present routine was previously executed as a previous detected air-fuel ratio abyfsold. That is, the previous detected air-fuel ratio abyfsold is the detected air-fuel ratio abyfs 4 ms before the present time.

Step 1720: The CPU 71 obtains the output value Vabyfs of the air-fuel ratio sensor 67 at that point in time through an A/D conversion.

Step 1725: The CPU 71 obtains a present (current) detected air-fuel ratio abyfs by applying the output value Vabyfs of the air-fuel ratio sensor 67 to the air-fuel ratio conversion table Mapabyfs shown in FIG. 10.

Step 1730: The CPU 71 updates/renews a detected air-fuel ratio change rate $\Delta AFon$ under the EGR supplying state, an integrated value SAFDon of an absolute value of the detected air-fuel ratio change rate $\Delta AFon$, and a cumulated number counter Cnon. The ways in which these values are renewed will next be described more specifically.

(G) Renewal of the Detected Air-Fuel Ratio Change Rate $\Delta AFon$:

The CPU 71 obtains the detected air-fuel ratio change rate $\Delta AFon$ by subtracting the previous detected air-fuel ratio abyfsold from the present detected air-fuel ratio abyfs. That is, when the present detected air-fuel ratio abyfs is expressed as abyfs(n) and the previous detected air-fuel ratio abyfs is expressed as abyfs(n−1), the CPU 71 obtains the "present detected air-fuel ratio change rate $\Delta AFon(n)$" at step 1730, according to a formula (14) described below.

$$\Delta AFon(n)=abyfs(n)-abyfs(n-1) \tag{14}$$

(H) Renewal of the Integrated Value SAFDon of the Absolute Value $|\Delta AFon|$ of the Detected Air-Fuel Ratio Change Rate $\Delta AFon$:

The CPU 71 obtains the present integrated value SAFDon (n) according to a formula (15) described below.

$$SAFDon(n)=SAFDon(n-1)+|\Delta AFon(n)| \tag{15}$$

The reason why the "absolute value $|\Delta AFon(n)|$ of the present detected air-fuel ratio change rate" is added to the integrated value SAFDon is that the detected air-fuel ratio change rate $\Delta AFon(n)$ can become both a positive value and a negative value, as understood from (B) and (C) in FIG. 12. It should be noted that the integrated value SAFDon is set to (at) "0" in the initial routine described above.

(I) Renewal of the Cumulated Number Counter Cnon of the Absolute Value of the Detected Air-Fuel Ratio Change Rate $\Delta AFon$ Added to the Integrated Value SAFDon:

The CPU 71 increments a value of the counter Cnon by "1" according to a formula (16) described below. The value of the counter Cnon is set to (at) "0" in the initial routine described above, and is also set to (at) "0" at step 1760 described later. The value of the counter Cnon therefore represents the number of data of the absolute value $|\Delta AFon|$ of the detected air-fuel ratio change rate $\Delta AFon$ which has been accumulated in the integrated value SAFDon.

$$Cnon(n)=Cnon(n-1)+1 \tag{16}$$

Subsequently, the CPU 71 proceeds to step 1735 to determine whether or not the crank angle CA (the absolute crank angle CA) measured with reference to the top dead center of the compression stroke of the first cylinder reaches 720° crank angle. When the absolute crank angle CA is less than 720° crank angle, the CPU 71 makes a "No" determination at step 1735 to directly proceed to step 1795 at which the CPU 71 ends the present routine tentatively. Step 1735 has the same meaning as step 1635 shown in FIG. 16.

Meanwhile, if the absolute crank angle CA reaches 720° crank angle when the CPU 71 executes the process of step 1735, the CPU 71 makes a "Yes" determination at step 1735 to proceed to step 1740. The CPU 71, at step 1740 performs:

(J) calculation of a mean value (average) Ave$\Delta AFon$ of the absolute values $|\Delta AFon|$ of the detected air-fuel ratio change rates $\Delta AFon$, (K) calculation of an integrated value Saveon of the mean value Ave$\Delta AFon$, and (L) increment of a cumulated number counter Cson.

The ways in which these values are renewed will be next be described more specifically.

(J) Calculation of the Mean Value Ave$\Delta AFon$ of the Absolute Values $|\Delta AFon|$ of the Detected Air-Fuel Ratio Change Rates $\Delta AFon$:

The CPU 71 calculates the mean value Ave$\Delta AFon$ (=SAFDon/Cnon) of the absolute values $|\Delta AFon|$ through dividing the integrated value SAFDon by the value of the counter Cnon. Thereafter, the CPU 71 sets the integrated value SAFDon to (at) "0".

(K) Calculation of the Integrated Value Saveon of the Mean Value Ave$\Delta AFon$:

The CPU 71 obtains the present integrated value Saveon(n) according to a formula (17) described below. That is, the CPU 71 renews the integrated value Saveon by adding the present mean value Ave $\Delta AFon$ obtained as described above to the previous integrated value Saveon(n−1) at the point in time when the CPU 71 proceeds to step 1740. A value of the integrated value Saveon(n) is set to (at) "0" in the initial routine described above.

$$Saveon(n)=Saveon(n-1)+Ave\Delta AFon \tag{17}$$

(L) Increment of the Cumulated Number Counter Cson:

The CPU 71 increments a value of the counter Cson by "1" according to a formula (18) described below. The Cson(n) represents the counter Cson after the renewal, and the Cson (n−1) represents the counter Cson before the renewal. The value of the counter Cson is set to (at) "0" in the initial routine described above. The value of the counter Cson therefore represents the number of data of the mean value Ave$\Delta AFon$ which has been accumulated in the integrated value Saveon.

$$Cson(n)=Cson(n-1)+1 \tag{18}$$

Subsequently, the CPU 71 proceeds to step 1745 to determine whether or not the value of the counter Cson is larger than or equal to a threshold value Csonth. When the value of the counter Csos is smaller than the threshold value Csonth, the CPU 71 makes a "No" determination at step 1745 to directly proceed to step 1795 at which the CPU 71 ends the present routine tentatively. It should be noted that the threshold value Csonth is set at the same value as the threshold value Csoffth.

Meanwhile, if the value of the counter Cson is larger than or equal to the threshold value Csonth when the CPU 71 executes the process of step 1745, the CPU 71 makes a "Yes" determination at step 1745 to proceed to step 1750 at which the CPU 71 calculates the EGR supplying state imbalance determination parameter Pon.

More specifically, the CPU 71 calculates the EGR supplying state imbalance determination parameter Pon through dividing the integrated value Saveon by the value of the counter Cson (=Csonth) according to a formula (19) described below. The EGR supplying state imbalance determination parameter Pon is a value obtained by averaging the mean values of the absolute values |AFon| of the detected air-fuel ratio change rates ΔAFon, the mean value being obtained for each of the unit combustion cycle periods, over a plurality (Csonth) of the unit combustion cycle periods, in the period in which the EGR supplying state is being realized. Accordingly, the EGR supplying state imbalance determination parameter Pon is the imbalance determination parameter which becomes larger as the cylinder-by-cylinder air-fuel ratio difference becomes larger.

$$Pon=Saveon/Cson{th} \qquad (19)$$

Subsequently, the CPU 71 proceeds to step 1755 to set a value of an EGR supplying state imbalance determination parameter calculation completion flag XPon to (at) "1". Thereafter, the CPU 71 proceeds to step 1795 to end the present routine tentatively. It should be noted that the value of the EGR supplying state imbalance determination parameter calculation completion flag XPon is set to (at) "0" in the initial routine described before. Therefore, the EGR supplying state imbalance determination parameter calculation completion flag XPon indicates that the EGR supplying state imbalance determination parameter Pon has been obtained since the start of the present operation of the engine 10 when the value of the flag XPon is equal to "1", and indicates that the EGR supplying state imbalance determination parameter Pon has not been obtained yet since the start of the present operation of the engine 10 when the value of the flag XPon is equal to "0."

In contrast, in a case where the value of the obtaining parameter permission flag Xkyoka is not "1" when the CPU 71 proceeds to step 1705, and in a case where the value of the EGR supplying flag XEGR is not "1" when the CPU 71 proceeds to step 1710, the CPU 71 proceeds to step 1760. Thereafter, the CPU 71 sets (or clears) each of the values (e.g., ΔAFon, SAFDon, Cnon, and so on) to (at) "0" at step 1760. Subsequently, the CPU 71 directly proceeds to step 1795 to end the present routine tentatively. In this manner, the EGR supplying state imbalance determination parameter Pon is obtained.

<Inter-Cylinder Air-Fuel Ratio Imbalance Determination (Determination of Imbalance Due to EGR)>

Processes for performing the "inter-cylinder air-fuel ratio imbalance determination" will next be described. The CPU 71 executes a routine shown by a flowchart of FIG. 18 every time 4 ms (4 ms=a predetermined sampling time ts) elapses.

Accordingly, when the predetermined timing comes, the CPU 71 starts processing from step 1800 to proceed to step 1805, at which the CPU 71 determines whether or not a value of an imbalance determination completion flag XFIN is "1." The value of the imbalance determination completion flag is set to (at) "0" in the initial routine described before, and is set to "1" at step 1840 described later.

It is assumed here that the value of the imbalance determination completion flag is "0." In this case, the CPU 71 makes a "No" determination at step 1805 to proceed to step 1810, at which the value of the EGR supplying state imbalance determination parameter calculation completion flag XPon is "1." When the flag XPon is not "1" (i.e., when the EGR supplying state imbalance determination parameter Pon has not been obtained yet), the CPU 71 makes a "No" determination at step 1810 to directly proceed to step 1895, at which the CPU 71 ends the present routine tentatively.

When the value of the EGR supplying state imbalance determination parameter calculation completion flag XPon is "1", the CPU 71 makes a "Yes" determination at step 1810 to proceed to step 1815, at which the CPU 71 determines whether or not the value of the EGR stop state imbalance determination parameter calculation completion flag XPoff is "1." When the flag XPoff is not "1" (i.e., when the EGR stop state imbalance determination parameter Poff has not been obtained yet), the CPU 71 makes a "No" determination at step 1815 to directly proceed to step 1895, at which the CPU 71 ends the present routine tentatively.

When the value of the EGR stop state imbalance determination parameter calculation completion flag XPoff is "1", the CPU 71 makes a "Yes" determination at step 1815 to proceed to step 1820. That is, the CPU 71 proceeds to step 1820, after both of the EGR supplying state imbalance determination parameter Pon and the EGR stop state imbalance determination parameter Poff have been obtained since the present start of the engine 10.

When the CPU 71 proceeds to step 1820, the CPU 71 calculates the EGR-causing imbalance determination parameter Pegr by subtracting the EGR stop state imbalance determination parameter Poff from the EGR supplying state imbalance determination parameter Pon, according to a formula (20) described below. That is, the CPU 71 obtains, as the EGR-causing imbalance determination parameter Pegr, a value (Pon−Poff, |Pon−Poff|, and the like) in accordance with (corresponding to) a difference between the EGR supplying state imbalance determination parameter Pon and the EGR stop state imbalance determination parameter Poff. As described before, the EGR-causing imbalance determination parameter Pegr accurately represents the cylinder-by-cylinder air-fuel ratio difference caused by the supply of the EGR gas. It should be noted that the CPU 71 may obtain, as the EGR-causing imbalance determination parameter Pegr, a ratio (=Pon/Poff) of the EGR supplying state imbalance determination parameter Pon to the EGR stop state imbalance determination parameter Poff.

$$Pegr=Pon-Poff \qquad (20)$$

Subsequently, the CPU 71 proceeds to step 1825 to determine whether or not the EGR-causing imbalance determination parameter Pegr is larger than a predetermined EGR-causing imbalance determination threshold Pegrth. When the EGR-causing imbalance determination parameter Pegr is larger than the EGR-causing imbalance determination threshold Pegrth, the CPU 71 determines that the EGR-causing inter-cylinder air-fuel ratio imbalance state has occurred, and proceeds to step 1830, at which the CPU 71 sets a value of an EGR-causing imbalance occurrence flag XEGRINB to (at) "1." It should be noted that the value of the EGR-causing imbalance occurrence flag XEGRINB is set to (at) "0" in the initial routine described above.

Subsequently, the CPU 71 proceeds to step 1835 to set a value of an imbalance occurrence flag XINB to (at) "1." The value of the imbalance occurrence flag XINB is also set to (at) "0" in the initial routine described above.

Subsequently, the CPU 71 proceeds to step 1840, at which the CPU 71 sets the value of the determination completion flag XFIN to (at) "1", and thereafter, proceeds to step 1895 to end the present routine tentatively. When the CPU 71 starts the present routine again the predetermined time later, this allows the CPU 71 to make a "Yes" determination at step 1805 to proceed to step 1895, at which the CPU 71 ends the present routine tentatively.

In contrast, when the CPU 71 executes the process of step 1825, if the EGR-causing imbalance determination parameter Pegr is smaller than the EGR-causing imbalance determination threshold Pegrth, the CPU 71 determines that the EGR-causing inter-cylinder air-fuel ratio imbalance state has not occurred, and proceeds to step 1845, at which the CPU 71 sets the value of an EGR-causing imbalance occurrence flag XEGRINB to (at) "2."

Subsequently, the CPU 71 proceeds to step 1850, at which the CPU 71 determines whether or not a value of a typical imbalance occurrence flag XINJINB is not "1." That is, the CPU 71 determines whether or not it has not determined yet that the inter-cylinder air-fuel-ratio imbalance state caused by factors other than the supply of the EGR gas (i.e., a typical inter-cylinder air-fuel-ratio imbalance state) occurred. When the value of the flag XINJINB is not "1", the CPU 71 proceeds to step 1855, at which the CPU 71 sets the value of the imbalance occurrence flag XINB to (at) "2" in order to indicate that it has been determined that the inter-cylinder air-fuel-ratio imbalance state has not occurred yet as the result of the imbalance determination. Thereafter, the CPU 71 proceeds to step 1895 via step 1840.

When the value of the flag XINJINB is "1", the CPU 71 makes a "Yes" determination to directly proceed to step 1895, at which the CPU 71 ends the present routine tentatively.

Figure 19:
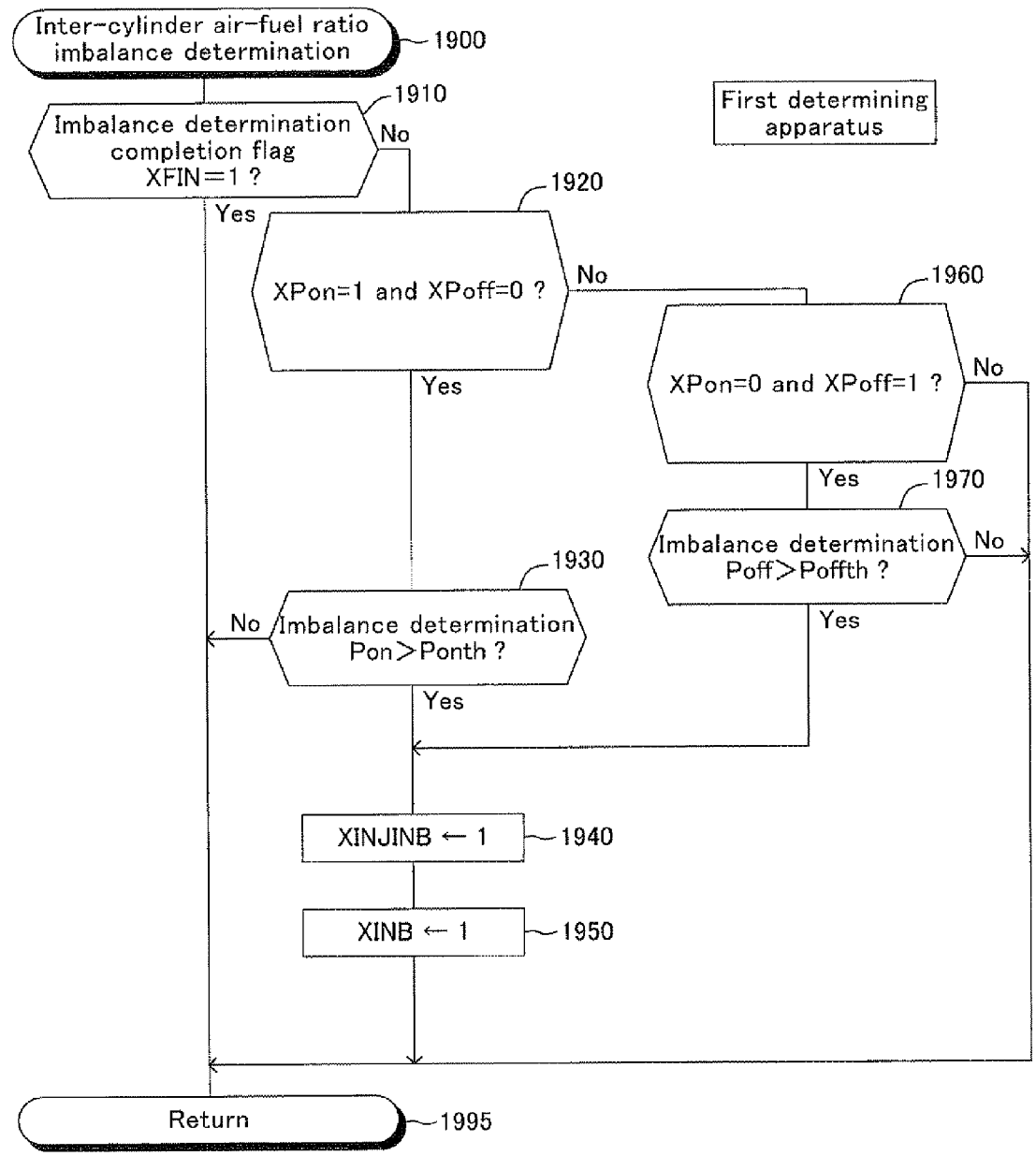
FIG. 19 is a flowchart showing another routine executed by the CPU of the first determination apparatus.

Further, the CPU 71 executes a "typical inter-cylinder air-fuel ratio imbalance determination routine" shown by a flowchart of FIG. 19 every time 4 ms (a predetermined sampling time ts) elapses.

Accordingly, when the predetermined timing conies, the CPU 71 starts processing from step 1900 to proceed to step 1905, at which the CPU 71 determines whether or not the value of the imbalance determination completion flag XFIN is "1." When the value of the imbalance determination completion flag XFIN has already been set to "1", the CPU 71 directly proceeds to step 1995 from step 1910 to end the present routine tentatively.

In contrast, when the CPU 71 executes the process of step 1910, if the value of the imbalance determination completion flag XFIN is "0", the CPU 71 makes a "No" determination at step 1910 to proceed to step 1920, at which the CPU 71 determines whether or not the value of the EGR supplying state imbalance determination parameter calculation completion flag XPon is "1" and the value of the EGR stop state imbalance determination parameter calculation completion flag XPoff is "0." That is, the CPU 71 determines whether or not a current state is a state in which the EGR supplying state imbalance determination parameter Pon has already been obtained, but the EGR stop state imbalance determination parameter Poff has not been obtained yet, since the start of the engine 10.

When the determining condition in step 1920 is satisfied, the CPU 71 makes a "Yes" determination at step 1920 to proceed to step 1930, at which the CPU 71 determines whether or not the EGR supplying state imbalance determination parameter Pon is larger than the EGR supplying state imbalance determination threshold Ponth.

When the parameter Pon is larger than the threshold Ponth, the CPU 71 makes a "Yes" determination at step 1930 to proceed to step 1940, at which the CPU 71 sets the value of the typical imbalance occurrence flag XINJINB to (at) "1." That is, when the parameter Pon is larger than the threshold Ponth, the CPU 71 determines that the inter-cylinder air-fuel-ratio imbalance state caused by the factors other than the supply of the EGR gas (i.e., the typical inter-cylinder air-fuel-ratio imbalance state) has mainly been occurred. It should be noted that the value of the typical imbalance occurrence flag XINJINB is set to (at) "0" in the initial routine described above.

Subsequently, the CPU 71 proceeds to step 1950, at which the CPU 71 sets the value of the imbalance occurrence flag XINB to (at) "1", and thereafter, proceeds to step 1995 to end the present routine tentatively.

On the other hand, when the CPU 71 executes the process of step 1930, if the parameter Pon is smaller than the threshold Ponth, the CPU 71 makes a "No" determination at step 1930 to directly proceed to step 1995 to end the present routine tentatively.

Furthermore, when the CPU 71 executes the process of step 1920, if the determining condition in step 1920 is not satisfied, the CPU 71 makes a "No" determination at step 1920 to proceed to step 1960, at which the CPU 71 whether or not the value of the EGR supplying state imbalance determination parameter calculation completion flag XPon is "0" and the value of the EGR stop state imbalance determination parameter calculation completion flag XPoff is "1." That is, the CPU 71 determines whether or not the current state is a state in which the EGR stop state imbalance determination parameter Poff has already been obtained, but the EGR supplying state imbalance determination parameter Pon has not been obtained yet, since the start of the engine 10.

When the determining condition in step 1960 is satisfied, the CPU 71 makes a "Yes" determination at step 1960 to proceed to step 1970, at which the CPU 71 determines whether or not the EGR stop state imbalance determination parameter Poff is larger than the EGR stop state imbalance determination threshold Poffth.

When the parameter Poff is larger than the threshold Poffth, the CPU 71 makes a "Yes" determination at step 1970 to proceed to step 1940, at which the CPU 71 sets the value of the typical imbalance occurrence flag XINJINB to (at) "1." That is, when the parameter Poff is larger than the threshold Poffth, the CPU 71 determines that the inter-cylinder air-fuel-ratio imbalance state caused by the factors other than the supply of the EGR gas (i.e., the typical inter-cylinder air-fuel-ratio imbalance state) has mainly been occurred. Subsequently, the CPU 71 proceeds to step 1950, at which the CPU 71 sets the value of the imbalance occurrence flag XINB to (at) "1", and thereafter, proceeds to step 1995 to end the present routine tentatively.

On the other hand, when the CPU 71 executes the process of step 1970, if the parameter Poff is smaller than the threshold Poffth, the CPU 71 makes a "No" determination at step 1970 to directly proceed to step 1995 to end the present routine tentatively.

As described above, the first determining apparatus is an apparatus for determining whether or not the state (inter-cylinder air-fuel-ratio imbalance state) has been occurring, in which the difference (cylinder-by-cylinder air-fuel ratio difference) between the air-fuel ratios of the mixtures supplied to the at least two or more of the cylinders is larger than or equal to the predetermined value. The at least two or more of the cylinders (the first to the fourth cylinder in the first determining apparatus) are configured so as to discharge the exhaust gases to the exhaust merging portion HK of the engine 10.

Figure 18:
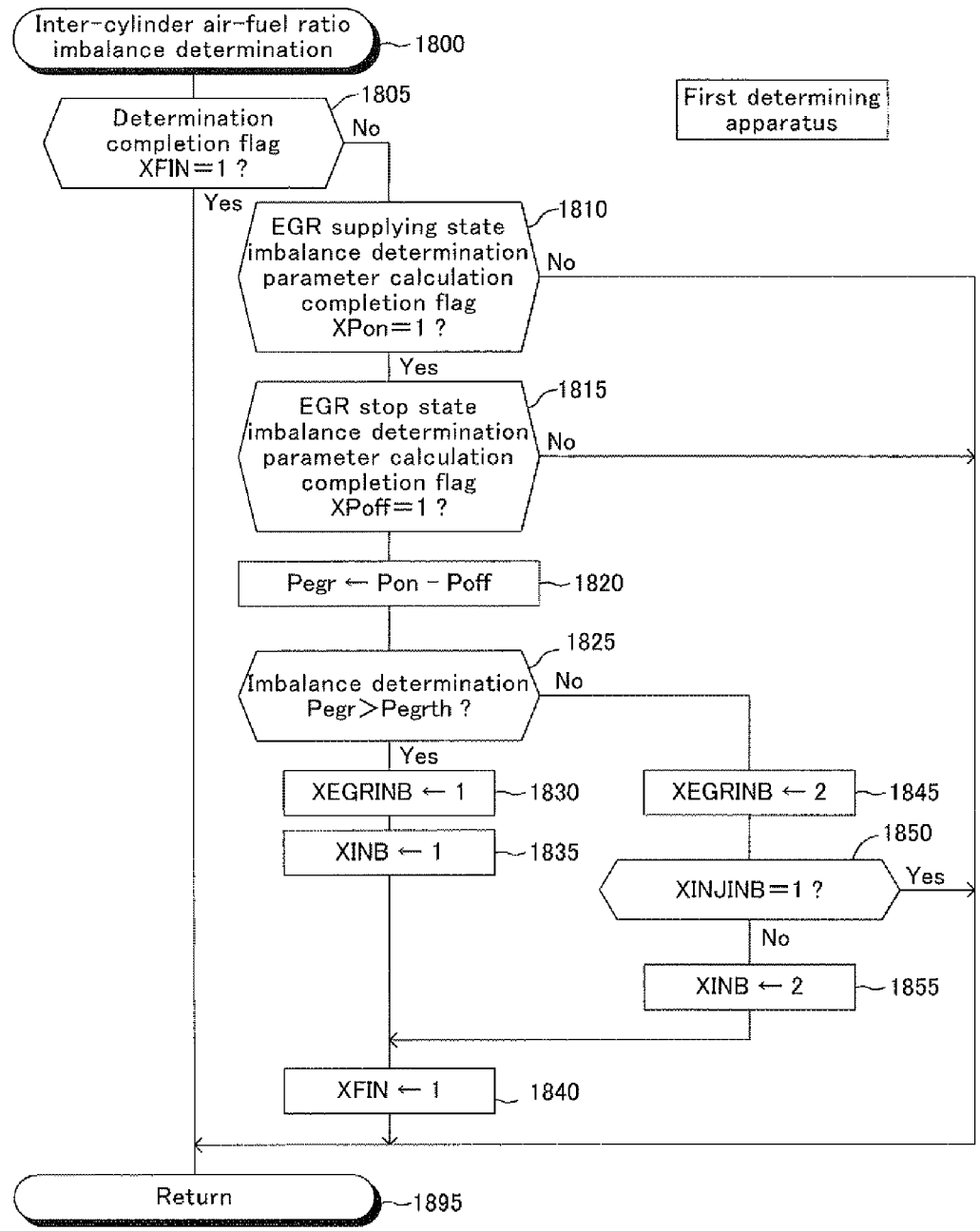
FIG. 18 is a flowchart showing another routine executed by the CPU of the first determination apparatus.

Further, the first determining apparatus comprises:
a plurality of the fuel injection valves 39;
EGR gas supply means having a plurality of the EGR gas supply openings 54*b* (54, 55);
EGR gas supply control means (the routine shown in FIG. 15) for realizing the EGR supplying state in which the EGR gas is supplied through a plurality of the EGR gas supply openings when the operating state of the engine satisfies the predetermined EGR execution condition (refer to the "Yes" determination at step 1510 shown in FIG. 15), and for realizing the EGR stop state in which the external EGR gas supply is stopped when the operating state of the engine does not satisfy the EGR execution condition (refer to the "No" determination at step 1510 shown in FIG. 15);

the air-fuel ratio sensor 67;

imbalance determination parameter obtaining means, for obtaining, based on the output value Vabyfs of the air-fuel ratio sensor 67, the EGR stop state imbalance determination parameter Poff whose absolute value becomes larger as the cylinder-by-cylinder air-fuel ratio difference becomes larger when the EGR stop state is being realized (the routine shown in FIG. 16), for obtaining, based on the output value Vabyfs of the air-fuel ratio sensor 67, the EGR supplying state imbalance determination parameter Pon whose absolute value becomes larger as the cylinder-by-cylinder air-fuel ratio difference becomes larger when the EGR supplying state is being realized (the routine shown in FIG. 17), and for obtaining the EGR-causing imbalance determination parameter Pegr (step 1820 shown in FIG. 18) varying depending on (in accordance with) the degree of the difference between the EGR supplying state imbalance determination parameter Pon and the EGR stop state imbalance determination parameter Poff, and imbalance determination means for comparing the EGR-causing imbalance determination parameter Pegr with the EGR-causing imbalance determination threshold Pegrth, and determining whether or not the inter-cylinder air-fuel ratio imbalance state has occurred based on the result of the comparison (step 1825 shown in FIG. 18).

As described above, the EGR-causing imbalance determination parameter Pegr is hard to be affected by the cylinder-by-cylinder air-fuel ratio difference caused by the factors other than the EGR gas, and therefore, accurately represents the cylinder-by-cylinder air-fuel ratio difference generated based on the supply of the EGR gas. Accordingly, the first determining apparatus can accurately determine whether or not the inter-cylinder air-fuel ratio imbalance state caused by (due to) the abnormality/defect of the EGR gas supply means has been occurring.

Further, the imbalance determination means of the first determining apparatus is configured so as to compare the EGR supplying state imbalance determination parameter Pon with the predetermined EGR supplying state imbalance determination threshold Ponth, and determines whether or not the inter-cylinder air-fuel ratio imbalance state has occurred based on the result of the comparison (step 1930 shown in FIG. 19).

Accordingly, when the EGR supplying state imbalance determination parameter Pon has been obtained, it can be determined that the inter-cylinder air-fuel ratio imbalance state has been occurring in a case where the cylinder-by-cylinder air-fuel ratio difference is large, even when the EGR stop state imbalance determination parameter Poff has not been obtained yet.

Furthermore, the imbalance determination means of the first determining apparatus is configured so as to compare the EGR stop state imbalance determination parameter Poff with the predetermined EGR stop state imbalance determination threshold Poffth, and determines whether or not the inter-cylinder air-fuel ratio imbalance state has occurred based on the result of the comparison (step 1970 shown in FIG. 19).

Accordingly, when the EGR stop state imbalance determination parameter Poff has been obtained, it can be determined that the inter-cylinder air-fuel ratio imbalance state has been occurring in a case where the cylinder-by-cylinder air-fuel ratio difference is large, even when the EGR supplying state imbalance determination parameter Pon has not been obtained yet.

It should be noted that the CPU 71 of the first determining apparatus may obtain, as the EGR-causing imbalance determination parameter Pegr, the ratio (=Pon/Poff) of the EGR supplying state imbalance determination parameter Pon to the EGR stop state imbalance determination parameter Poff, at step 1820 shown in FIG. 18. In this case, the CPU 71 may be configured so as to determine whether or not that parameter Pegr is larger than a predetermined EGR-causing imbalance determination threshold Pegrth which is larger than "1."

Second Embodiment

Next will be described a determining apparatus (hereinafter simply referred to as a "second determining apparatus") according to a second embodiment of the present invention. The second determining apparatus is different from the first determining apparatus only in that the second determining apparatus changes an EGR execution region on the basis of whether or not the EGR supplying state imbalance determination parameter Pon has already been obtained and whether or not the EGR stop state imbalance determination parameter Poff has already been obtained, to thereby obtain the both parameters as soon as possible. Accordingly, a description will be made focusing on these differences.

A CPU 71 of the second determining apparatus sets the EGR execution region as follows.

(Case 1)

The CPU 71 sets the EGR execution region to a usual EGR execution region, when neither the EGR supplying state imbalance determination parameter Pon nor the EGR stop state imbalance determination parameter Poff has been obtained. The usual EGR execution region is a shaded region surrounded by a line L1 shown in (A) of FIG. 20. The usual EGR execution region is the same as the region shown in the block of step 1510 of FIG. 15.

(Case 2)

The CPU 71 sets the EGR execution region to the usual EGR execution region, when both of the EGR supplying state imbalance determination parameter Pon and the EGR stop state imbalance determination parameter Poff have already been obtained. It should be noted that the CPU 71 also sets the EGR execution region to the usual EGR execution region, when the value of the imbalance determination completion flag XFIN is "1."

(Case 3)

The CPU 71 sets the EGR execution region to a narrowed EGR execution region, when the EGR supplying state imbalance determination parameter Pon has already been obtained, but the EGR stop state imbalance determination parameter Poff has not been obtained yet. The narrowed EGR execution region is a shaded region surrounded by a line L2 shown in (B) of FIG. 20. The narrowed EGR execution region is narrower than the usual EGR execution region, and is set within (inside of) the usual EGR execution region. That is, the narrowed EGR execution region is a portion of the usual EGR execution region.

(Case 4)

The CPU 71 sets the EGR execution region to an expanded/enlarged EGR execution region, when the EGR stop state imbalance determination parameter Poff has already been obtained, but the EGR supplying state imbalance determination parameter Pon has not been obtained yet. The expanded/enlarged EGR execution region is a shaded region surrounded by a line L3 shown in (C) of FIG. 20. The expanded/enlarged EGR execution region is wider/larger than the usual EGR execution region. That is, the usual EGR execution region is a portion of the expanded/enlarged EGR execution region.

The CPU 71 of the second determining apparatus executes the routines shown in FIGS. 13 to 19, similarly to the first determining apparatus. Further, the CPU 71 of the second determining apparatus executes an "EGR execution region determining routine" shown by a flowchart of FIG. 21, when the CPU 71 executes the process of step 1510 shown in FIG. 15 so as to execute the process of step 1510. Hereinafter, the process when the CPU 71 proceeds to step 1510 shown in FIG. 15 will be described with reference to FIG. 21.

Figure 20:
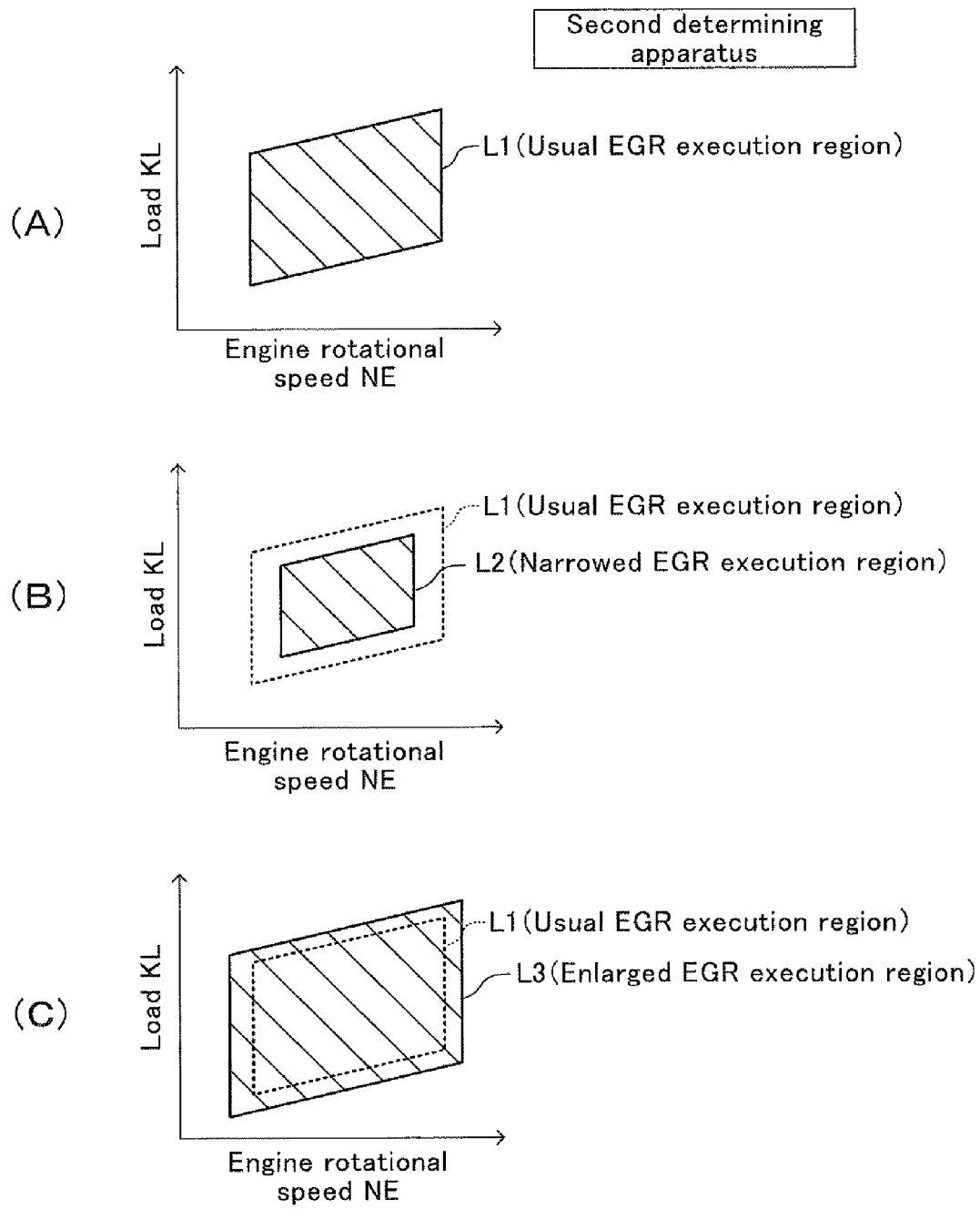
FIG. 20 shows an EGR execution region to which a CPU of an inter-cylinder air-fuel ratio imbalance determination apparatus (second determination apparatus) according to a second embodiment of the present invention refers.
Figure 21:
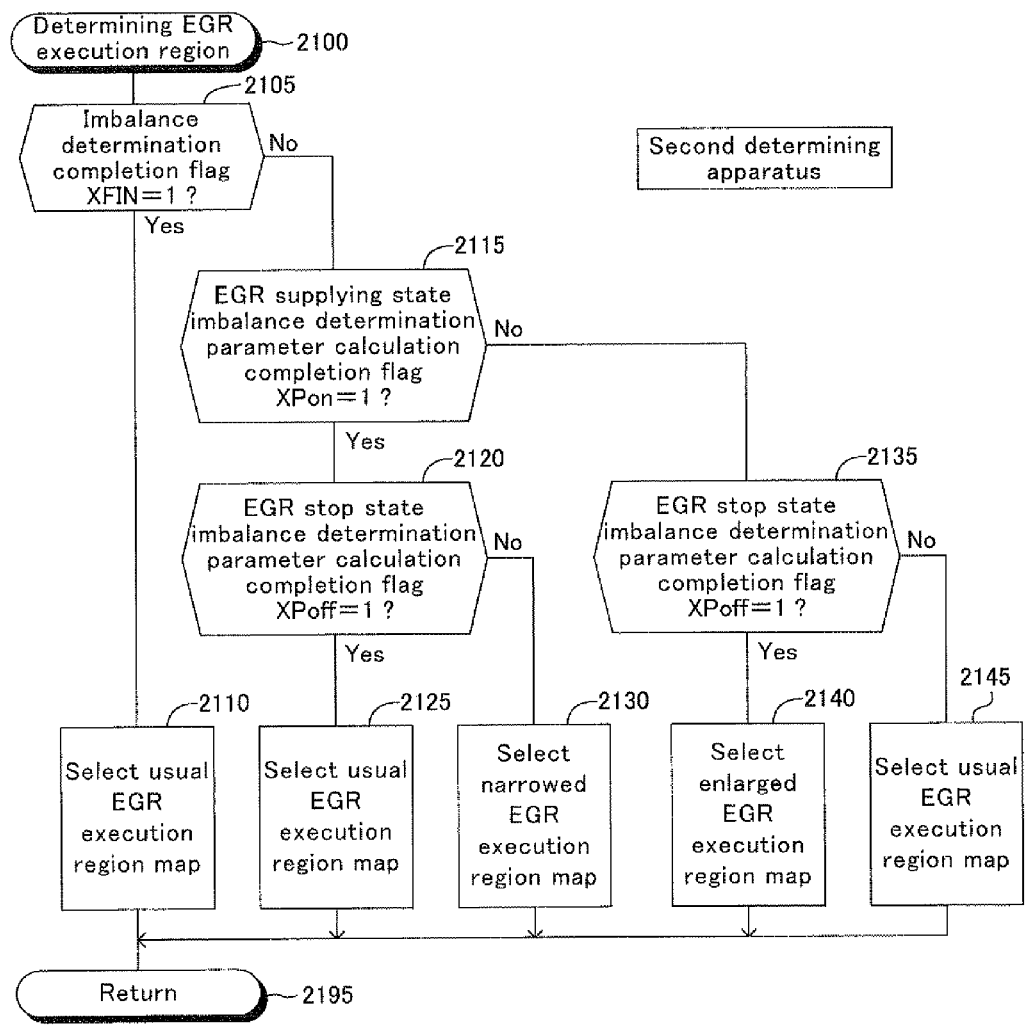
FIG. 21 is a flowchart showing a routine executed by the CPU of the second determination apparatus.

When the CPU 71 proceeds to step 1510, it proceeds to step 2105 from step 2100 shown in FIG. 21, and determines whether or not the value of the imbalance determination completion flag XFIN is "1." When the value of the imbalance determination completion flag XFIN has already been set to "1", the CPU 71 proceeds to step 2110 from step 2105 to set, as a map defining the EGR execution region, a map defining the usual EGR execution region (refer to (A) of FIG. 20). Thereafter, the CPU 71 proceeds to step 2195 to end the present routine, and makes the determination of step 1510 shown in FIG. 15.

When the CPU 71 executes the process of step 2105, if the value of the imbalance determination completion flag XFIN is not "1", the CPU 71 makes a "No" determination at step 2115 to determine whether or not the value of the EGR supplying state imbalance determination parameter calculation completion flag XPon is "1." When the flag XPon is "1", the CPU 71 makes a "Yes" determination at step 2115 to proceed to step 2120, at which the CPU 71 determines whether or not the value of the EGR stop state imbalance determination parameter calculation completion flag XPoff is "1."

When the value of the flag XPoff is "1", the CPU 71 makes a "Yes" determination at step 2120 to proceed to step 2125, at which the CPU 71 sets, as the map defining the EGR execution region, a map defining the usual EGR execution region (refer to (A) of FIG. 20). Thereafter, the CPU 71 proceeds to step 2195 to end the present routine, and makes the determination of step 1510 shown in FIG. 15.

If the value of the flag XPoff is "0" when the CPU 71 executes the process of step 2120, the CPU 71 makes a "No" determination at step 2120 to proceed to step 2130, at which the CPU 71 sets, as the map defining the EGR execution region, a map defining the narrowed EGR execution region (refer to (B) of FIG. 20). Thereafter, the CPU 71 proceeds to step 2195 to end the present routine, and makes the determination of step 1510 shown in FIG. 15.

Further, if the value of the flag XPon is "0" when the CPU 71 executes the process of step 2115, the CPU 71 makes a "No" determination at step 2115 to proceed to step 2135, at which the CPU 71 determines whether or not the value of the EGR stop state imbalance determination parameter calculation completion flag XPoff is "1."

If the value of the flag XPoff is "1", the CPU 71 makes a "Yes" determination at step 2135 to proceed to step 2140, at which the CPU 71 sets, as the map defining the EGR execution region, a map defining the expanded/enlarged EGR execution region (refer to (C) of FIG. 20). Thereafter, the CPU 71 proceeds to step 2195 to end the present routine, and makes the determination of step 1510 shown in FIG. 15.

In contrast, if the value of the flag XPoff is "0" when the CPU 71 executes the process of step 2135, the CPU 71 makes a "No" determination at step 2135 to proceed to step 2145, at which the CPU 71 sets, as the map defining the EGR execution region, the map defining the usual EGR execution region (refer to (A) of FIG. 20). Thereafter, the CPU 71 proceeds to step 2195 to end the present routine, and makes the determination of step 1510 shown in FIG. 15.

Thereafter, the CPU 71 determines, at step 1510 shown in FIG. 15, whether or not the operating state of the engine 10 represented by the operating parameters of the engine 10 (in the present example, the load KL and the engine rotational speed NE) is in the "EGR execution region which is defined by the map set as described above." Further, when the operating state of the engine 10 is in the "EGR execution region which is defined by the map set as described above", the CPU 71 proceeds to step 1540 to realize the EGR supplying state. In contrast, when the operating state of the engine 10 is not in the "EGR execution region which is defined by the map set as described above", the CPU 71 proceeds to step 1520 to realize the EGR stop state.

As described above, in the second determining apparatus, the EGR execution condition is defined/designed to be satisfied at least when "the actual rotational speed of the engine 10 and the actual load KL of the engine 10 are in the EGR execution region."

Further, the CPU 71 of the second determining apparatus comprises EGR gas supply control means for:

setting the EGR execution region to the "usual EGR execution region" (refer to step 2125 and step 2145), when neither the EGR supplying state imbalance determination parameter Pon nor the EGR stop state imbalance determination parameter Poff has been obtained (the case where the "No" determinations are made at both of step 2115 of FIG. 21 and step 2135 of FIG. 21), as well as when both of the EGR supplying state imbalance determination parameter Pon and the EGR stop state imbalance determination parameter Poff have been obtained (the case where the "Yes" determinations are made at both of step 2115 of FIG. 2 and step 2120 of FIG. 2); and setting the EGR execution region to the "narrowed EGR execution region (refer to step 2130), when the EGR supplying state imbalance determination parameter Pon has been obtained and the EGR stop state imbalance determination parameter Poff has not been obtained (in the case where the "Yes" determination is made at step 2115 of FIG. 21 and the "No" determination is made at step 2120).

According to the configuration described above, when the EGR supplying state imbalance determination parameter Pon has already been obtained and the EGR stop state imbalance determination parameter Poff has not been obtained yet, the EGR execution region is narrowed, so that the EGR stop state is realized more frequently. Therefore, the EGR stop state imbalance determination parameter Poff can be obtained earlier.

Accordingly, the second determining apparatus can obtain both of the EGR supplying state imbalance determination parameter Pon and the EGR stop state imbalance determination parameter Poff earlier. Consequently, the EGR-causing imbalance determination parameter Pegr can be obtained earlier, and thus, the second apparatus can earlier determine whether or not the inter-cylinder air-fuel ratio imbalance state due to the abnormality of the EGR gas supply means has occurred.

Further, the CPU 71 of the second determining apparatus includes the EGR gas supply control means for setting the EGR execution region to the expanded/enlarged EGR execution region (refer to step 2140), when the EGR stop state imbalance determination parameter Poff has been obtained and the EGR supplying state imbalance determination parameter Pon has not been obtained (in the case where the "No" determination is made at step 2115 of FIG. 21 and the "Yes" determination is made at step 2135 of FIG. 21).

According to the configuration described above, when the EGR stop state imbalance determination parameter Poff has already been obtained and the EGR supplying state imbalance determination parameter Pon has not been obtained yet, the EGR execution region is expanded/enlarged, so that the EGR supplying state is realized more frequently. Therefore, the EGR supplying state imbalance determination parameter Pon can be obtained earlier.

Accordingly, the second determining apparatus can obtain both of the EGR supplying state imbalance determination parameter Pon and the EGR stop state imbalance determination parameter Poff earlier. Consequently, the EGR-causing imbalance determination parameter Pegr can be obtained earlier, and thus, the second apparatus can earlier determine whether or not the inter-cylinder air-fuel ratio imbalance state due to the abnormality of the EGR gas supply means has occurred.

Third Embodiment

Next will be described a determining apparatus (hereinafter simply referred to as a "third determining apparatus") according to a third embodiment of the present invention. The third determining apparatus is different from the second determining apparatus only in that:

the third determining apparatus allows the imbalance determination parameters (the EGR supplying state imbalance determination parameter Pon and the EGR stop state imbalance determination parameter Poff) to be obtained when the engine rotational speed NE and the load of the engine 10 is in a predetermined parameter obtaining region;

the third determining apparatus sets the narrowed EGR execution region to a region which is within the usual EGR execution region but is outside of the parameter obtaining region; and the third determining apparatus sets the expanded/enlarged EGR execution region to a region which is obtained by adding a "region, which is within the parameter obtaining region, but with which the usual EGR execution region does not overlap" to the "usual EGR execution region" (i.e., a region included in at least one of the usual EGR execution region and the parameter obtaining region). Accordingly, a description will be made focusing on these differences. It should be noted that, in the present example, the parameter obtaining region overlaps with the usual EGR execution region at (over) a certain portion only.

A CPU 71 of the third determining apparatus obtains the EGR supplying state imbalance determination parameter Pon, when the engine rotational speed NE and the engine load KL is in the parameter obtaining region surrounded by a broken line L4 shown in (A)-(C) of FIG. 2, and when the EGR supplying state is being realized. Further, the CPU 71 of the third determining apparatus obtains the EGR stop state imbalance determination parameter Poff, when the engine rotational speed NE and the engine load KL is in the parameter obtaining region, and when the EGR stop state is being realized.

The CPU 71 of the third determining apparatus sets the EGR execution region as follows.
(Case 1)
The CPU 71 sets the EGR execution region to a usual EGR execution region, when neither the EGR supplying state imbalance determination parameter Pon nor the EGR stop state imbalance determination parameter Poll have been obtained yet. The usual EGR execution region is a shaded region surrounded by a line L1 shown in (A) of FIG. 22. This region is the same as the region shown in the block of step 1510 of FIG. 15 and the region surrounded by the line L1 of FIG. 20.
(Case 2)
The CPU 71 sets the EGR execution region to the usual EGR execution region, when both of the EGR supplying state imbalance determination parameter Pon and the EGR stop state imbalance determination parameter Poff have already been obtained. It should be noted that the CPU 71 also sets the EGR execution region to the usual EGR execution region, when the value of the imbalance determination completion flag XFIN is "1."
(Case 3)
The CPU 71 sets the EGR execution region to a "shaded region surrounded by a line L2 shown in (B) of FIG. 22", when the EGR supplying state imbalance determination parameter Pon has already been obtained, but the EGR stop state imbalance determination parameter Poff has not been obtained yet. This narrowed EGR execution region is narrower than the usual EGR execution region, and is within (inside of) the usual EGR execution region but outside of the parameter obtaining region.
(Case 4)
The CPU 71 sets the EGR execution region to a "shaded region surrounded by a line L3 shown in (C) of FIG. 22", when the EGR stop state imbalance determination parameter Poff has already been obtained, but the EGR supplying state imbalance determination parameter Pon has not been obtained yet. This expanded/enlarged EGR execution region is wider/larger than the usual EGR execution region, and a region which is obtained by adding a "region, which is inside of the parameter obtaining region, but with which the usual EGR execution region does not overlap" to the "usual EGR execution region."

The CPU 71 of the third determining apparatus executes the routines shown in FIGS. 13 to 19, similarly to the first determining apparatus. Further, the CPU 71 of the third determining apparatus executes an "EGR execution region determining routine" shown by a flowchart of FIG. 21, when the CPU 71 executes the process of step 1510 shown in FIG. 15 to thereby determine the EGR execution region for executing the process of step 1510. In addition, the CPU 71 of the third determining apparatus executes is configured so as to execute a routine shown by a flowchart of FIG. 23 in order to set the value of the obtaining parameter permission flag Xkyoka. The routines other than the routine shown in FIG. 23 have been described, and thus, the routine shown in FIG. 23 will mainly be described.
<Setting of the Obtaining Parameter Permission Flag Xkyoka>

Figure 16:
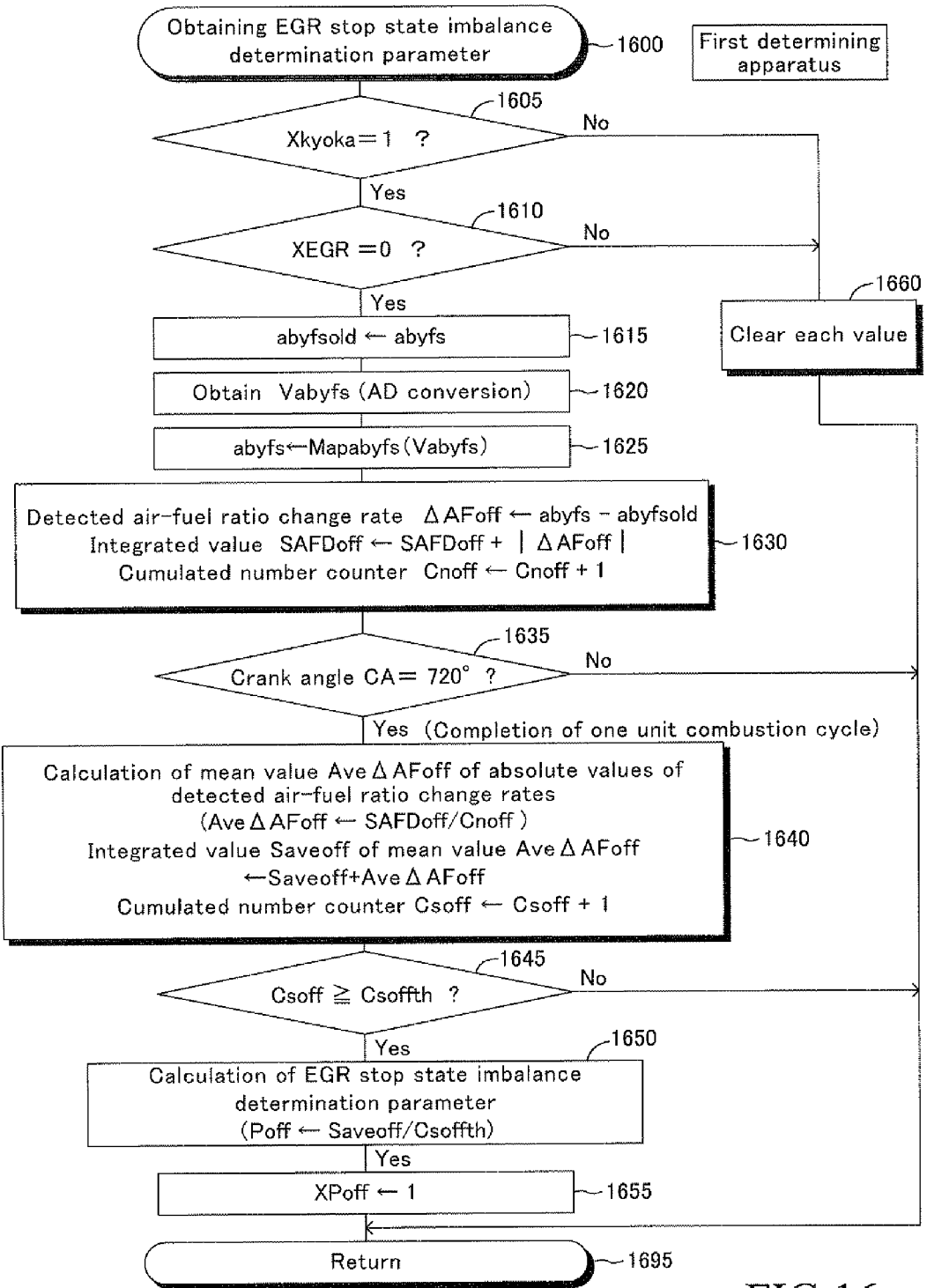
FIG. 16 is a flowchart showing another routine executed by the CPU of the first determination apparatus.

As described before, the CPU 71 obtains the imbalance determination parameters, when the value of the obtaining parameter permission flag Xkyoka is "1" (refer to step 1605 shown in FIG. 16 and step 1705 shown in FIG. 17).

Figure 23:
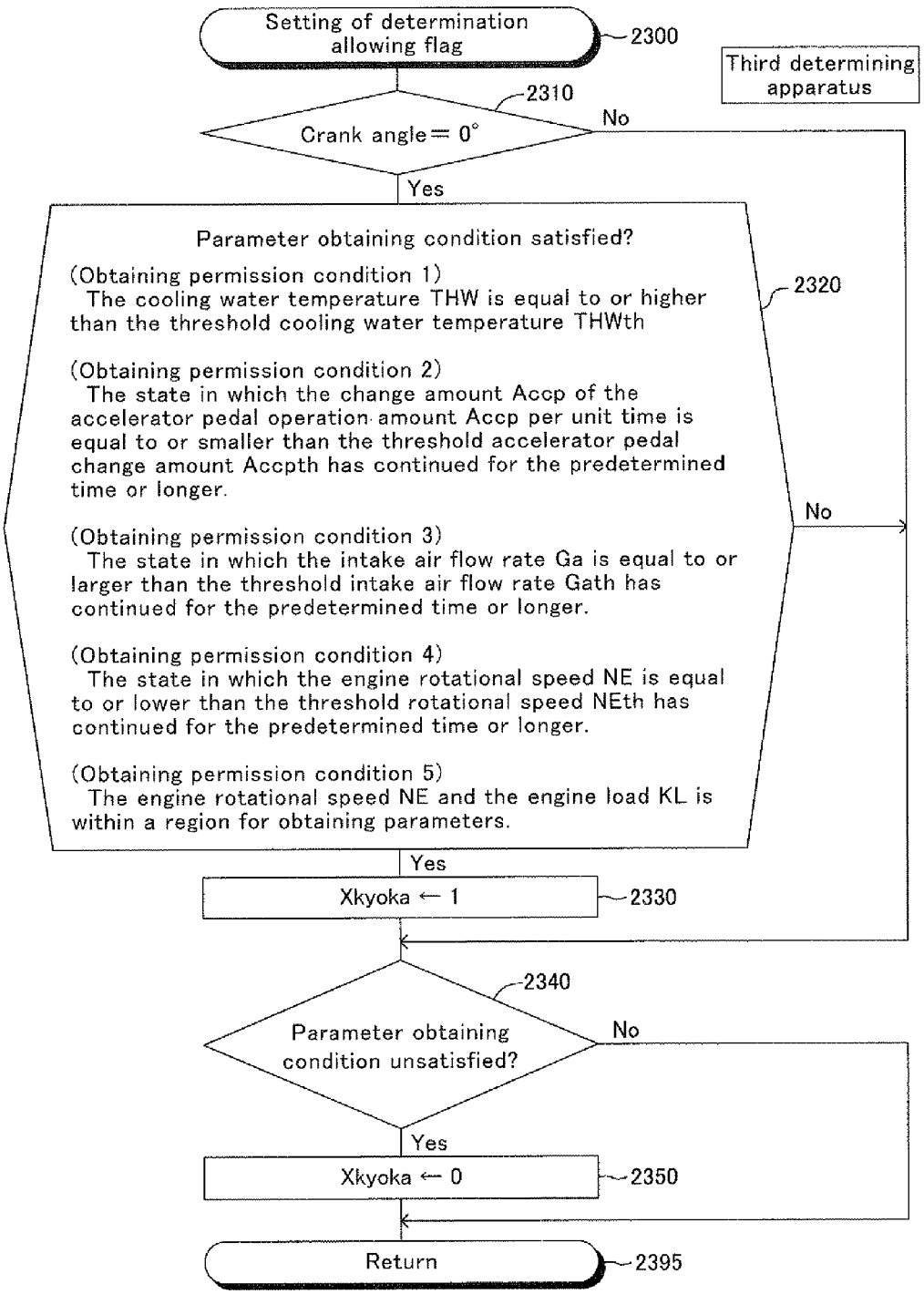
FIG. 23 is a flowchart showing a routine executed by the CPU of the third determination apparatus.

The value of the obtaining parameter permission flag Xkyoka is set by a "determination allowing flag setting routine" shown by a flowchart of FIG. 23 which the CPU 71 executes every time a predetermined time (4 ms) elapses. It should be noted that the value of the obtaining parameter permission flag Xkyoka is set to (at) "0" in the initial routine described above.

When the predetermined timing comes, the CPU 71 starts processing from step 2300 of FIG. 23 to proceed to step 2310, at which the CPU 71 determines whether or not the absolute crank angle CA reaches 0° crank angle (=720° crank angle).

When the CPU 71 executes the process of step 2310, if the absolute crank angle CA does not coincide with 0° crank angle, the CPU 71 makes a "No" determination at step 2310 to directly proceed to step 2340.

In contrast, when the CPU 71 executes the process of step 2310, if the absolute crank angle CA coincides with 0° crank angle, the CPU 71 makes a "Yes" determination at step 2310 to proceed to step 2320, at which the CPU 71 determines whether or not the parameter obtaining condition is satisfied. That is, the CPU 71 determines whether or not all of obtaining permission conditions 1 to 5 described below are satisfied. The obtaining permission conditions 1 to 4 are the same as the obtaining permission conditions 1 to 4 described above, respectively.

(Obtaining permission condition 1) The cooling water temperature THW is equal to or higher than the threshold cooling water temperature THWth.

(Obtaining permission condition 2) The state in which the change amount ΔAccp of the accelerator pedal operation amount Accp per unit time is equal to or smaller than the threshold accelerator pedal change amount ΔAccpth has continued for the predetermined time or longer.

(Obtaining permission condition 3) The state in which the intake air flow rate Ga is equal to or larger than the threshold intake air flow rate Gath has continued for the predetermined time or longer.

(Obtaining permission condition 4) The state in which the engine rotational speed NE is equal to or lower than the threshold rotational speed NEth has continued for the predetermined time or longer.

Figure 22:
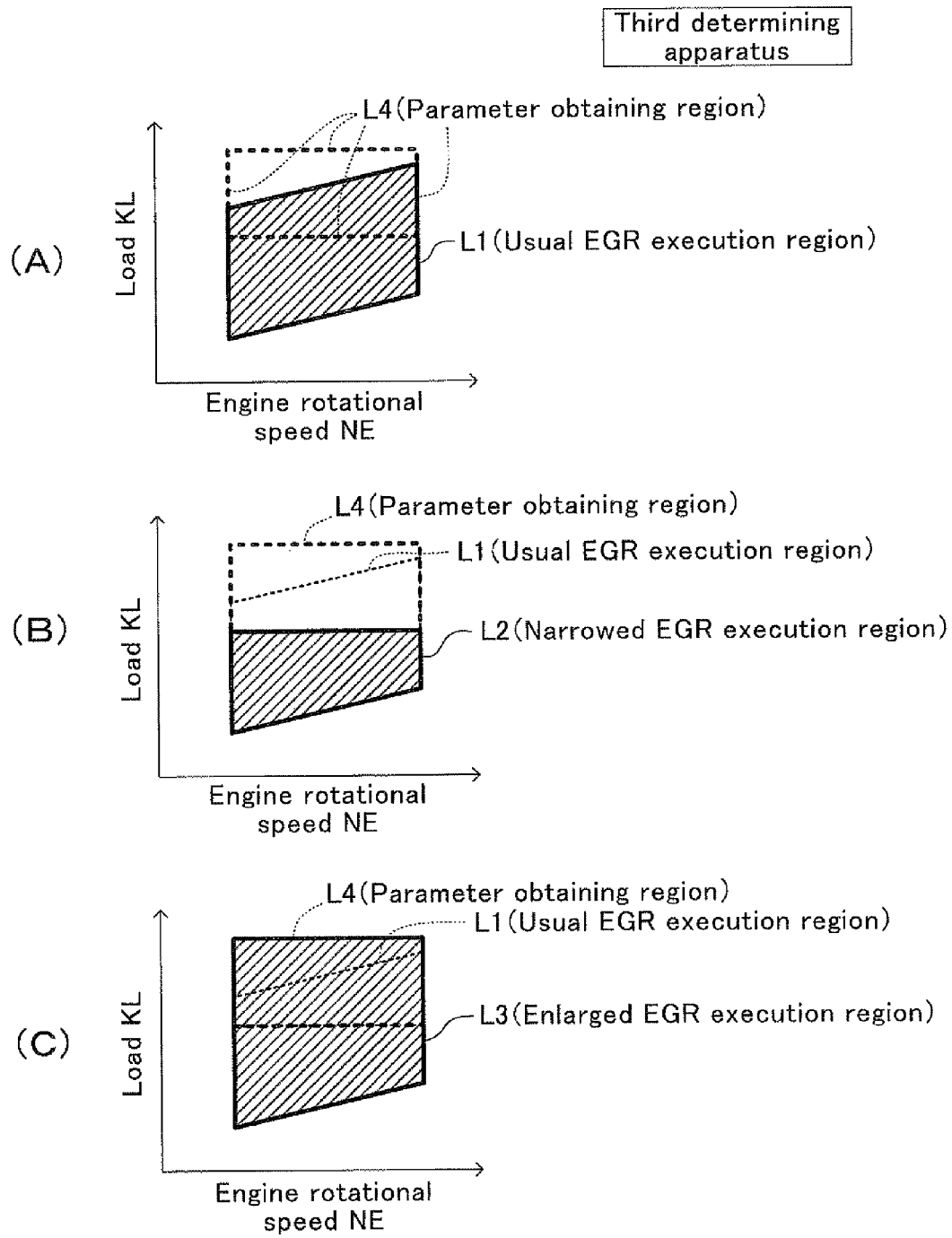
FIG. 22 is shows EGR execution regions to which a CPU of an inter-cylinder air-fuel ratio imbalance determination apparatus (third determination apparatus) according to a third embodiment of the present invention refers.

(Obtaining permission condition 5) The operating state of the engine 10 represented by the engine rotational speed NE and the engine load KL is within the region shown by the broken line L4 of (A) of FIG. 22.

When the CPU 71 executes the process of step 2320, if the parameter obtaining condition is not satisfied, the CPU 71 makes a "No" determination at step 2320 to directly proceed to step 2340.

In contrast, when the CPU 71 executes the process of step 2320, if the parameter obtaining condition is satisfied, the CPU 71 makes a "Yes" determination at step 2320 to proceed to step 2330, at which the CPU 71 sets the value of the obtaining parameter permission flag Xkyoka to (at) "1". Thereafter, the CPU 71 proceeds to step 2340.

The CPU 71 determines whether or not the parameter obtaining condition is unsatisfied. When the parameter obtaining condition is unsatisfied, the CPU 71 proceeds from step 2340 to step 2350, at which the CPU 71 sets the value of the obtaining parameter permission flag Xkyoka to (at) "1", and thereafter, proceeds to step 2395 to end the present routine tentatively. In contrast, when the CPU 71 executes the process of step 2340, if the parameter obtaining condition is satisfied, the CPU 71 directly proceeds from step 2340 to step 2395 to end the present routine tentatively.

In this manner, the value of the obtaining parameter permission flag Xkyoka is set to (at) "1" if the parameter obtaining condition is satisfied, when the absolute crank angle CA reaches 0 crank angle. The value of the obtaining parameter permission flag Xkyoka is set to (at) "0" when the parameter obtaining condition becomes unsatisfied.

Consequently, the CPU 71 obtains the EGR supplying state imbalance determination parameter Pon and the EGR stop state imbalance determination parameter Poff on the condition that the operating state of the engine 10 represented by the engine rotational speed NE and the engine load KL is in the parameter obtaining region (refer to step 1605 shown in FIG. 16 and step 1705 shown in FIG. 17).

Further, when the CPU 71 proceeds step 2110, step 2125, and step 2145, in FIG. 21, the CPU 71 sets the EGR execution region to the "shaded region surrounded by the line L1 shown in (A) of FIG. 22." When the CPU 71 proceeds step 2130 in FIG. 21, the CPU 71 sets the EGR execution region to the "shaded region surrounded by the line L2 shown in (B) of FIG. 22." When the CPU 71 proceeds step 2140 in FIG. 21, the CPU 71 sets the EGR execution region to the "shaded region surrounded by the line L3 shown in (C) of FIG. 22."

As described above, the imbalance determination parameter obtaining means of the third determining apparatus is configured so as to obtain the EGR supplying state imbalance determination parameter Pon, when the actual rotational speed NE of the engine 10 and the actual load KL of the engine 10 is in the "predetermined parameter obtaining region in which the imbalance parameters are allowed to be obtained" (refer to the obtaining permission condition 5 in step 2320 of FIG. 23 and step 2330 of FIG. 23), and when the EGR supplying state is being realized (refer to the "Yes" determinations at step 1705 and step 1710, both in FIG. 17). The imbalance determination parameter obtaining means of the third determining apparatus is configured so as to obtain the EGR stop state imbalance determination parameter Poff, when the actual rotational speed NE of the engine 10 and the actual load KL of the engine 10 is in the predetermined parameter obtaining region (refer to the obtaining permission condition 5 in step 2320 of FIG. 23 and step 2330 of FIG. 23), and when the EGR stop state is being realized (refer to the "Yes" determinations at step 1605 and step 1610, both in FIG. 16).

According to the configuration above, even when the EGR stop state is being realized, the EGR stop state imbalance determination parameter Poff is not obtained when the engine 10 is not being operated in the "parameter obtaining region in which the imbalance parameters are allowed to be obtained."

In view of the above, the EGR gas supply control means of the third determining apparatus is configured so as to set the narrowed EGR execution region to the "region, which is inside of the usual EGR execution region, but which is outside of the parameter obtaining region" (refer to step 2130 in FIG. 21, and the shaded portion of (B) of FIG. 22).

Consequently, when the EGR supplying state imbalance determination parameter Pon has already been obtained but the EGR stop state imbalance determination parameter Poff has not been obtained yet, a state does not arises in which a supply of the EGR gas is unnecessarily stopped where the EGR gas is supposed to be supplied (i.e., when the engine 10 is being operated in the usual EGR execution region) in order to obtain the EGR stop state imbalance determination parameter Poff. Accordingly, the possibility of deterioration of emission can be reduced.

Similarly, in the third determining apparatus, even when the EGR supplying state is being realized, the EGR supplying imbalance determination parameter Pon is not obtained when the engine 10 is not being operated in the "parameter obtaining region in which the imbalance parameters are allowed to be obtained."

In view of the above, the EGR gas supply control means of the third determining apparatus is configured so as to set the expanded/enlarged EGR execution region to the region, which is obtained by adding the "region within the parameter obtaining region, with which the usual EGR execution region does not overlap" to the "usual EGR execution region" (refer to step 2140 in FIG. 21 and the shaded portion of (C) of FIG. 22).

Consequently, when the EGR stop state imbalance determination parameter Poff has already been obtained but the EGR supplying state imbalance determination parameter Pon has not been obtained yet, a state does not arises in which the EGR gas is unnecessarily supplied when the EGR gas is not supposed to be supplied (i.e., when the engine 10 is being operated in the region outside of the usual EGR execution region) in order to obtain the EGR supplying state imbalance determination parameter Pon. Accordingly, the possibility of deterioration of emission and/or deterioration of drivability can be reduced.

Fourth Embodiment

Next will be described a determining apparatus (hereinafter simply referred to as a "fourth determining apparatus") according to a fourth embodiment of the present invention.

The fourth determining apparatus differentiates a period in which the EGR gas is actually being supplied from a period in which a condition satisfied when the EGR gas should be supplied (EGR execution condition) is being satisfied, on the basis of whether each of the EGR supplying state imbalance determination parameter Pon and the EGR stop state imbalance determination parameter Poff has been obtained, as follows.

(Case 1) Neither the EGR supplying state imbalance determination parameter Pon nor the EGR stop state imbalance determination parameter Poff has been obtained.

The CPU 71 has/makes the period in which the condition satisfied when the EGR gas should be supplied is being satisfied coincide with the period in which the EGR gas is actually being supplied.

Figure 24:
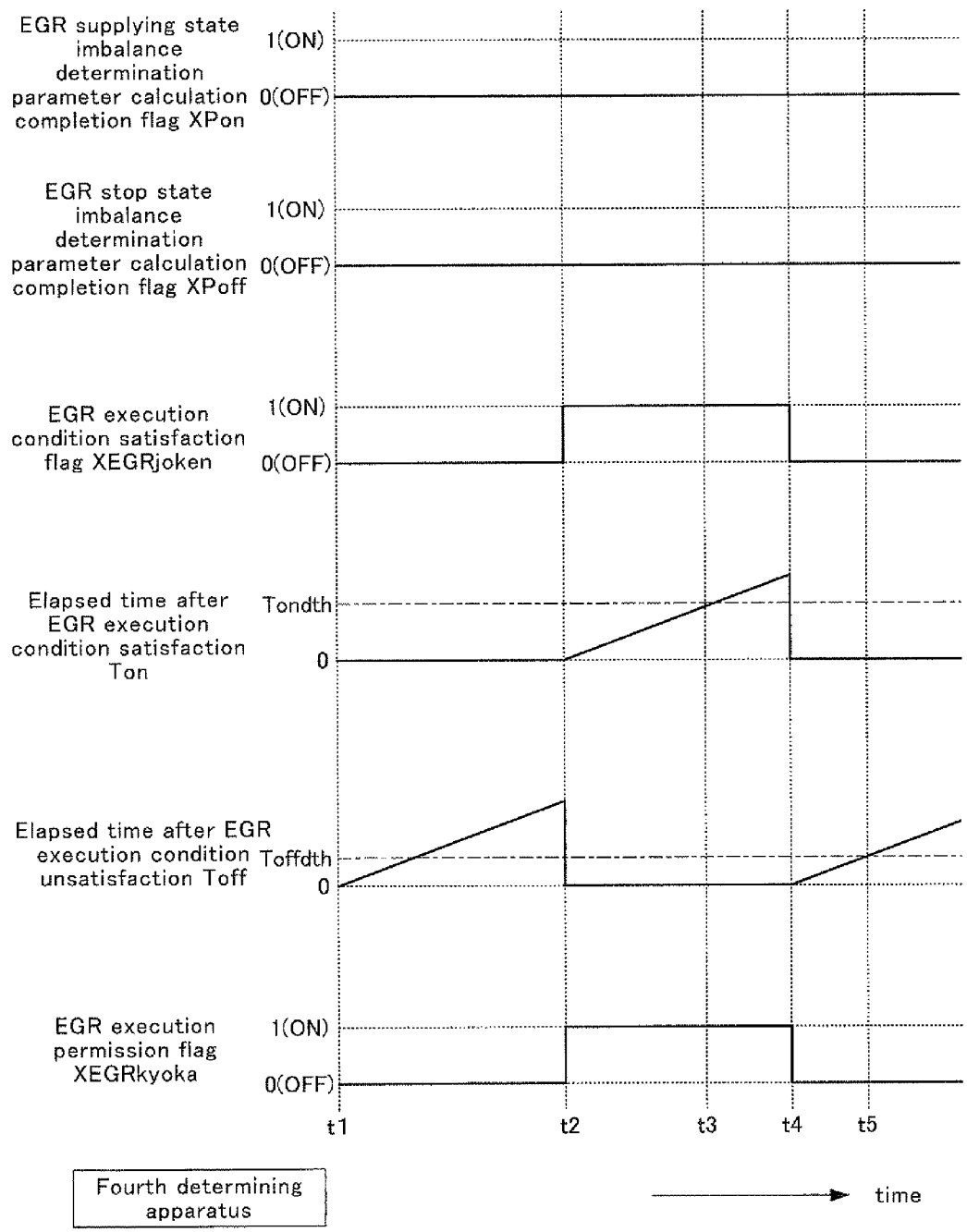
FIG. 24 is a timing chart showing behaviors of each flag to describe an operation of an inter-cylinder air-fuel ratio imbalance determination apparatus (fourth determination apparatus) according to a fourth embodiment of the present invention.

That is, as shown in a timing chart of FIG. 24, the CPU 71 has/makes an EGR execution condition satisfaction flag XEGRjoken change in the same way as an EGR execution permission flag XEGRkyoka (refer to time t2 and time t4). A value of the EGR execution condition satisfaction flag XEGRjoken is set to (at) "1", when the condition satisfied when the EGR gas should be supplied is being satisfied. The EGR execution permission flag XEGRkyoka is a flag to allow the EGR gas to be supplied (executed) when the value of the flag XEGRkyoka is "1."

(Case 2) Both of the EGR supplying state imbalance determination parameter Pon and the EGR stop state imbalance determination parameter Poff have been obtained.

In this case as well, the CPU 71 has/makes the period in which the condition satisfied when the EGR gas should be supplied is being satisfied coincide with the period in which the EGR gas is actually being supplied. It should also be noted that the CPU 71 has/makes the period in which the condition satisfied when the EGR gas should be supplied is being satisfied coincide with the period in which the EGR gas is actually being supplied, when the imbalance determination completion flag XFIN is "1."

(Case 3) The EGR supplying state imbalance determination parameter Pon has been obtained, but the EGR stop state imbalance determination parameter Poff has not been obtained.

The CPU 71 starts to supply the EGR gas from a point in time at which an elapsed time (elapsed time after EGR execution condition satisfaction) Ton of a period in which the condition satisfied when the EGR gas should be supplied is being satisfied becomes equal to or longer than a start delay time Tondth. The CPU 71 stops supplying the EGR gas immediately after the condition satisfied when the EGR gas should be supplied becomes unsatisfied. This lengthens a period in which the EGR stop state is being realized, and thus, the EGR stop state imbalance determination parameter Poff can be obtained earlier.

Figure 25:
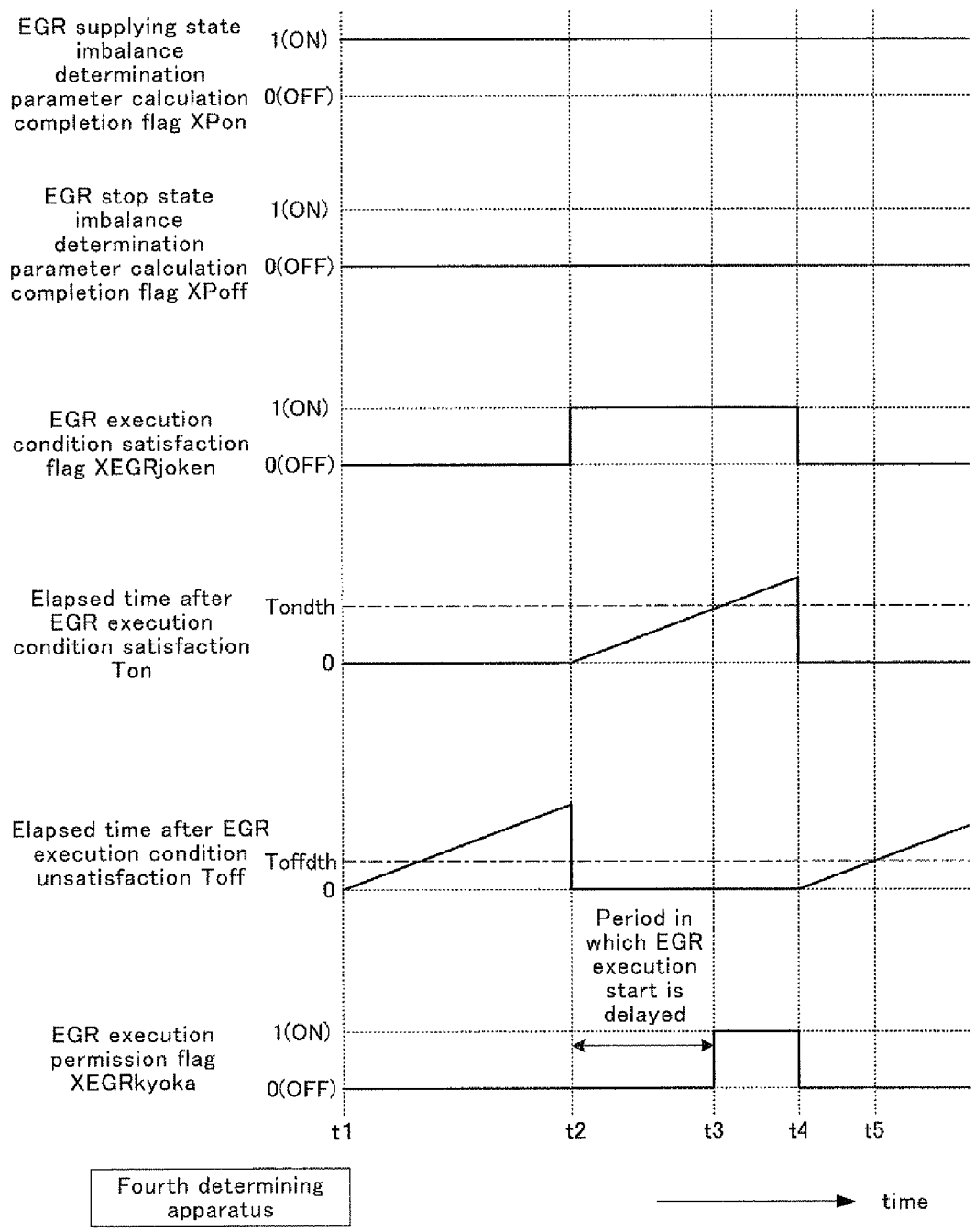
FIG. 25 is another timing chart showing behaviors of each flag to describe the operation of the fourth determination apparatus.

That is, as shown in a timing chart of FIG. 25, the CPU 71 changes the value of the EGR execution permission flag XEGRkyoka to "1", when the start delay time Tondth has elapsed after the EGR execution condition satisfaction flag XEGRjoken was changed from "0" to "1" (refer to time t2 and time t3). In contrast, the CPU 71 changes the value of the EGR execution permission flag XEGRkyoka to "0", when the EGR execution condition satisfaction flag XEGRjoken is changed from "1" to "0" (refer to time t4).

(Case 4) The EGR stop state imbalance determination parameter Poff has been obtained, but the EGR supplying state imbalance determination parameter Pon has not been obtained.

The CPU 71 starts to supply the EGR gas immediately after the condition satisfied when the EGR gas should be supplied is satisfied. The CPU 71 stops supplying the EGR gas when an elapsed time (elapsed time after EGR execution condition unsatisfaction) Toff of a period in which the condition satisfied when the EGR gas should be supplied is being unsatisfied becomes equal to or longer than a stop delay time Toffdth. This lengthens a period in which the EGR supplying state is being realized, and thus, the EGR supplying state imbalance determination parameter Pon can be obtained earlier.

Figure 26:
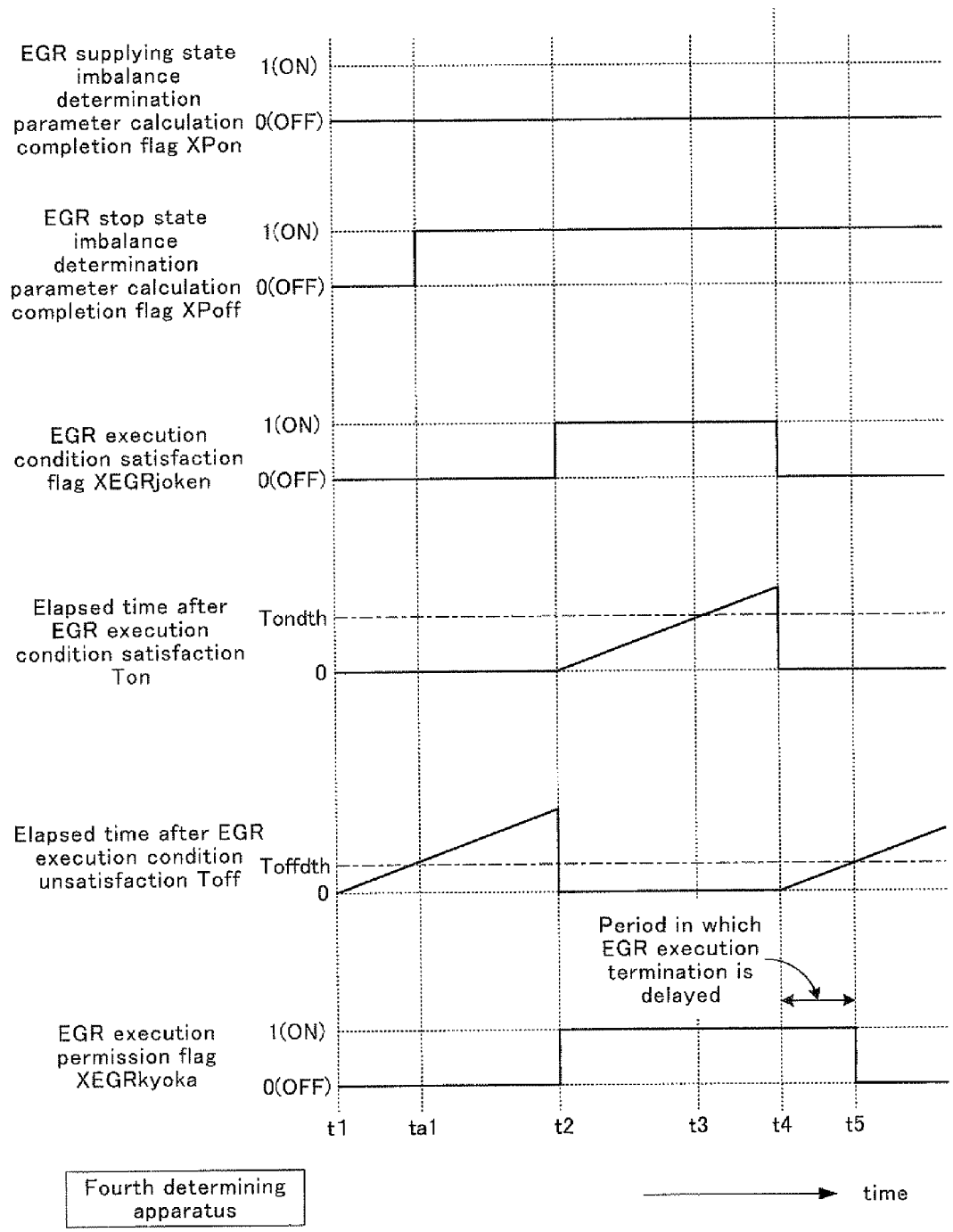
FIG. 26 is another timing chart showing behaviors of each flag to describe the operation of the fourth determination apparatus.

That is, as shown in a timing chart of FIG. 26, the CPU 71 changes the value of the EGR execution permission flag XEGRkyoka to "1", when the EGR execution condition satisfaction flag XEGRjoken is changed from "0" to "1" (refer to time t2). In contrast, the CPU 71 changes the value of the EGR execution permission flag XEGRkyoka to "0" when the stop delay time Toffdth has elapsed after the EGR execution condition satisfaction flag XEGRjoken was changed from "1" to "0" (refer to time t4 and time t5).

Actual operation of the fourth determining apparatus will next be described. The CPU 71 of the fourth determining apparatus executes the routines shown in FIGS. 13-19 (except FIG. 15), and routines shown in FIGS. 27-31. The routines other than ones shown in FIGS. 27-31 have already been described, and thus, the routines shown in FIGS. 27-31 will mainly be described. It should be noted that each step at which the same processing is performed as each step which has been already described in the other routines is given the same numeral as one given to such step.

Figure 27:
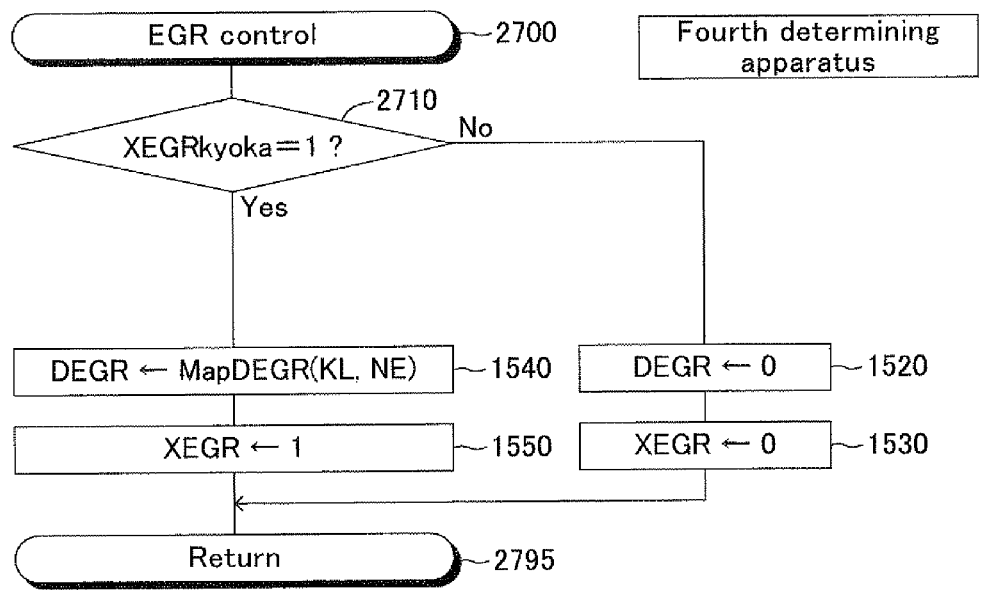
FIG. 27 is a flowchart showing a routine executed by a CPU of the fourth determination apparatus.

The CPU 71 executes an "EGR control routine" shown by a flowchart of FIG. 27 every time a predetermined time elapses. Accordingly, when the predetermined timing comes, the CPU 71 starts processing from step 2700 to proceed to step 2710, at which the CPU 71 determines whether or not the value of the EGR execution permission flag XEGRkyoka is "1." The value for the EGR execution permission flag XEGRkyoka is set by the routines shown in FIGS. 28-31. It should be noted that the value of the EGR execution permission flag XEGRkyoka is set to (at) "0" in the initial routine described above.

When the value of the EGR execution permission flag XEGRkyoka is "0", the CPU 71 execute the processes of step 1520 and step 1530, and ends the present routine tentatively. Therefore, the EGR stop state is realized, and the value of the EGR supplying flag XEGR is set to (at) "0." In contrast, when the EGR execution permission flag XEGRkyoka is "1", the CPU 71 execute the processes of step 1540 and step 1550, and ends the present routine tentatively. Therefore, the EGR supplying state is realized, and the value of the EGR supplying flag XEGR is set to (at) "1."

Figure 28:
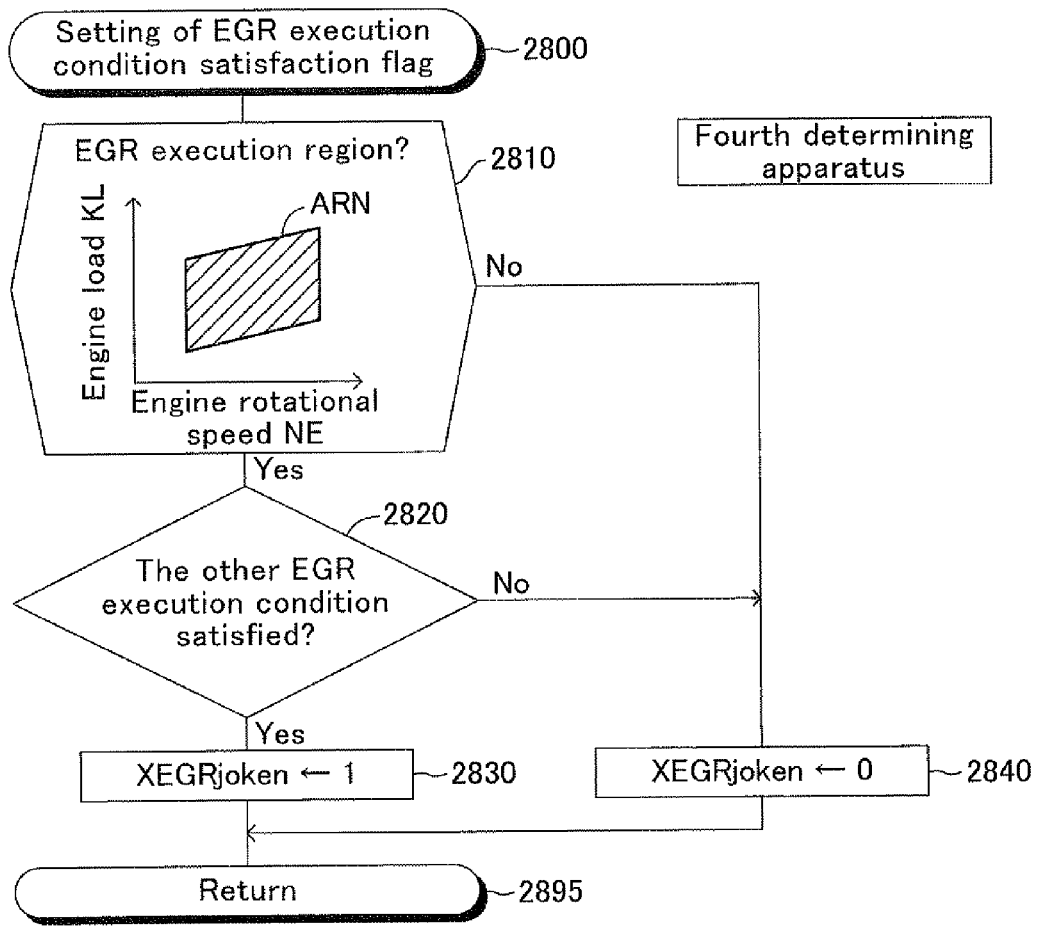
FIG. 28 is a flowchart showing another routine executed by the CPU of the fourth determination apparatus.

The CPU 71 executes an "EGR execution condition satisfaction flag setting routine" shown by a flowchart of FIG. 28 every time a predetermined time elapses. Accordingly, when the predetermined timing comes, the CPU 71 starts processing from step 2800 to proceed to step 2810, at which the CPU 71 executes the same process as that of step 1510. That is, the CPU 71 determines whether or not the operating state of the engine 10 represented by the engine rotational speed NE and the engine load KL is in the EGR execution region (usual EGR execution region).

When the operating state of the engine 10 is in the EGR execution region, the CPU 71 makes a "Yes" determination at step 2810 to proceed to step 2820, at which the CPU 71 determines whether or not the other EGR execution condition is satisfied. For example, the other EGR execution condition is satisfied when the cooling water temperature THW is equal to or higher than an EGR permission cooling water temperature THWthegr. It should be noted that step 2810 and step 2820 are steps to determine whether or not the EGR execution condition is satisfied.

When the other EGR execution condition is satisfied, the CPU 71 proceeds to step 2830 to set the value of the EGR execution condition satisfaction flag XEGRjoken to (at) "1." It should be noted that the value of the EGR execution condition satisfaction flag XEGRjoken to (at) "0" in the initial routine described above.

In contrast, when the operating state of the engine 10 is not in the EGR execution region, and/or when the other EGR execution condition is not satisfied, the CPU 71 proceeds to step 2840 to set the value of the EGR execution condition satisfaction flag XEGRjoken to (at) "0."

Figure 29:
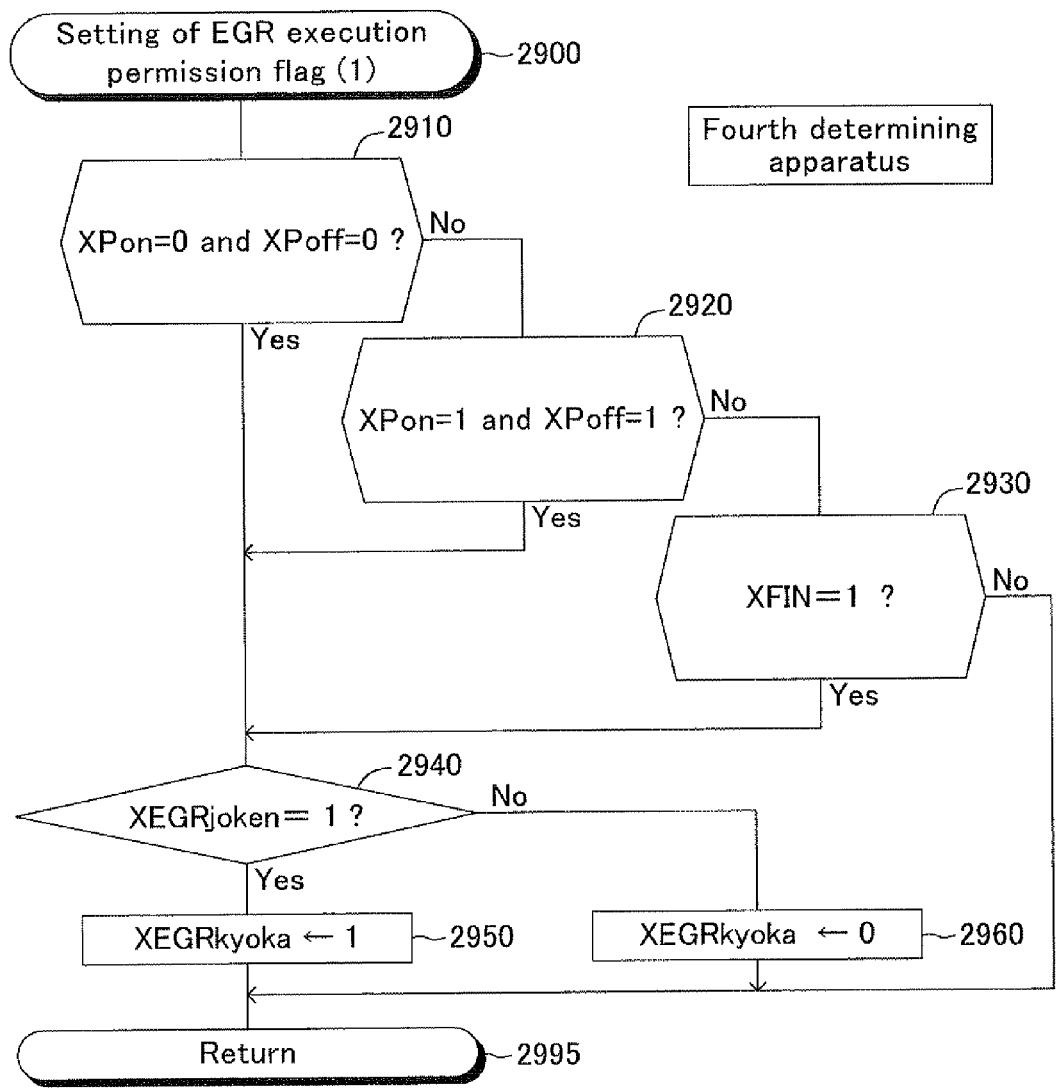
FIG. 29 is a flowchart showing another routine executed by the CPU of the fourth determination apparatus.

Further, the CPU 71 executes an "EGR execution permission flag setting routine (1)" shown by a flowchart of FIG. 29 every time a predetermined time elapses. In this routine, the CPU 71 proceeds to step 2940 in cases described below, and the CPU 71 ends the present routine tentatively in the other cases without proceeding to step 2940.
(1) a case in which neither the EGR supplying state imbalance determination parameter Pon nor the EGR stop state imbalance determination parameter Poff has been obtained, and therefore, both the EGR supplying state imbalance determination parameter calculation completion flag XPon and the EGR stop state imbalance determination parameter calculation completion flag XPoff are "0" (refer to a "Yes" determination at step 2910);
(2) a case in which both of the EGR supplying state imbalance determination parameter Pon and the EGR stop state imbalance determination parameter Poff have been obtained, and therefore, both of the EGR supplying state imbalance determination parameter calculation completion flag XPon and the EGR stop state imbalance determination parameter calculation completion flag XPoff are "1" (refer to a "Yes" determination at step 2920); and
(3) a case in which the value of the imbalance determination completion flag XFIN is "1" (refer to a "Yes" determination at step 2930).

When the CPU 71 proceeds to step 2940, the CPU 71 determines whether or not the value of the EGR execution condition satisfaction flag XEGRjoken is "1." When the value of the EGR execution condition satisfaction flag XEGRjoken is "1", the CPU 71 proceeds to step 2950 to set the value of the EGR execution permission flag XEGRkyoka to (at) "1." As a result, the EGR supplying state is realized (refer to the "Yes" determination at step 2710).

In contrast, when the CPU proceeds to step 2940, the value of the EGR execution condition satisfaction flag XEGRjoken is "0", the CPU 71 proceeds to step 2960 to set the value of the EGR execution permission flag XEGRkyoka to (at) "0." Consequently, the EGR stop state is realized (refer to the "No" determination at step 2710). In this manner, in the case where the CPU 71 proceeds to step 2940, the CPU 71 makes the period in which the condition satisfied when the EGR gas should be supplied is being satisfied coincide with the period in which the EGR gas actually is being supplied.

Figure 30:
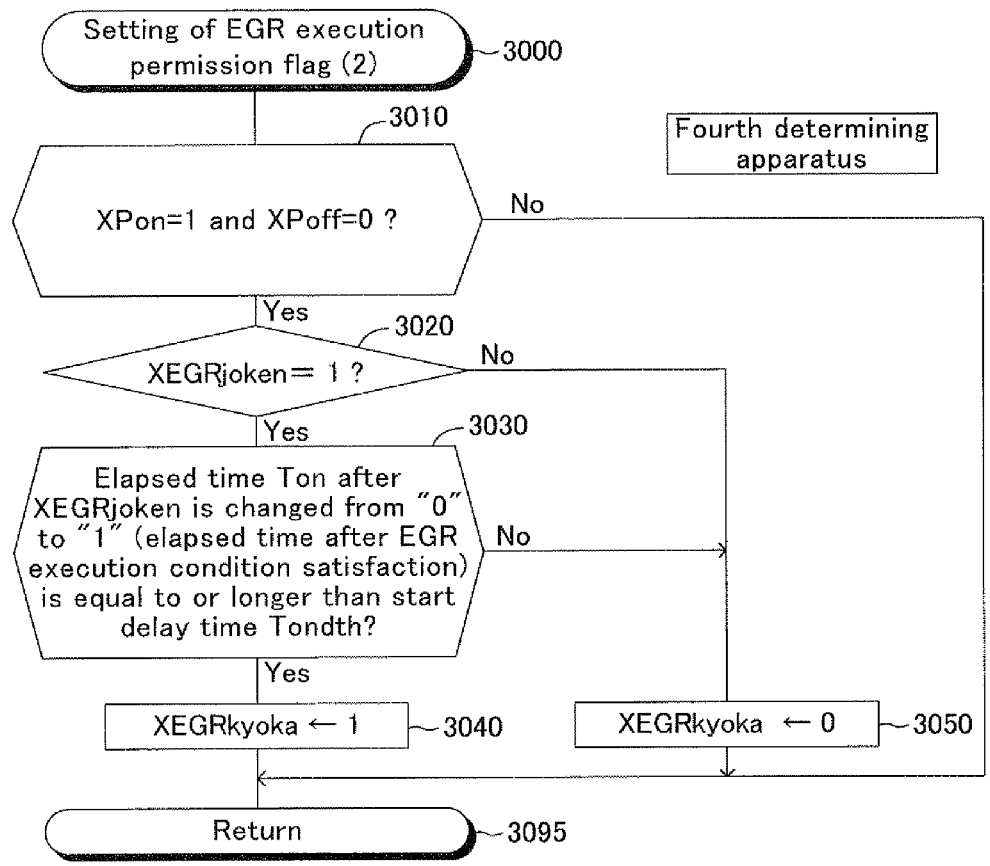
FIG. 30 is a flowchart showing another routine executed by the CPU of the fourth determination apparatus.

Further, the CPU 71 executes an "EGR execution permission flag setting routine (2)" shown by a flowchart of FIG. 30 every time a predetermined time elapses. In this routine, the CPU 71 proceeds to step 3020 in a "case in which the EGR supplying state imbalance determination parameter Pon has already been obtained, but the EGR stop state imbalance determination parameter Poff has not been obtained yet", and the CPU 71 ends the present routine tentatively in the other cases without proceeding to step 3020.

That is, when the CPU 71, at step 3010, determines whether or not the value of the EGR supplying state imbalance determination parameter calculation completion flag XPon is "1" and the value of the EGR stop state imbalance determination parameter calculation completion flag XPoff is "0", and proceeds to step 3020 when the CPU makes a "Yes" determination at step 3010.

When the CPU 71 proceeds to step 3020, the CPU 71 determines whether or not the value of the EGR execution condition satisfaction flag XEGRjoken is "1." When the value of the EGR execution condition satisfaction flag XEGRjoken is "1", the CPU 71 proceeds to step 3030 to determines whether or not the elapsed time after EGR execution condition satisfaction Ton which is an elapsed time after the value of the EGR execution condition satisfaction flag XEGRjoken is changed from "0" to "1" is equal to or longer than the start delay time Tondth.

When the elapsed time after EGR execution condition satisfaction Ton is shorter than the start delay time Tondth, the CPU 71 makes a "No" determination at step 3030 to proceed to step 3050, at which the CPU 71 sets the value of the EGR execution permission flag XEGRkyoka to (at) "0", and thereafter, proceeds to step 3095 to end the present routine tentatively.

On the other hand, when the CPU 71 executes the process of step 3030, if the elapsed time after EGR execution condition satisfaction Ton is equal to or longer than the start delay time Tondth, the CPU 71 makes a "Yes" determination at step 3030 to proceed to step 3040, at which the CPU 71 sets the value of the EGR execution permission flag XEGRkyoka to (at) "1", and thereafter, proceeds to step 3095 to end the present routine tentatively.

Further, when the CPU 71 executes the process of step 3020, if the value of the EGR execution condition satisfaction flag XEGRjoken is "0", the CPU 71 proceeds to step 3050 to set the EGR execution permission flag XEGRkyoka to (at) "0", and thereafter, proceeds to step 3095 to end the present routine tentatively.

Consequently, when the EGR supplying state imbalance determination parameter Pon has been obtained, but the EGR stop state imbalance determination parameter Poff has not been obtained yet, the CPU 71 starts to supply the EGR gas at the point in time when the elapsed time after EGR execution condition satisfaction Ton is equal to or longer than the start delay time Tondth, and stops supplying the EGR gas immediately after the condition satisfied when the EGR gas should be supplied becomes unsatisfied.

Figure 31:
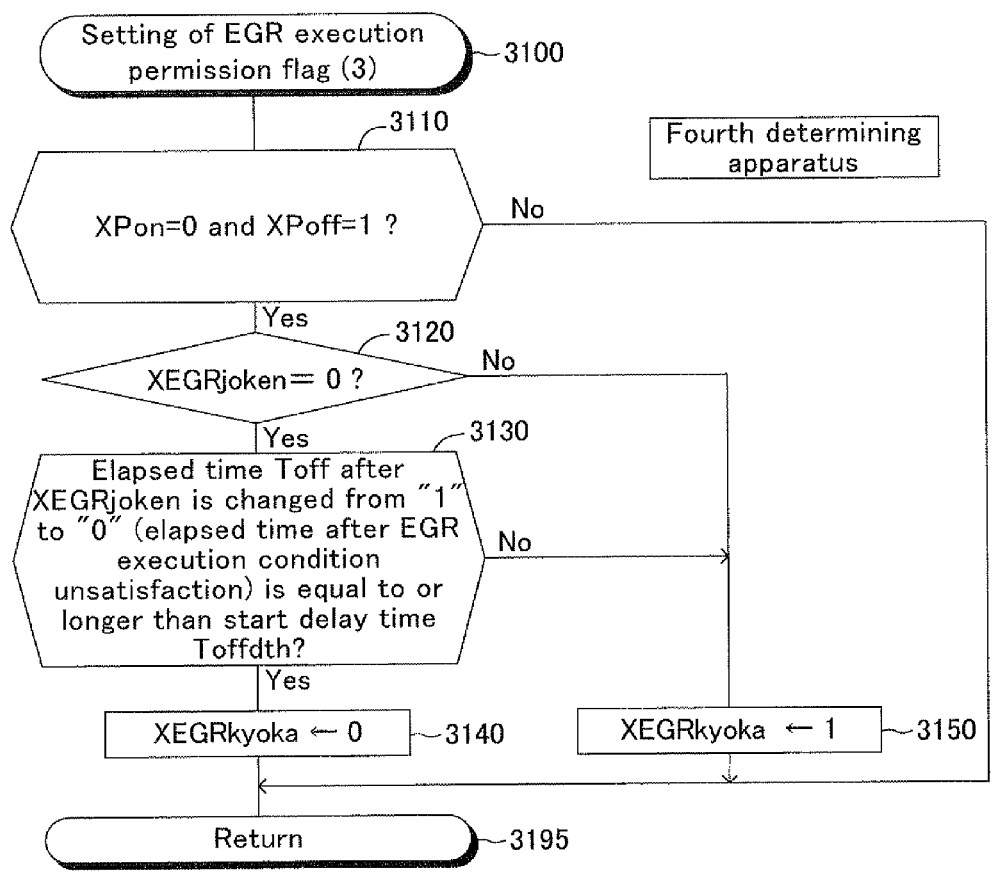
FIG. 31 is a flowchart showing another routine executed by the CPU of the fourth determination apparatus.

Further, the CPU 71 executes an "EGR execution permission flag setting routine (3)" shown by a flowchart of FIG. 31 every time a predetermined time elapses. In this routine, the CPU 71 proceeds to step 3120 in a "case in which the EGR stop state imbalance determination parameter Poff has already been obtained, but the EGR supplying state imbalance determination parameter Pon has not been obtained yet", and the CPU 71 ends the present routine tentatively in the other cases without proceeding to step 3120.

That is, the CPU 71 determines whether or not the value of the EGR supplying state imbalance determination parameter calculation completion flag XPon is "0" and the value of the EGR stop state imbalance determination parameter calculation completion flag XPoff is "1" at step 3110, and proceeds to step 3120 when the CPU 71 makes a "Yes" determination at step 3110.

When the CPU 71 proceeds to step 3120, the CPU 71 determines whether or not the value of the EGR execution condition satisfaction flag XEGRjoken is "0". When the value of the EGR execution condition satisfaction flag XEGRjoken is "0", the CPU 71 proceeds to step 3130 to determine whether or not the elapsed time after EGR execution condition unsatisfaction Toff which is the elapsed time since the value of the EGR execution condition satisfaction flag XEGRjoken is changed from "1" to "0" becomes equal to or longer than the stop delay time Toffdth.

When the elapsed time after EGR execution condition unsatisfaction Toff is shorter than the stop delay time Toffdth, the CPU 71 makes a "No" determination at step 3130 to proceed to step 3150, at which the CPU 71 sets the value of the EGR execution permission flag XEGRkyoka to (at) "1", and thereafter, proceeds to step 3195 to end the present routine tentatively.

On the other hand, when the CPU 71 executes the process of step 3130, if the elapsed time after EGR execution condition unsatisfaction Toff is equal to or longer than the stop delay time Toffdth, the CPU 71 makes a "Yes" determination at step 3130 to proceed to step 3140, at which the CPU 71 sets the value of the EGR execution permission flag XEGRkyoka to (at) "0", and thereafter proceeds to step 3195 to end the present routine tentatively.

Further, when the CPU 71 executes the process of step 3120, if the value of the EGR execution condition satisfaction flag XEGRjoken is "1", the CPU 71 proceeds to step 3150 to set the EGR execution permission flag XEGRkyoka to (at) "0", and thereafter, proceeds to step 3195 to end the present routine tentatively.

Consequently, when the EGR stop state imbalance determination parameter Poff has been obtained, but the EGR supplying state imbalance determination parameter Pon has not been obtained yet, the CPU 71 starts to supply the EGR gas immediately after the condition satisfied when the EGR gas should be supplied becomes satisfied, and stops supplying the EGR gas at the point in time when the elapsed time after EGR execution condition unsatisfaction Toff becomes equal to or longer than the stop delay time Toffdth.

As described above, the EGR gas supply control means of the fourth determining apparatus is configured so as to realize the EGR supplying state when the state in which the EGR execution condition is satisfied continues for the predetermined start delay time Tondth or longer, and so as to realize the EGR stop state when the EGR execution condition becomes unsatisfied (refer to the routines shown in FIGS. 27, 28, and 30), in the case in which the EGR supplying state imbalance determination parameter Pon has already been obtained, but the EGR stop state imbalance determination parameter Poff has not been obtained.

Accordingly, when the EGR supplying state imbalance determination parameter Pon has already been obtained, but the EGR stop state imbalance determination parameter Poff has not been obtained, the EGR supplying state is not realized during a period in which the start delay time Tondth has not elapsed, and thus, the EGR stop state is more frequently realized. Accordingly, the EGR stop state imbalance determination parameter Poff can be obtained earlier. Consequently, both of the EGR supplying state imbalance determination parameter Pon and the EGR stop state imbalance determination parameter Poff can be obtained earlier, and thus, the EGR-causing imbalance determination parameter can be obtained earlier. Accordingly, the apparatus can earlier determine whether or not the inter-cylinder air-fuel ratio imbalance state due to the abnormality of the EGR gas supply means has occurred.

Further, the EGR gas supply control means of the fourth determining apparatus is configured so as to realize the EGR supplying state when EGR execution condition becomes satisfied, and so as to realize the EGR stop state when the state in which the EGR execution condition is unsatisfied continues for the predetermined stop delay time Toffdth or longer (refer to the routines shown in FIGS. 27, 28, and 31), in the case in which the EGR stop state imbalance determination parameter Poff has already been obtained, but the EGR supplying state imbalance determination parameter Pon has not been obtained.

Accordingly, when the EGR stop state imbalance determination parameter Poff has already been obtained, but the EGR supplying state imbalance determination parameter Pon has not been obtained, the EGR stop state is not realized during a period in which the stop delay time Toffdth has not elapsed. Therefore, the EGR gas supplying state is more frequently realized. Accordingly, the EGR supplying state imbalance determination parameter Pon can be obtained earlier. Consequently, both of the EGR supplying state imbalance determination parameter Pon and the EGR stop state imbalance determination parameter Poff can be obtained earlier, and thus, the EGR-causing imbalance determination parameter can be obtained earlier. Accordingly, the apparatus can earlier determine whether or not the inter-cylinder air-fuel ratio imbalance state due to the abnormality of the EGR gas supply means has occurred.

Fifth Embodiment

Next will be described a determining apparatus (hereinafter simply referred to as a "fifth determining apparatus") according to a fifth embodiment of the present invention.

The fifth determining apparatus is different from the fourth determining apparatus only in the following points.
(Different Point 1)

When the EGR supplying state imbalance determination parameter Pon has already been obtained, but the EGR stop state imbalance determination parameter Poff has not been obtained yet, the fifth determining apparatus starts to supply the EGR gas immediately after the parameter obtaining condition becomes unsatisfied, even before the start delay time Tondth after the EGR execution condition satisfaction flag XEGRjoken is changed from "0" to "1" elapses (i.e., for EGR start delay period).
(Different Point 2)

When the EGR stop state imbalance determination parameter Poff has already been obtained but the EGR supplying state imbalance determination parameter Pon has not been obtained yet, the fifth determining apparatus stops supplying the EGR gas immediately after the parameter obtaining condition becomes unsatisfied, even before the stop delay time Toffdth after the EGR execution condition satisfaction flag XEGRjoken is changed from "1" to "0" elapses (i.e., for EGR stop delay period).

More specifically, the CPU 71 of the fifth determining apparatus differentiates a period in which the EGR gas is actually being supplied from a period in which a condition satisfied when the EGR gas should be supplied is being satisfied, on the basis of whether or not the EGR supplying state imbalance determination parameter Pon has been obtained, the EGR stop state imbalance determination parameter Poff has been obtained, and the parameter obtaining condition is satisfied, as follows.

(Case 1 and 2) Neither the EGR supplying state imbalance determination parameter Pon nor the EGR stop state imbalance determination parameter Poff has been obtained; both of the EGR supplying state imbalance determination parameter Pon and the EGR stop state imbalance determination parameter Poff have been obtained; and the value of the imbalance determination completion flag XFIN is "t"

The CPU 71 makes the period in which the condition satisfied when the EGR gas should be supplied is being satisfied coincide with the period in which the EGR gas is actually being supplied regardless of whether or not the parameter obtaining condition is satisfied.

Figure 32:
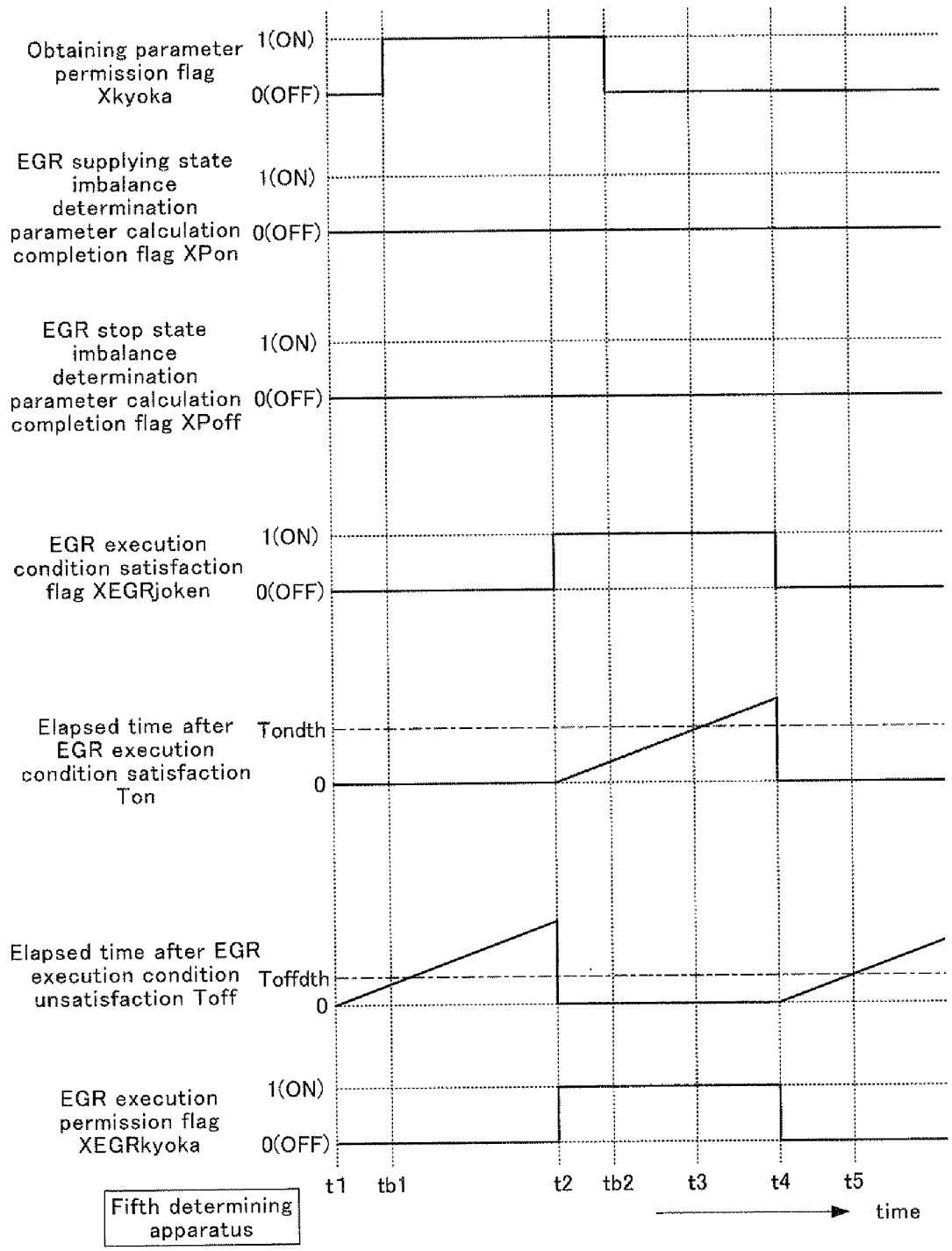
FIG. 32 is a timing chart showing behaviors of each flag to describe an operation of an inter-cylinder air-fuel ratio imbalance determination apparatus (fifth determination apparatus) according to a fifth embodiment of the present invention.

That is, as shown in a timing chart of FIG. 32, the CPU 71 has/makes the EGR execution permission flag XEGRkyoka change in the same way as the EGR execution condition satisfaction flag XEGRjoken (refer to time t2 and time t4).

(Case 3) The EGR supplying state imbalance determination parameter Pon has been obtained, but the EGR stop state imbalance determination parameter Poff has not been obtained yet.

The CPU 71 starts to supply the EGR gas when the elapsed time (elapsed time after EGR execution condition satisfaction) Ton of the period in which the condition satisfied when the EGR gas should be supplied is being satisfied becomes equal to or longer than the start delay time Tondth. Note that, the CPU 71 starts to supply the EGR gas when the parameter obtaining condition becomes unsatisfied, even before the elapsed time after EGR execution condition satisfaction Ton becomes equal to or longer than the start delay time Tondth.

Further, the CPU 71 stop supplying the EGR gas immediately after the condition satisfied when the EGR gas should be supplied becomes unsatisfied.

Figure 33:
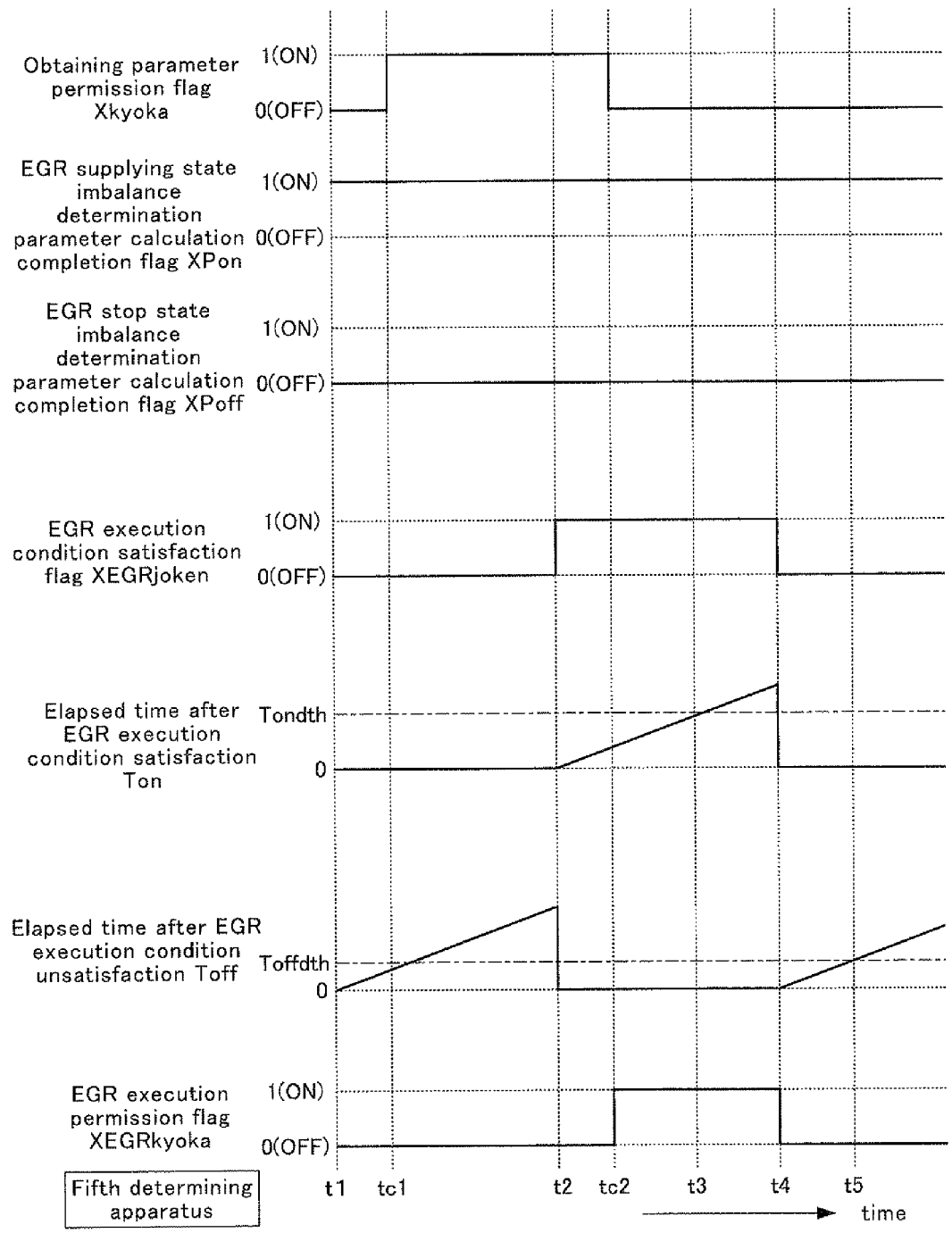
FIG. 33 is another timing chart showing behaviors of each flag to describe the operation of the fifth determination apparatus.

That is, as shown in a timing chart of FIG. 33, the CPU 71 changes the value of the EGR execution permission flag XEGRkyoka to "1", when the value of the obtaining parameter permission flag Xkyoka is changed to "0" (refer to time tc2), even before a point in time (time t3) when the start delay time Tondth elapses after the EGR execution condition satisfaction flag XEGRjoken is changed from "0" to "1." In contrast, the CPU 71 changes the value of the EGR execution permission flag XEGRkyoka to "0" when the value of the EGR execution condition satisfaction flag XEGRjoken is changed from "1" to "0" (refer to time t4).

(Case 4) The EGR stop state imbalance determination parameter Poff has been obtained, but the EGR supplying state imbalance determination parameter Pon has not been obtained yet.

The CPU 71 starts to supply the EGR gas immediately after the condition satisfied when the EGR gas should be supplied is satisfied. The CPU 71 stops supplying the EGR gas when the elapsed time (elapsed time after EGR execution condition unsatisfaction) Toff of the period in which the condition satisfied when the EGR gas should be supplied is being unsatisfied becomes equal to or longer than a stop delay time Toffdth. Note that, the CPU 71 stops supplying the EGR gas immediately after the parameter obtaining condition becomes unsatisfied, even before the elapsed time after EGR execution condition unsatisfaction Toff becomes equal to or longer than the stop delay time Tondth.

Figure 34:
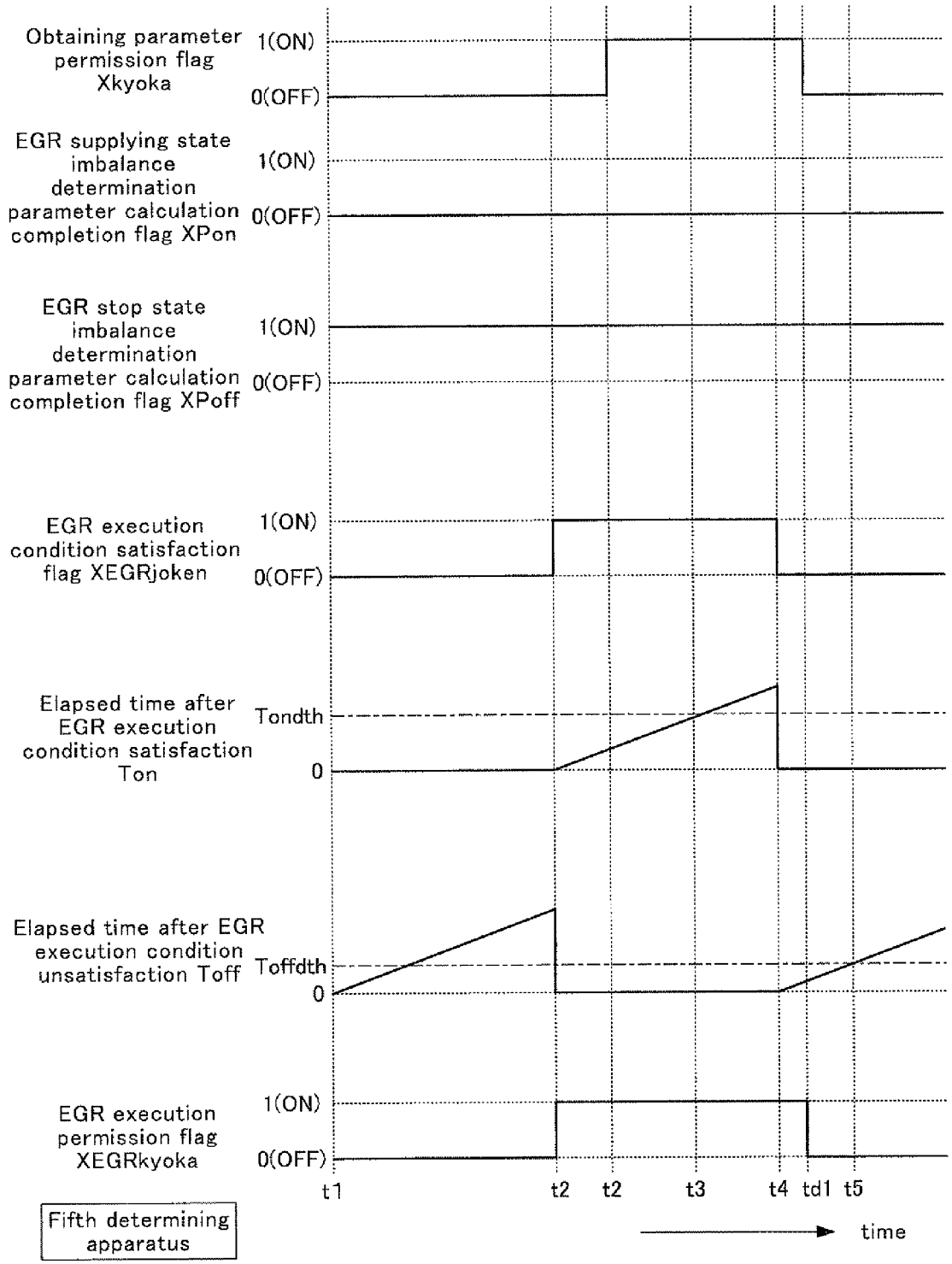
FIG. 34 is another timing chart showing behaviors of each flag to describe the operation of the fifth determination apparatus.

That is, as shown in a timing chart of FIG. 34, the CPU 71 changes the value of the EGR execution permission flag XEGRkyoka to "1", when the value of the EGR execution condition satisfaction flag XEGRjoken is changed from "0" to "1" (refer to time tc2). Further, the CPU 71 changes the value of the EGR execution permission flag XEGRkyoka to "0" when the value of the obtaining parameter permission flag Xkyoka becomes "0" (refer to time td1), even before the stop delay time Toffdth elapses (time t5) after the EGR execution condition satisfaction flag XEGRjoken is changed from "1" to "0"

Actual operation of the fifth determining apparatus will next be described. The CPU 71 of the fifth determining apparatus executes the routines shown in FIGS. 13-19 (except FIG. 15), and routines shown in FIGS. 35-37. The routines other than ones shown in FIGS. 35-37 have already been described, and thus, the routines shown in FIGS. 35-37 will mainly be described. It should be noted that each step at which the same processing is performed as each step which has been already described in the other routines is given the same numeral as one given to such step.

Figure 35:
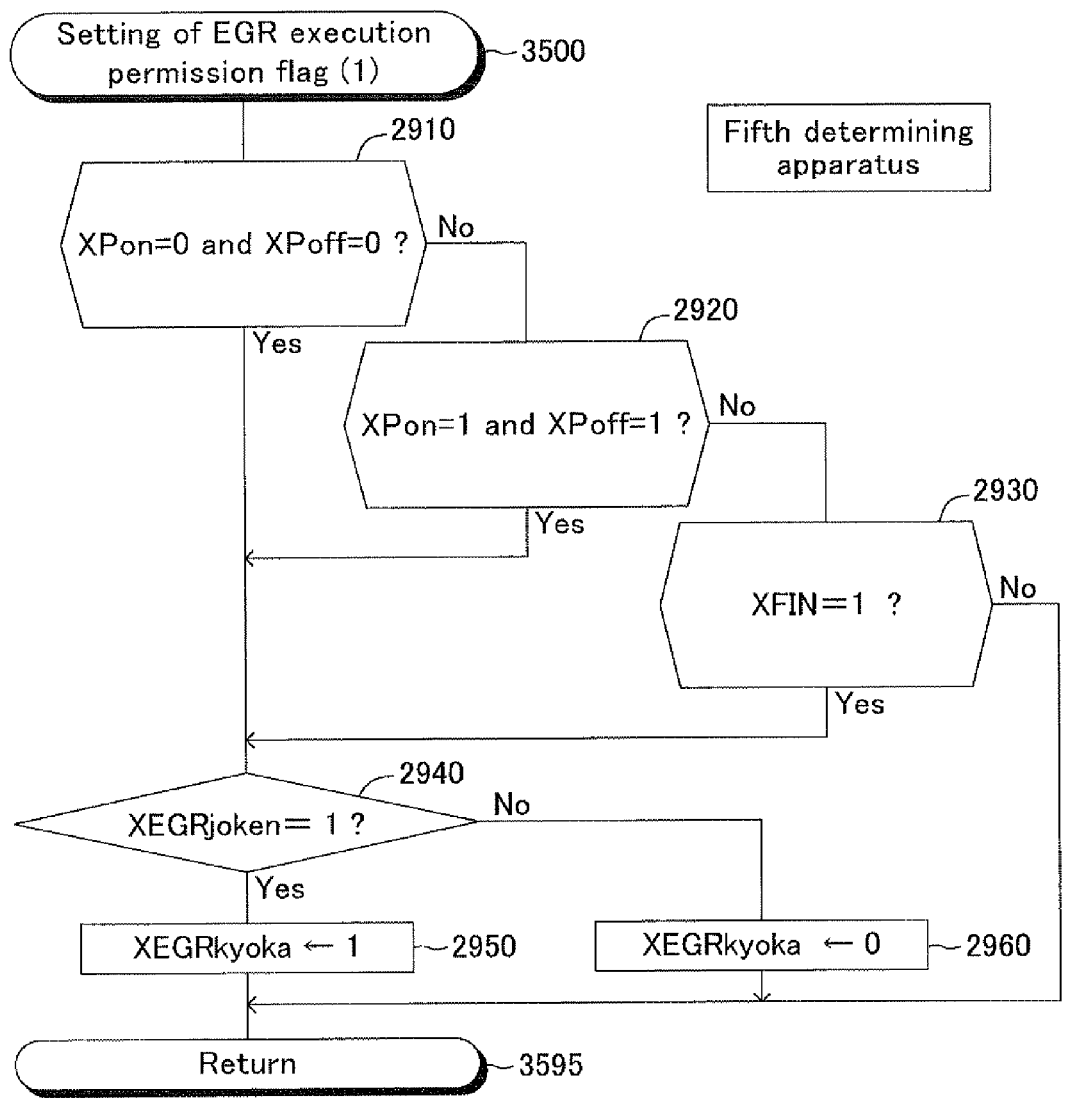
FIG. 35 is a flowchart showing a routine executed by a CPU of the fifth determination apparatus.

The CPU 71 executes an "EGR execution permission flag setting routine (1)" shown by a flowchart of FIG. 35 every time a predetermined time elapses. This routine is the same as one shown in FIG. 29. Accordingly, both of the values of the flag XPon and the flag Xpoff are "0" or "1", and the value of the flag XFIN is "1", the value of the EGR execution permission flag XEGRkyoka is changed in the same way as that of the EGR execution condition satisfaction flag XEGRjoken.

Figure 36:
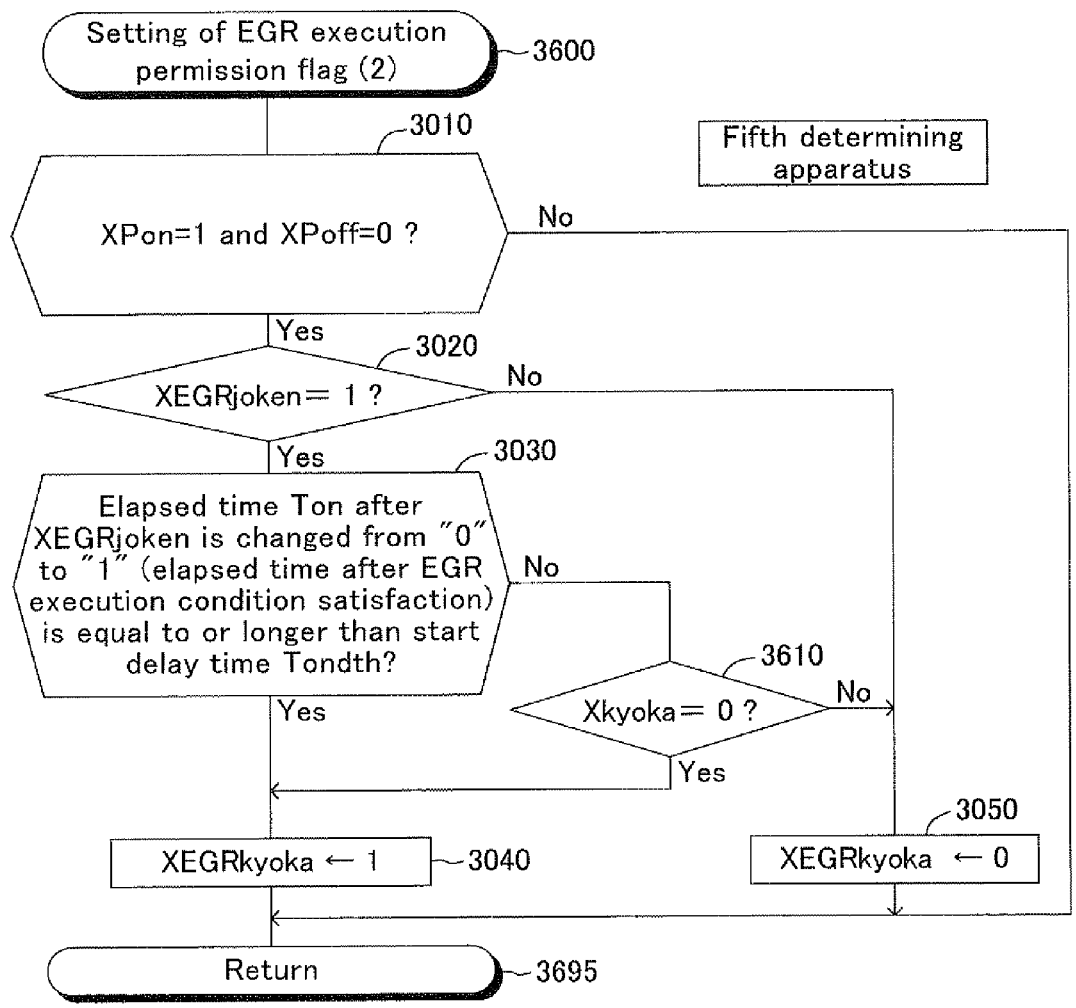
FIG. 36 is a flowchart showing another routine executed by the CPU of the fifth determination apparatus.

Further, the CPU 71 executes an "EGR execution permission flag setting routine (2)" shown by a flowchart of FIG. 36 every time a predetermined time elapses. This routine is a routine in which step 3610 is added to the routine shown in FIG. 30.

That is, when the CPU 71 makes a "No" determination at step 3030 to proceed to step 3610, at which the CPU 71 determines whether or not the value of the obtaining parameter permission flag Xkyoka is "0."

When the value of the obtaining parameter permission flag Xkyoka is "0", the CPU 71 makes a "Yes" determination at step 3610 to proceed to step 3040, at which the CPU 71 sets the value of the EGR execution condition satisfaction flag XEGRjoken to (at) "1." In contrast, when the value of the obtaining parameter permission flag Xkyoka is "1", the CPU 71 makes a "No" determination at step 3610 to proceed to step 3050, at which the CPU 71 sets the value of the EGR execution condition satisfaction flag XEGRjoken to (at) "0."

Accordingly, even before the elapsed time after EGR execution condition satisfaction Ton becomes equal to or longer than the start delay time Tondth, the value of the EGR execution permission flag XEGRkyoka is set to "1" when the value of the obtaining parameter permission flag Xkyoka becomes "0", and thereby, the EGR gas begins to be supplied.

Figure 37:
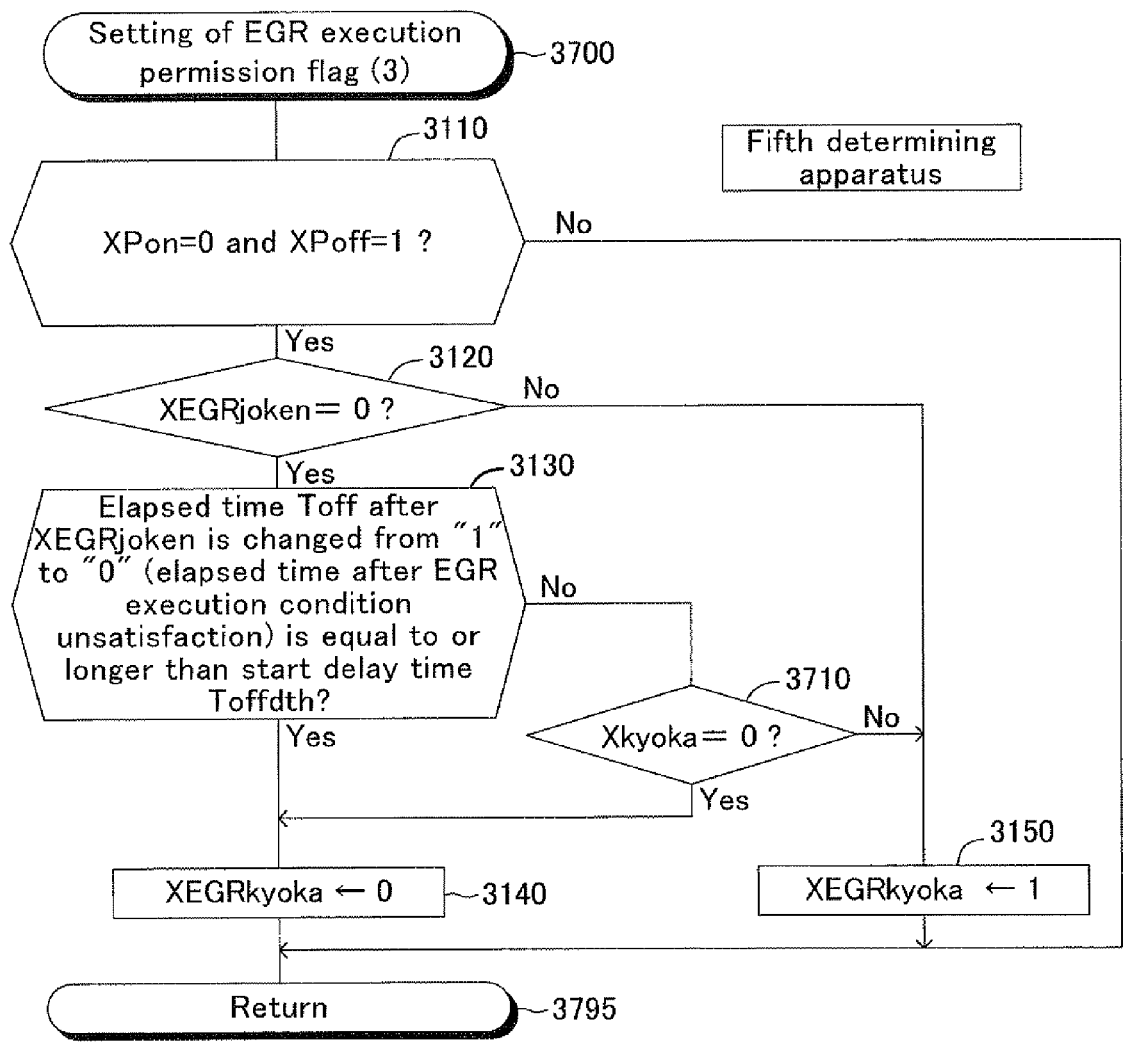
FIG. 37 is a flowchart showing another routine executed by the CPU of the fifth determination apparatus.

Further, the CPU 71 executes an "EGR execution permission flag setting routine (3)" shown by a flowchart of FIG. 37 every time a predetermined time elapses. This routine is a routine in which step 3710 is added to the routine shown in FIG. 31.

That is, when the CPU 71 makes a "No" determination at step 3130 to proceed to step 3710, at which the CPU 71 determines whether or not the value of the obtaining parameter permission flag Xkyoka is "0."

When the value of the obtaining parameter permission flag Xkyoka is "0", the CPU 71 makes a "Yes" determination at step 3710 to proceed to step 3140, at which the CPU 71 sets the value of the EGR execution permission flag XEGRkyoka to (at) "0." In contrast, when the value of the obtaining parameter permission flag Xkyoka is "1", the CPU 71 makes a "No" determination at step 3710 to proceed to step 3150, at which the CPU 71 sets the value of the EGR execution permission flag XEGRkyoka to (at) "1."

Accordingly, even before the elapsed time after EGR execution condition unsatisfaction Toff becomes equal to or longer than the stop delay time Toffdth, the value of the EGR execution permission flag XEGRkyoka is set to "0" when the value of the obtaining parameter permission flag Xkyoka becomes "0", and thereby, the EGR gas stops to be supplied.

As described above, the fifth determining apparatus comprises the imbalance determination parameter obtaining means which is the same as one of the fourth determining apparatus.

Further, the EGR gas supply control means of the fifth determining apparatus is configured so as to realize the EGR supplying state when the state in which the EGR execution condition is satisfied continues for the predetermined start delay time Tondth or longer, and so as to realize the EGR stop state when the EGR execution condition becomes unsatisfied (the routines shown in FIGS. 27, 28, and 36), in the case in which the EGR supplying state imbalance determination parameter Pon has already been obtained, but the EGR stop state imbalance determination parameter Poff has not been obtained. This enables the EGR stop state imbalance determination parameter Poff to be obtained earlier.

Note that, while the parameter obtaining condition is not satisfied, the EGR stop state imbalance determination parameter Poff is not obtained, even when the EGR stop state is realized. That is, in such a case, it makes no sense to realize the EGR stop state until the start delay time Tondth elapses, in order to obtain the EGR stop state imbalance determination parameter Poff.

In view of the above, in the case in which the EGR supplying state imbalance determination parameter Pon has already been obtained, but the EGR stop state imbalance determination parameter Poff has not been obtained, the EGR gas supply control means is configured so as to realize the EGR supplying state when the parameter obtaining condition becomes unsatisfied even before the start delay time Tondth elapses while the EGR execution condition is being satisfied (refer to step 3030, step 3610, and step 3040, shown in FIG. 36).

According to the above-mentioned configuration, chances of occurrence of the state in which the EGR gas is not supplied when the EGR gas is to be (or should be) supplied are lowered/decreased, a possibility of deterioration of emission can be reduced.

Further, the EGR gas supply control means of the fifth determining apparatus is configured so as to realize the EGR supplying state when the EGR execution condition is satisfied, and so as to realize the EGR stop state when the state in which the EGR execution condition is not satisfied continues for the predetermined stop delay time Toffdth or longer (the routines shown in FIGS. 27, 28, and 37), in the case in which the EGR stop state imbalance determination parameter Poff has already been obtained, but the EGR supplying state imbalance determination parameter Pon has not been obtained. This enables the EGR supplying state imbalance determination parameter Pon to be obtained earlier.

Note that, while the parameter obtaining condition is not satisfied, the EGR supplying state imbalance determination parameter Pon is not obtained, even when the EGR supplying state is realized. That is, in such a case, it makes no sense to realize the EGR supplying state until the stop delay time Toffdth elapses, in order to obtain the EGR supplying state imbalance determination parameter Pon.

In view of the above, in the case in which the EGR stop state imbalance determination parameter Poff has already been obtained, but the EGR supplying state imbalance determination parameter Pon has not been obtained, the EGR gas supply control means is configured so as to realize the EGR stop state when the parameter obtaining condition becomes unsatisfied even before the stop delay time Toffdth elapses while the EGR execution condition is being unsatisfied (refer to step 3130, step 3710, and step 3140, shown in FIG. 37).

According to the above-mentioned configuration, chances of occurrence of the state in which the EGR gas is supplied when the EGR gas is not to (should not) be supplied are lowered/decreased, a possibility of deterioration of emission and/or deterioration of drivability can be reduced.

Sixth Embodiment

Next will be described a determining apparatus (hereinafter simply referred to as a "sixth determining apparatus") according to a sixth embodiment of the present invention.

The sixth determining apparatus is different from the first determining apparatus only in the following points.
(Different Point 1)

Figure 38:
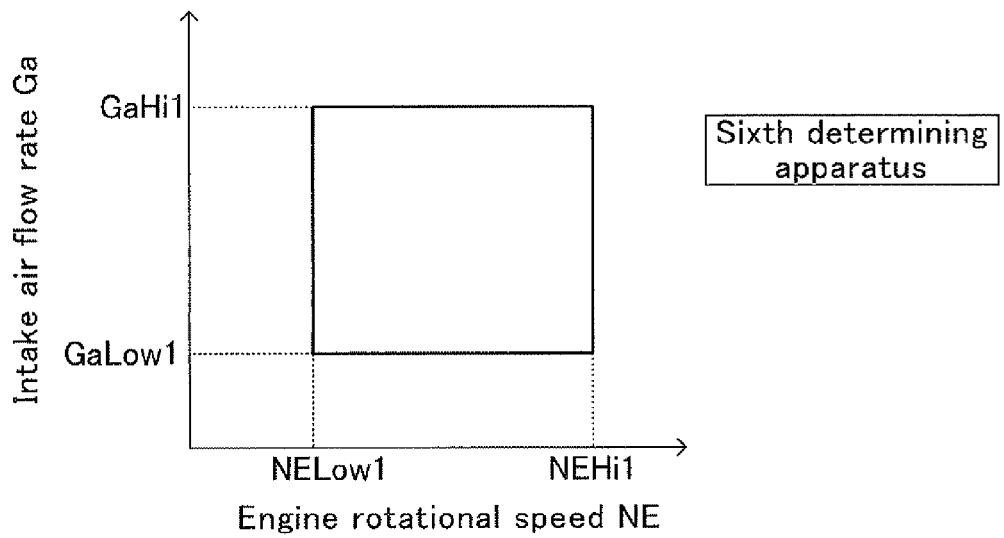
FIG. 38 is a graph showing a parameter obtaining region of an inter-cylinder air-fuel ratio imbalance determination apparatus (sixth determination apparatus) according to a sixth embodiment of the present invention.

When neither the EGR supplying state imbalance determination parameter Pon nor the EGR stop state imbalance determination parameter Poff has been obtained, the sixth determining apparatus sets the obtaining parameter permission flag Xkyoka to (at) "1". That is, a parameter obtaining condition of the sixth determining apparatus is satisfied when all of obtaining permission conditions 1, 2, 6, and 7 described below are satisfied. The obtaining permission conditions 1 and 2 are the same as the obtaining permission conditions 1 and 2 of the first determining apparatus, respectively.
(Obtaining permission condition 1) The cooling water temperature THW is equal to or higher than the threshold cooling water temperature THWth.
(Obtaining permission condition 2) The state in which the change amount ΔAccp of the accelerator pedal operation amount Accp per unit time is equal to or smaller than the threshold accelerator pedal change amount ΔAccpth has continued for the predetermined time or longer.
(Obtaining permission condition 6) The engine rotational speed NE is equal to or higher than a low side engine rotational speed NELow1, and is equal to or lower than a high side engine rotational speed NEHi1 (refer to FIG. 38).
(Obtaining permission condition 7) The intake air flow rate Ga is equal to or larger than a low side intake air flow rate GaLow1, and is equal to or lower than a high side intake air flow rate GaHi1 (refer to FIG. 38).
(Different Point 2)

When neither the EGR supplying state imbalance determination parameter Pon nor the EGR stop state imbalance determination parameter Poff has been obtained, the sixth determining apparatus obtains averages of "the engine rotational speed NE and the intake air flow rate Ga" during a period in which the EGR stop state imbalance determination parameter Poff is been obtained, as "a stop state rotational speed average NEoff and a stop state intake air flow rate average Gaoff"; and obtains averages of "the engine rotational speed NE and the intake air flow rate Ga" during a period in which the EGR supplying state imbalance determination parameter Pon is been obtained, as "a supplying state rotational speed average NEon and a supplying state intake air flow rate average Gaon."

For example, the stop state rotational speed average NEoff is obtained as follows.

The CPU 71 accumulates/integrates the engine rotational speed NE at step 1630 shown in FIG. 16, obtains an average of rotational speed in the unit combustion cycle period through dividing the integrated value by the value of the cumulated number counter Cnoff at step 1640, and further, accumulates/integrates the average of rotational speed at step 1640. The CPU 71 obtains the stop state rotational speed average NEoff through dividing the accumulated value by the cumulated number counter Csoff (=Csoffth) at step 1650.

Similarly, the stop state air flow rate average Gaoff is obtained as follows.

The CPU 71 accumulates/integrates the air flow rate Ga at step 1630 shown in FIG. 16, obtains an average of load in the unit combustion cycle period through dividing the integrated value by the value of the cumulated number counter Cnoff at step 1640, and further, accumulates/integrates the average of load at step 1640. The CPU 71 obtains the stop state air flow rate average Gaoff through dividing the accumulated value by the cumulated number counter Csoff (=Csoffth) at step 1650.

For example, the supplying state rotational speed average NEon is obtained as follows.

The CPU 71 accumulates/integrates the engine rotational speed NE at step 1730 shown in FIG. 17, obtains an average of rotational speed in the unit combustion cycle period through dividing the integrated value by the value of the cumulated number counter Cnon at step 1740, and further, accumulates/integrates the average of rotational speed at step 1740. The CPU 71 obtains the supplying state rotational speed average NEon through dividing the accumulated value by the cumulated number counter Cson (=Csonth) at step 1750.

Similarly, the supplying state air flow rate average Gaon is obtained as follows.

The CPU 71 accumulates/integrates the air flow rate Ga at step 1730 shown in FIG. 17, obtains an average of load in the unit combustion cycle period through dividing the integrated value by the value of the cumulated number counter Cnon at step 1740, and further, accumulates/integrates the average of load at step 1740. The CPU 71 obtains the supplying state air flow rate average Gaon through dividing the accumulated value by the cumulated number counter Cson (=Csonth) at step 1750.

(Different Point 3)

When the EGR supplying state imbalance determination parameter Pon has already been obtained, but the EGR stop state imbalance determination parameter Poff has not been obtained yet, the sixth determining apparatus discards all data which have been obtained for calculating the EGR stop state imbalance determination parameter Poff by that point in time. Further, the sixth determining apparatus changes a condition for permitting to obtain the EGR stop state imbalance determination parameter Poff to a condition which is satisfied when a plurality of obtaining permission conditions described below are satisfied.

Figure 39:
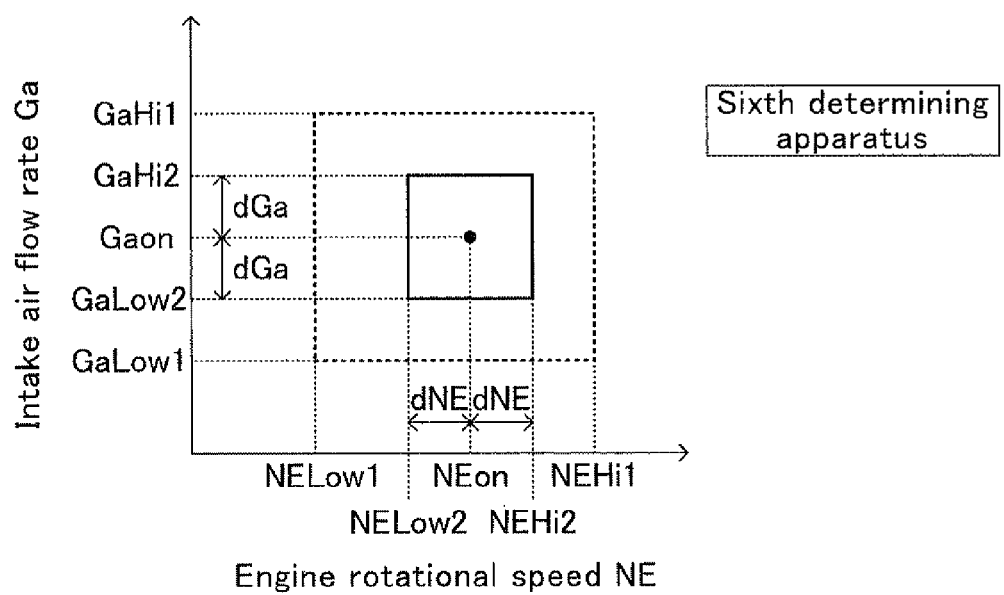
FIG. 39 is a graph showing a modified parameter obtaining region of the sixth determination apparatus.

(Obtaining permission condition 1) The cooling water temperature THW is equal to or higher than the threshold cooling water temperature THWth.
(Obtaining permission condition 2) The state in which the change amount ΔAccp of the accelerator pedal operation amount Accp per unit time is equal to or smaller than the threshold accelerator pedal change amount ΔAccpth has continued for the predetermined time or longer.
(Obtaining permission condition 6a) The engine rotational speed NE is equal to or higher than a modified low side engine rotational speed NELow2, and is equal to or lower than a modified high side engine rotational speed NEHi2 (refer to a solid line shown in FIG. 39). The modified low side engine rotational speed NELow2 is a value obtained by subtracting a constant rotational speed dNE (>0) from the supplying state rotational speed average NEon. The modified high side engine rotational speed NEHi2 is a value obtained by adding the constant rotational speed dNE to the supplying state rotational speed average NEon.
(Obtaining permission condition 7a) The intake air flow rate Ga is equal to or larger than a modified low side intake air flow rate GaLow2, and is equal to or lower than a modified high side intake air flow rate GaHi2 (refer to a solid line shown in FIG. 39). The modified low side intake air flow rate GaLow2 is a value obtained by subtracting a constant air flow rate dGa (>0) from the supplying state air flow rate average Gaon. The modified high side intake air flow rate GaHi2 is a value obtained by adding the constant air flow rate dGa to the supplying state air flow rate average Gaon.

(Different Point 4)

When the EGR stop state imbalance determination parameter Poff has already been obtained, but the EGR supplying state imbalance determination parameter Pon has not been obtained yet, the sixth determining apparatus discards all data which have been obtained for calculating the EGR supplying state imbalance determination parameter Pon by that point in time. Further, the sixth determining apparatus changes a condition for permitting to obtain the EGR supplying state imbalance determination parameter Pon to a condition which is satisfied when a plurality of obtaining permission conditions described below are satisfied.

Figure 40:
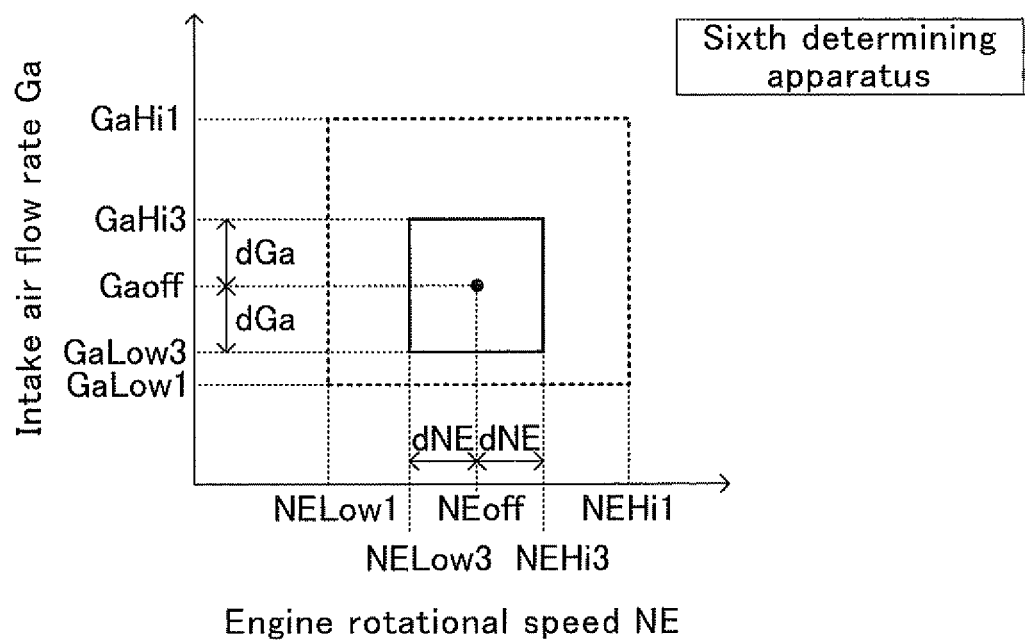
FIG. 40 is a graph showing another modified parameter obtaining region of the sixth determination apparatus.

(Obtaining permission condition 1) The cooling water temperature THW is equal to or higher than the threshold cooling water temperature THWth.
(Obtaining permission condition 2) The state in which the change amount ΔAccp of the accelerator pedal operation amount Accp per unit time is equal to or smaller than the threshold accelerator pedal change amount ΔAccpth has continued for the predetermined time or longer.
(Obtaining permission condition 6b) The engine rotational speed NE is equal to or higher than a modified low side engine rotational speed NELow3, and is equal to or lower than a modified high side engine rotational speed NEHi3 (refer to a solid line shown in FIG. 40). The modified low side engine rotational speed NELow3 is a value obtained by subtracting the constant rotational speed dNE (>0) from the stop state rotational speed average NEoff. The modified high side engine rotational speed NEHi3 is a value obtained by adding the constant rotational speed dNE to the stop state rotational speed average NEoff.
(Obtaining permission condition 7b) The intake air flow rate Ga is equal to or larger than a modified low side intake air flow rate GaLow3, and is equal to or lower than a modified high side intake air flow rate GaHi3 (refer to a solid line shown in FIG. 40). The modified low side intake air flow rate GaLow3 is a value obtained by subtracting the constant air flow rate dGa (>0) from the stop state air flow rate average Gaoff. The modified high side intake air flow rate GaHi3 is a value obtained by adding the constant air flow rate dGa to the stop state air flow rate average Gaoff.

The EGR stop state imbalance determination parameter Poff and the EGR supplying state imbalance determination parameter Pon also vary depending on the operating state of the engine 10 while the data (the detected air-fuel ratio change rates ΔAFon and ΔAFoff) for obtaining those parameters. Accordingly, when the EGR supplying state imbalance determination parameter Pon and the EGR stop state imbalance determination parameter Poff are parameters that are obtained in operating states similar to each other, it is more unlikely that a difference between the operating states effects on the EGR-causing imbalance determination parameter Pegr which is the difference between those parameters. Accordingly, the imbalance determination can be made more accurately.

In view of the above, when the EGR supplying state imbalance determination parameter Pon was obtained before the EGR stop state imbalance determination parameter Poff is obtained, the sixth determining apparatus is configured so as to obtain the EGR stop state imbalance determination parameter Poff in an operating state close to the operating state (the engine rotational speed NE and the intake air flow rate Ga) in which the EGR supplying state imbalance determination parameter Pon was obtained.

Similarly, when the EGR stop state imbalance determination parameter Poff was obtained before the EGR supplying state imbalance determination parameter Pon is obtained, the sixth determining apparatus is configured so as to obtain the EGR supplying state imbalance determination parameter Pon in an operating state close to the operating state (the engine rotational speed NE and the intake air flow rate Ga) in which the EGR stop state imbalance determination parameter Poff was obtained.

Thereafter, the sixth determining apparatus obtains the EGR-causing imbalance determination parameter Pegr based on the EGR supplying state imbalance determination parameter Pon and the EGR stop state imbalance determination parameter Poff, thus obtained.

Consequently, the sixth determining apparatus can determine whether or not the inter-cylinder air-fuel-ratio imbalance state has occurred more accurately than the first determining apparatus.

(Actual Operation)

Figure 41:
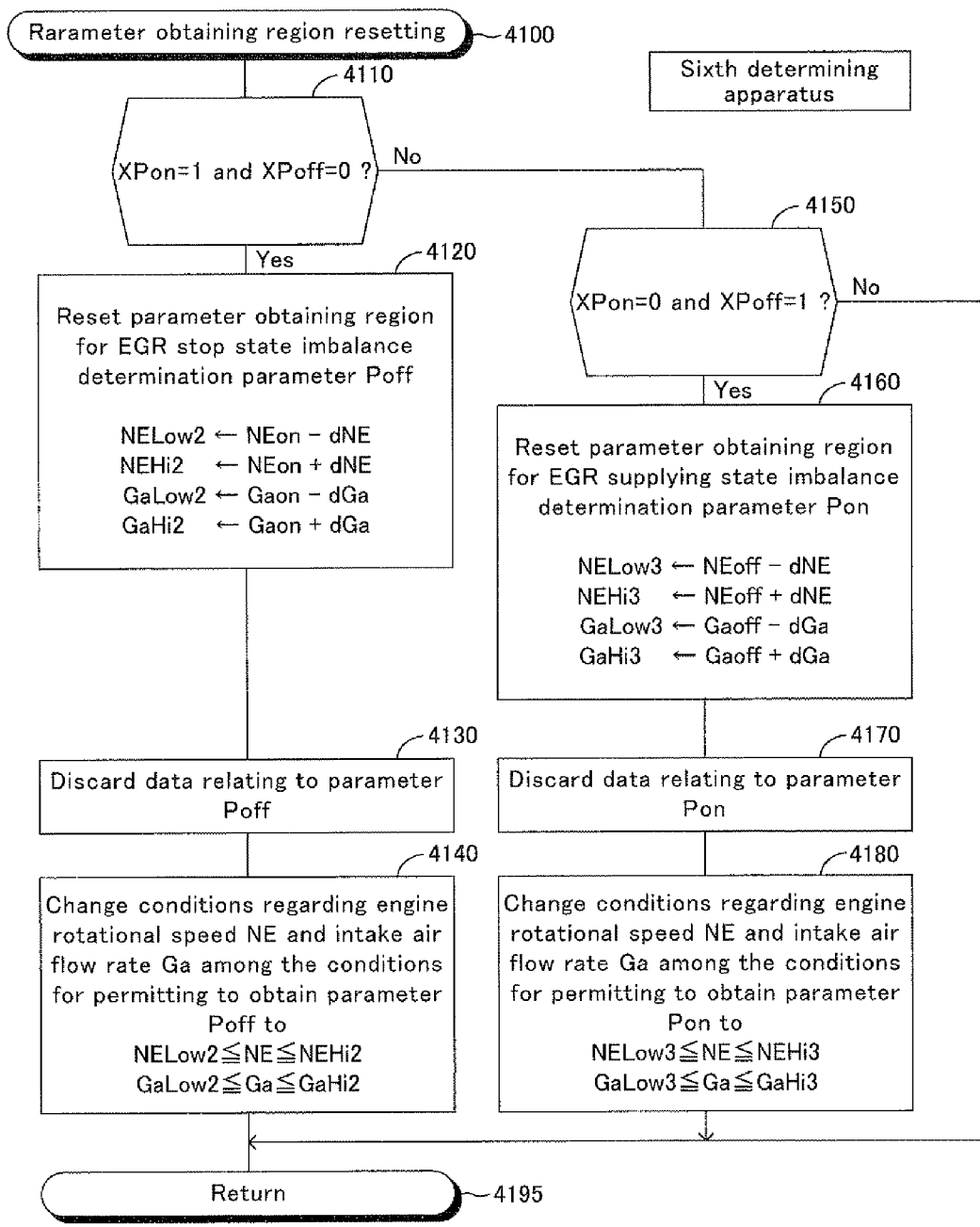
FIG. 41 is a flowchart showing a routine executed by a CPU of the sixth determination apparatus.

The CPU 71 of the sixth determining apparatus executes a "parameter obtaining region resetting routine" shown by a flowchart in FIG. 41 every time a predetermined time elapses.

The CPU 71 determines whether or not the value of the EGR supplying state imbalance determination parameter calculation completion flag XPon is "1" and the value of the EGR stop state imbalance determination parameter calculation completion flag XPoff is "0", at step 4110. When the EGR supplying state imbalance determination parameter Pon has been obtained and the EGR stop state imbalance determination parameter Poff has not been obtained, the condition of this step 4110 is satisfied. Accordingly, in such a case, the CPU 71 makes a "Yes" determination at step 4110 to execute processes from steps 4120 to 4140 described below one after another, and then proceeds to step 4195 to end the present routine tentatively.

Step 4120: The CPU 71 obtains a modified low side engine rotational speed NELow2 (=the supplying state rotational speed average NEon−the constant rotational speed dNE), a modified high side engine rotational speed NEHi2 (=the supplying state rotational speed average NEon+the constant rotational speed dNE), a modified low side intake air flow rate average GaLow2 (=the supplying state air flow rate average Gaon−the constant intake air flow rate dGa), and a modified high side intake air flow rate average GaHi2 (=the supplying state air flow rate average Gaon+the constant intake air flow rate dGa).

Step 4130: The CPU 71 discards all data (ΔAFoff, SAFDoff, Cnoff, AveΔAFoff, Saveoff, Csoff etc.) which have been obtained for calculating the EGR stop state imbalance determination parameter Poff.

Step 4140: The CPU 71 changes "the Obtaining permission condition 6 and the Obtaining permission condition 7" among the conditions for permitting to obtain the EGR stop state imbalance determination parameter Poff to "the Obtaining permission condition 6a and the Obtaining permission condition 7a"

In contrast, when the CPU 71 executes the process of step 4110, and the condition of step 4110 is not satisfied, the CPU 71 makes a "No" determination at step 4110 to proceed to step 4150.

At step 4150, the CPU 71 determines whether or not the value of the EGR supplying state imbalance determination parameter calculation completion flag XPon is "0" and the value of the EGR stop state imbalance determination parameter calculation completion flag XPoff is "1." When the EGR supplying state imbalance determination parameter Pon has not been obtained and the EGR stop state imbalance determination parameter Poff has been obtained, the condition of this step 4150 is satisfied. Accordingly, in such a case, the CPU 71 makes a "Yes" determination at step 4150 to execute processes from steps 4160 to 4180 described below one after another, and then proceeds to step 4195 to end the present routine tentatively. It should be noted that the CPU 71 directly proceeds to step 4150 to end the present routine tentatively, when the CPU 71 makes a "No" determination at step 4150.

Step 4160: The CPU 71 obtains a modified low side engine rotational speed NELow3 (=the stop state rotational speed average NEoff−the constant rotational speed dNE), a modified high side engine rotational speed NEHi3 (=the stop state rotational speed average NEoff+the constant rotational speed dNE), a modified low side intake air flow rate average GaLow3 (=the stop state air flow rate average Gaoff−the constant intake air flow rate dGa), and a modified high side intake air flow rate average GaHi3 (=the stop state air flow rate average Gaoff+the constant intake air flow rate dGa).

Step 4170: The CPU 71 discards all data (ΔAFon, SAFDon, Cnon, AveΔAFon, Saveon, Cson etc.) which have been obtained for calculating the EGR supplying state imbalance determination parameter Pon.

Step 4180: The CPU 71 changes "the Obtaining permission condition 6 and the Obtaining permission condition 7" among the conditions for permitting to obtain the EGR supplying state imbalance determination parameter Pon to "the Obtaining permission condition 6b and the Obtaining permission condition 7b."

As described above, according to the sixth determining apparatus, the parameter which has not been obtained among the EGR supplying state imbalance determination parameter Pon and the EGR stop state imbalance determination parameter Poff is obtained in the operating state close to the operating state in which the other parameter obtained firstly was obtained. Accordingly, the EGR-causing imbalance determination parameter Pegr which is based on the difference between the EGR supplying state imbalance determination parameter Pon and the EGR stop state imbalance determination parameter Poff is not affected by the difference of the operating state. Consequently, the sixth determining apparatus can accurately determine whether or not the inter-cylinder air-fuel-ratio imbalance state due to the EGR gas has occurred.

As described above, each of the inter-cylinder air-fuel ratio imbalance determination apparatus according to each of the embodiments of the present invention can accurately and early determine whether or not the inter-cylinder air-fuel-ratio imbalance state due to the EGR gas has occurred.

It should be noted that the present invention is not limited to the above-described embodiments, and may be modified in various manners within the scope of the present invention.

For example, the imbalance determination parameter (the EGR supplying state imbalance determination parameter Pon and the EGR stop state imbalance determination parameter Poff) may be parameters described below.

(P1) The imbalance determination parameter may be a value corresponding to the trace/trajectory length of the output value Vabyfs of the air-fuel ratio sensor 67 or of the detected air-fuel ratio abyfs. For example, the trace length of the detected air-fuel ratio abyfs may be obtained by obtaining the output value Vabyfs every elapse of the definite sampling time ts, converting the output value Vabyfs into the detected air-fuel ratio abyfs, and integrating/accumulating an absolute value of a difference between the detected air-fuel ratio abyfs and a detected air-fuel ratio abyfs which was obtained the definite sampling time ts before.

It is preferable that the trace length be obtained every elapse of the unit combustion cycle period. An average of the trace lengths for a plurality of the unit combustion cycle periods (i.e., the value corresponding to the trace length) may also be obtained as the imbalance parameter. It should be noted that the trace length of the output value Vabyfs or of the detected air-fuel ratio abyfs has a tendency that they become larger as the engine rotational speed becomes higher, and thus, each of the determining apparatus may preferably increase the imbalance determination threshold as the engine rotational speed becomes higher.

(P2) The imbalance determination parameter may be a value corresponding to a change rate of the change rate of the output value Vabyfs of the air-fuel ratio sensor 67 or of the detected air-fuel ratio abyfs (i.e., a second-order differential value of each of those values with respect to time), as shown in (D) of FIG. 12. For example, the imbalance determination parameter may be a maximum value of absolute values of the" second-order differential value ($d^2$(Vabyfs)/$dt^2$) of the output value Vabyfs of the air-fuel ratio sensor 67 with respect to time" in the unit combustion cycle period, or a maximum value of absolute values of the" second-order differential value ($d^2$(abyfs)/$dt^2$) of the detected air-fuel ratio abyfs represented by the output value Vabyfs of the air-fuel ratio sensor 67 with respect to time" in the unit combustion cycle period.

For example, the change rate of the change rate of the detected air-fuel ratio abyfs may be obtained as follows.
The output value Vabyfs is obtained every elapse of the definite sampling time ts.
The output value Vabyfs is converted into the detected air-fuel ratio abyfs.
A difference between the detected air-fuel ratio abyfs and a detected air-fuel ratio abyfs obtained the definite sampling time ts before is obtained as the change rate of the detected air-fuel ratio abyfs.
A difference between the change rate of the detected air-fuel ratio abyfs and a change rate of the detected air-fuel ratio abyfs obtained the definite sampling time ts before is obtained as the change rate of the change rate of the detected air-fuel ratio abyfs.

In this case, among a plurality of the change rates of the change rate of the detected air-fuel ratio abyfs, that are obtained during a unit combustion cycle period, a value whose absolute value is the largest may be selected. In addition, such maximum values may be obtained for a plurality of the unit combustion cycle periods. Further, an average of the maximum values may be adopted as the imbalance determination parameter.

As described above, when the inter-cylinder air-fuel-ratio imbalance state is occurring, the output value Vabyfs of the air-fuel ratio sensor 67 rapidly changes when the exhaust gas reaching the air-fuel ratio sensor 67 changes from the exhaust gas of the balanced cylinder to the exhaust gas of the imbalanced cylinder, and when the exhaust gas reaching the air-fuel ratio sensor 67 changes from the exhaust gas of the imbalanced cylinder to the exhaust gas of the balanced cylinder. Accordingly, as shown by a solid line C4 in (D) of FIG. 12, an absolute value of the change rate of the change rate of the detected air-fuel ratio abyfs represented by the output value Vabyfs of the air-fuel ratio sensor 67 becomes large when the inter-cylinder air-fuel-ratio imbalance state has occurred. Further, the absolute value of the change rate of the change rate of the detected air-fuel ratio abyfs becomes larger as the difference (cylinder-by-cylinder air-fuel ratio difference) between the air-fuel ratio of the imbalance cylinder and the air-fuel ratio of the balanced cylinder becomes larger.

(P4) The imbalance determination parameter may be a magnitude of a difference between cylinder-by-cylinder air-fuel ratios, each of which is estimated by analyzing the output value Vabyfs of the upstream air-fuel ratio sensor 67 based on the engine rotational speed NE, the absolute crank angle CA of the engine 10, the intake air-flow rate Ga, and the like (i.e., the parameter may be an absolute value of a difference between the maximum value of the cylinder-by-cylinder air-fuel ratios and the minimum value of the cylinder-by-cylinder air-fuel ratios (e.g., reference to Japanese Patent Application Laid-Open (kokai) Nos. 2000-220489).

It should be noted that the detected air-fuel ratio change rate AF that are obtained as basic data for the imbalance determination parameter by each of the embodiment varies depending on the intake air-flow rate Ga, but hardly varies depending on the engine rotational speed NE. This is because, a flow rate of an exhaust gas inside of the outer protective cover 67b and the inner protective cover 67c varies depending on a flow rate of an exhaust gas EX flowing in the vicinity of the outflow hole 67b2 of the outer protective cover 67b (and thus, the intake air flow rate), but does not vary depending on the engine rotational speed NE.

The invention claimed is:
1. An inter-cylinder air-fuel ratio imbalance determination apparatus, which is applied to a multi-cylinder internal combustion engine having a plurality of cylinders, and which determines whether or not an inter-cylinder air-fuel ratio imbalance state in which a cylinder-by-cylinder air-fuel ratio difference is larger than or equal to a predetermined value has been occurring, said cylinder-by-cylinder air-fuel ratio difference being a difference between air-fuel ratios of mixtures supplied to at least two or more of a plurality of said cylinders, said at least two or more of a plurality of said cylinders being configured to discharge exhaust gases to an exhaust merging portion of an exhaust passage of said engine, comprising:
a plurality of fuel injection valves, disposed in such a manner that each of said injection valves corresponds to each of said at least two or more of said cylinders, each of said fuel injection valves injecting fuel contained in an air-fuel mixture supplied to each of combustion chambers of said at least two or more of said cylinders;
an EGR gas supply unit which includes a plurality of EGR gas supply openings, each of said EGR gas supply openings being disposed for each of said at least two or more of said cylinders and supplying an external EGR gas to each of said combustion chambers of said at least two or more of said cylinders;
an EGR gas supply control unit, which is configured to realize an EGR supplying state in which said external EGR gas is supplied through a plurality of said EGR gas supply openings when an operating condition of said engine satisfies a predetermined EGR execution condition, and to realize an EGR stop state in which said external EGR gas supply is stopped when said operating condition of said engine does not satisfy said EGR execution condition;

an air-fuel ratio sensor, which is disposed at said exhaust merging portion or at a portion downstream of said exhaust merging portion in said exhaust passage, and which outputs an output value corresponding to an air-fuel ratio of an exhaust gas at a position where said air-fuel ratio sensor is disposed;

an imbalance determination parameter obtaining unit,
that obtains, based on said output value of said air-fuel ratio sensor, an EGR stop state imbalance determination parameter whose absolute value becomes larger as said cylinder-by-cylinder air-fuel ratio difference becomes larger when said EGR stop state is being realized, that obtains, based on said output value of said air-fuel ratio sensor, an EGR supplying state imbalance determination parameter whose absolute value becomes larger as said cylinder-by-cylinder air-fuel ratio difference becomes larger when said EGR supplying state is being realized, and that obtains an EGR-causing imbalance determination parameter varying depending on a degree of a difference between said EGR supplying state imbalance determination parameter and said EGR stop state imbalance determination parameter; and an imbalance determination unit, which is configured to compare said EGR-causing imbalance determination parameter with a predetermined EGR-causing imbalance determination threshold, and to determine whether or not said inter-cylinder air-fuel ratio imbalance state has occurred based on said result of said comparison.

2. The inter-cylinder air-fuel ratio imbalance determination apparatus according to claim 1, wherein said imbalance determination parameter obtaining unit is configured to obtain, as said EGR-causing imbalance determination parameter, a value corresponding to said difference between said EGR supplying state imbalance determination parameter and said EGR stop state imbalance determination parameter.

3. The inter-cylinder air-fuel ratio imbalance determination apparatus according to claim 1, wherein said imbalance determination parameter obtaining unit is configured to obtain, as said EGR-causing imbalance determination parameter, a value corresponding to a ratio of said EGR supplying state imbalance determination parameter to said EGR stop state imbalance determination parameter.

4. The inter-cylinder air-fuel ratio imbalance determination apparatus according to claim 1, wherein,
said EGR execution condition is a condition which is satisfied when an actual rotational speed of said engine and an actual load of said engine is in an EGR execution region, and
said EGR gas supply control unit is configured to
set said EGR execution region to a predetermined usual EGR execution region, when neither said EGR supplying state imbalance determination parameter nor said EGR stop state imbalance determination parameter has been obtained, or when both of said EGR supplying state imbalance determination parameter and said EGR stop state imbalance determination parameter have been obtained; and
set said EGR execution region to a narrowed EGR execution region which is within said usual EGR execution region and is narrower than said usual EGR execution region, when said EGR supplying state imbalance determination parameter has been obtained and said EGR stop state imbalance determination parameter has not been obtained.

5. The inter-cylinder air-fuel ratio imbalance determination apparatus according to claim 4, wherein,
said imbalance determination parameter obtaining unit is configured to
obtain said EGR supplying state imbalance determination parameter when said actual rotational speed of said engine and said actual load of said engine is in a predetermined parameter obtaining region in which said imbalance determination parameters are allowed to be obtained and said EGR supplying state is being realized, and
obtain said EGR stop state imbalance determination parameter when said actual rotational speed of said engine and said actual load of said engine is in said parameter obtaining region and said EGR stop state is being realized; and
said EGR gas supply control unit is configured to
set said narrowed EGR execution region to a region which is within said usual EGR execution region but is not within said parameter obtaining region.

6. The inter-cylinder air-fuel ratio imbalance determination apparatus according to claim 1, wherein,
said EGR execution condition is a condition which is satisfied when an actual rotational speed of said engine and an actual load of said engine is in an EGR execution region, and
said EGR gas supply control unit is configured to
set said EGR execution region to a predetermined usual EGR execution region, when neither said EGR supplying state imbalance determination parameter nor said EGR stop state imbalance determination parameter has been obtained, or when both of said EGR supplying state imbalance determination parameter and said EGR stop state imbalance determination parameter have been obtained; and
set said EGR execution region to an enlarged EGR execution region which includes said usual EGR execution region and is wider than said usual EGR execution region, when said EGR stop state imbalance determination parameter has been obtained and said EGR supplying state imbalance determination parameter has not been obtained.

7. The inter-cylinder air-fuel ratio imbalance determination apparatus according to claim 6, wherein,
said imbalance determination parameter obtaining unit is configured to
obtain said EGR supplying state imbalance determination parameter when said actual rotational speed of said engine and said actual load of said engine is in a predetermined parameter obtaining region in which said imbalance determination parameters are allowed to be obtained and said EGR supplying state is being realized, and
obtain said EGR stop state imbalance determination parameter when said actual rotational speed of said engine and said actual load of said engine is in said parameter obtaining region and said EGR stop state is being realized,
said EGR gas supply control unit is configured to
set said enlarged EGR execution region to a region which is included within at least one of said usual EGR execution region and said parameter obtaining region.

8. The inter-cylinder air-fuel ratio imbalance determination apparatus according to claim 1, wherein, said EGR gas supply control unit is configured, in a case in which said EGR supplying state imbalance determination parameter has been obtained and said EGR stop state imbalance determination parameter has not been obtained, to realize said EGR supplying state when a state in which said EGR execution condition is satisfied continues for a time period equal to or longer than a predetermined start delay time, and to realize said EGR stop state when said EGR execution condition becomes unsatisfied.

9. The inter-cylinder air-fuel ratio imbalance determination apparatus according to claim 8, wherein,
said imbalance determination parameter obtaining unit is configured to
obtain said EGR stop state imbalance determination parameter when a predetermined parameter obtaining condition for obtaining said imbalance determination parameters is being satisfied and said EGR stop state is being realized, and
obtain said EGR supplying state imbalance determination parameter when said parameter obtaining condition is being satisfied and said EGR supplying state is being realized, and
said EGR gas supply control unit is configured to realize said EGR supplying state when said parameter obtaining condition becomes unsatisfied even before said state in which said EGR execution condition is satisfied continues for said time period equal to or longer than said start delay time, in said case in which said EGR supplying state imbalance determination parameter has been obtained and said EGR stop state imbalance determination parameter has not been obtained.

10. The inter-cylinder air-fuel ratio imbalance determination apparatus according to claim 1, wherein,
said EGR gas supply control unit is configured, in a case in which said EGR stop state imbalance determination parameter has been obtained and said EGR supplying state imbalance determination parameter has not been obtained, to realize said EGR supplying state when said EGR execution condition is satisfied, and to realize said EGR stop state when a state in which said EGR execution condition is unsatisfied continues for a time period equal to or longer than a predetermined stop delay time.

11. The inter-cylinder air-fuel ratio imbalance determination apparatus according to claim 10, wherein,
said imbalance determination parameter obtaining unit is configured to
obtain said EGR stop state imbalance determination parameter when a predetermined parameter obtaining condition for obtaining said imbalance determination parameters is being satisfied and said EGR stop state is being realized, and
obtain said EGR supplying state imbalance determination parameter when said parameter obtaining condition is being satisfied and said EGR supplying state is being realized, and said EGR gas supply control unit is configured to realize said EGR stop state when said parameter obtaining condition becomes unsatisfied even before said state in which said EGR execution condition is unsatisfied continues for said time period equal to or longer than said stop delay time, in said case in which said EGR stop state imbalance determination parameter has been obtained and said EGR supplying state imbalance determination parameter has not been obtained.

12. The inter-cylinder air-fuel ratio imbalance determination apparatus according to claim 1, wherein,
said imbalance determination unit is configured to compare said EGR supplying state imbalance determination parameter with a predetermined EGR supplying state imbalance determination threshold, and to determine whether or not said inter-cylinder air-fuel ratio imbalance state has occurred also based on said result of said comparison.

13. The inter-cylinder air-fuel ratio imbalance determination apparatus according to claim 1, wherein,
said imbalance determination unit is configured to compare said EGR stop state imbalance determination parameter with a predetermined EGR stop state imbalance determination threshold, and to determine whether or not said inter-cylinder air-fuel ratio imbalance state has occurred also based on said result of said comparison.

14. The inter-cylinder air-fuel ratio imbalance determination apparatus according to claim 1, wherein,
said EGR supplying state imbalance determination parameter is a value corresponding to a change amount of said output value of said air-fuel ratio sensor per unit time, and
said EGR stop state imbalance determination parameter is a value corresponding to said change amount of said output value of said air-fuel ratio sensor per unit time.

15. The inter-cylinder air-fuel ratio imbalance determination apparatus according to claim 1, wherein,
said EGR supplying state imbalance determination parameter is a value corresponding to a change amount of a change amount of said output value of said air-fuel ratio sensor per unit time, and
said EGR stop state imbalance determination parameter is a value corresponding to said change amount of a change amount of said output value of said air-fuel ratio sensor per unit time.

16. The inter-cylinder air-fuel ratio imbalance determination apparatus according to claim 1, wherein,
said EGR supplying state imbalance determination parameter is a value corresponding to a trace length of said output value of said air-fuel ratio sensor, and
said EGR stop state imbalance determination parameter is a value corresponding to said trace length of said output value of said air-fuel ratio sensor.

* * * * *